(12) United States Patent
Lofy

(10) Patent No.: US 8,438,863 B2
(45) Date of Patent: *May 14, 2013

(54) CLIMATE CONTROLLED BEVERAGE CONTAINER

(75) Inventor: John Lofy, Claremont, CA (US)

(73) Assignee: Gentherm Incorporated, Northville, MI (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/346,562

(22) Filed: Jan. 9, 2012

(65) Prior Publication Data

US 2012/0104000 A1 May 3, 2012

Related U.S. Application Data

(63) Continuation of application No. 11/669,117, filed on Jan. 30, 2007, now Pat. No. 8,104, 295.

(60) Provisional application No. 60/763,460, filed on Jan. 30, 2006, provisional application No. 60/849,948, filed on Oct. 6, 2006.

(51) Int. Cl.
*F25B 21/00* (2006.01)
*F25B 21/02* (2006.01)
*F25D 3/08* (2006.01)

(52) U.S. Cl.
USPC .................. 62/3.61; 62/3.1; 62/3.3; 62/457.4

(58) Field of Classification Search .................. 62/3.1, 62/3.3, 3.61, 457.4
See application file for complete search history.

(56) References Cited

U.S. PATENT DOCUMENTS

| | | | |
|---|---|---|---|
| 2,991,628 A | 7/1961 | Tuck | |
| 3,136,577 A | 6/1964 | Richard | |
| 3,137,523 A | 6/1964 | Karner | |
| 3,243,965 A | 4/1966 | Jepson | |
| 3,310,953 A | 3/1967 | Rait | |
| 3,314,242 A | 4/1967 | Lefferts | |
| 3,434,302 A | 3/1969 | Stoner et al. | |

(Continued)

FOREIGN PATENT DOCUMENTS

| | | |
|---|---|---|
| DE | 4028658 | 3/1991 |
| DE | 10238552 | 8/2001 |

(Continued)

OTHER PUBLICATIONS

International Search Report for Application No. PCT/US2007/002553 mailed Jul. 23, 2007 (PCT/US2007/002553 is the corresponding PCT application of the present application).

(Continued)

*Primary Examiner* — Mohammad M Ali
*Assistant Examiner* — Daniel C Comings
(74) *Attorney, Agent, or Firm* — Knobbe, Martens, Olson & Bear, LLP

(57) ABSTRACT

A cooling system comprises a container that is conductively coupled or convectively coupled to a thermoelectric device to selectively cool and/or heat the container. A climate controlled container system for a vehicle includes a container or cavity and a conduction element configured to cool the cavity. In some embodiments, the cooling system comprises a housing, a housing inlet, a fluid passage and one or more thermoelectric devices and fluid transfer devices positioned within the housing.

17 Claims, 57 Drawing Sheets

U.S. PATENT DOCUMENTS

| | | |
|---|---|---|
| 3,713,302 A | 1/1973 | Reviel |
| 3,808,825 A | 5/1974 | Ciurea |
| 4,054,037 A | 10/1977 | Yoder |
| 4,274,262 A | 6/1981 | Reed et al. |
| 4,301,658 A | 11/1981 | Reed |
| 4,311,017 A | 1/1982 | Reed et al. |
| D264,592 S | 5/1982 | Reed et al. |
| 4,384,512 A | 5/1983 | Keith |
| 4,413,857 A | 11/1983 | Hayashi |
| 4,581,898 A | 4/1986 | Preis |
| 4,597,435 A | 7/1986 | Fosco, Jr. |
| 4,671,070 A | 6/1987 | Rudick |
| 4,671,567 A | 6/1987 | Frobose |
| 4,685,727 A | 8/1987 | Cremer et al. |
| 4,711,099 A | 12/1987 | Polan et al. |
| 4,738,113 A | 4/1988 | Rudick |
| 4,759,190 A | 7/1988 | Trachtenberg et al. |
| 4,870,837 A | 10/1989 | Weins |
| 4,914,920 A | 4/1990 | Carnagie et al. |
| 4,923,248 A | 5/1990 | Feher |
| 4,989,415 A | 2/1991 | Lombness |
| 5,002,336 A | 3/1991 | Feher |
| 5,042,258 A | 8/1991 | Sundhar |
| 5,051,076 A | 9/1991 | Okomo et al. |
| 5,060,479 A | 10/1991 | Carmi et al. |
| 5,077,709 A | 12/1991 | Feher |
| 5,106,161 A | 4/1992 | Meiller |
| 5,117,638 A | 6/1992 | Feher |
| D334,508 S | 4/1993 | Furtado |
| 5,283,420 A | 2/1994 | Montalto |
| 5,301,508 A | 4/1994 | Kahl et al. |
| 5,315,830 A | 5/1994 | Doke et al. |
| D350,048 S | 8/1994 | Kahl et al. |
| 5,367,879 A | 11/1994 | Doke et al. |
| 5,385,382 A | 1/1995 | Single, II et al. |
| D358,071 S | 5/1995 | Gill |
| 5,448,109 A | 9/1995 | Cachy |
| 5,572,872 A | 11/1996 | Hlavacek |
| 5,597,200 A | 1/1997 | Gregory et al. |
| 5,609,032 A | 3/1997 | Bielinski |
| 5,626,021 A | 5/1997 | Karunasiri et al. |
| 5,634,343 A | 6/1997 | Baker, III |
| 5,655,384 A | 8/1997 | Joslin, Jr. |
| 5,720,171 A * | 2/1998 | Osterhoff et al. ............... 62/3.6 |
| 5,842,353 A | 12/1998 | Kuo-Liang |
| 5,845,499 A | 12/1998 | Montesanto |
| 5,850,741 A | 12/1998 | Feher |
| 5,862,669 A | 1/1999 | Davis et al. |
| 5,881,560 A | 3/1999 | Bielinski |
| 5,884,487 A | 3/1999 | Davis et al. |
| 5,887,304 A | 3/1999 | Von der Heyde |
| 5,921,314 A | 7/1999 | Schuller et al. |
| 5,924,766 A | 7/1999 | Esaki et al. |
| 5,927,817 A | 7/1999 | Ekman et al. |
| 5,941,077 A | 8/1999 | Safyan |
| 5,946,939 A | 9/1999 | Matsushima et al. |
| 5,970,719 A * | 10/1999 | Merritt ........................... 62/3.6 |
| 6,003,950 A | 12/1999 | Larsson |
| 6,019,420 A | 2/2000 | Faust et al. |
| 6,048,024 A | 4/2000 | Wallman |
| 6,059,018 A | 5/2000 | Yoshinori et al. |
| 6,062,641 A | 5/2000 | Suzuki et al. |
| 6,079,485 A | 6/2000 | Esaki et al. |
| 6,082,114 A | 7/2000 | Leonoff |
| 6,085,369 A | 7/2000 | Feher |
| 6,103,967 A | 8/2000 | Cachy et al. |
| 6,105,384 A | 8/2000 | Joseph |
| 6,119,461 A | 9/2000 | Stevick et al. |
| 6,119,463 A | 9/2000 | Bell |
| 6,121,585 A | 9/2000 | Dam |
| 6,141,969 A | 11/2000 | Launchbury et al. |
| 6,145,925 A | 11/2000 | Eksin et al. |
| 6,186,592 B1 | 2/2001 | Orizakis et al. |
| 6,189,966 B1 | 2/2001 | Faust et al. |
| 6,192,787 B1 | 2/2001 | Montalto |
| 6,196,627 B1 | 3/2001 | Faust et al. |
| 6,206,465 B1 | 3/2001 | Faust et al. |
| 6,223,539 B1 | 5/2001 | Bell |
| 6,263,530 B1 | 7/2001 | Feher |
| 6,269,653 B1 | 8/2001 | Katuša |
| 6,282,906 B1 | 9/2001 | Cauchy |
| 6,308,519 B1 | 10/2001 | Bielinski |
| 6,401,461 B1 | 6/2002 | Harrison et al. |
| 6,401,462 B1 | 6/2002 | Bielinski |
| 6,422,024 B1 | 7/2002 | Foye |
| 6,449,958 B1 | 9/2002 | Foye |
| D467,468 S | 12/2002 | Krieger et al. |
| 6,509,704 B1 | 1/2003 | Brown |
| 6,530,232 B1 | 3/2003 | Kitchens |
| RE38,128 E | 6/2003 | Gallup et al. |
| D475,895 S | 6/2003 | Ancona et al. |
| 6,571,564 B2 | 6/2003 | Upadhye et al. |
| 6,598,251 B2 | 7/2003 | Habboub et al. |
| 6,604,785 B2 | 8/2003 | Bargheer et al. |
| 6,606,866 B2 | 8/2003 | Bell |
| 6,619,736 B2 | 9/2003 | Stowe et al. |
| 6,626,488 B2 | 9/2003 | Pfahler |
| 6,644,735 B2 | 11/2003 | Bargheer et al. |
| 6,658,857 B1 | 12/2003 | George |
| 6,676,207 B2 | 1/2004 | Rauh et al. |
| 6,700,052 B2 | 3/2004 | Bell |
| 6,732,533 B1 | 5/2004 | Giles |
| 6,732,534 B2 | 5/2004 | Spry |
| 6,761,399 B2 | 7/2004 | Bargheer et al. |
| 6,786,541 B2 | 9/2004 | Haupt et al. |
| 6,786,545 B2 | 9/2004 | Bargheer et al. |
| 6,808,230 B2 | 10/2004 | Buss et al. |
| 6,828,528 B2 | 12/2004 | Stowe et al. |
| 6,841,957 B2 | 1/2005 | Brown |
| 6,855,880 B2 | 2/2005 | Feher |
| 6,857,697 B2 | 2/2005 | Brennan et al. |
| 6,870,135 B2 | 3/2005 | Hamm et al. |
| 6,893,086 B2 | 5/2005 | Bajic et al. |
| 6,907,739 B2 | 6/2005 | Bell |
| 6,918,257 B2 | 7/2005 | Slone et al. |
| 6,954,944 B2 | 10/2005 | Feher |
| 6,976,734 B2 | 12/2005 | Stoewe |
| 7,022,946 B2 | 4/2006 | Sanoner et al. |
| 7,040,710 B2 | 5/2006 | White et al. |
| 7,070,232 B2 | 7/2006 | Minegishi et al. |
| 7,082,773 B2 | 8/2006 | Cauchy |
| 7,089,749 B1 | 8/2006 | Schafer |
| 7,108,319 B2 | 9/2006 | Hartwich et al. |
| 7,114,771 B2 | 10/2006 | Lofy et al. |
| 7,124,593 B2 | 10/2006 | Feher |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,178,344 B2 | 2/2007 | Bell |
| 7,201,441 B2 | 4/2007 | Stoewe et al. |
| 7,272,936 B2 | 9/2007 | Feher |
| 7,425,034 B2 | 9/2008 | Bajic et al. |
| 7,462,028 B2 | 12/2008 | Cherala et al. |
| 7,475,464 B2 | 1/2009 | Lofy et al. |
| 7,480,950 B2 | 1/2009 | Feher |
| 7,506,938 B2 | 3/2009 | Brennan et al. |
| 7,587,901 B2 | 9/2009 | Petrovski |
| 7,591,507 B2 | 9/2009 | Giffin et al. |
| 7,640,754 B2 | 1/2010 | Wolas |
| 7,665,803 B2 | 2/2010 | Wolas |
| 7,708,338 B2 | 5/2010 | Wolas |
| RE41,765 E | 9/2010 | Gregory et al. |
| 7,827,620 B2 | 11/2010 | Feher |
| 7,827,805 B2 | 11/2010 | Comiskey et al. |
| 7,862,113 B2 | 1/2011 | Knoll |
| 7,866,017 B2 | 1/2011 | Knoll |
| 7,877,827 B2 | 2/2011 | Marquette et al. |
| 7,937,789 B2 | 5/2011 | Feher |
| 7,963,594 B2 | 6/2011 | Wolas |
| 7,996,936 B2 | 8/2011 | Marquette et al. |
| 8,065,763 B2 | 11/2011 | Brykalski et al. |
| 8,104,295 B2 | 1/2012 | Lofy |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |

| | | |
|---|---|---|
| 8,332,975 B2 | 12/2012 | Brykalski et al. |
| 2002/0121096 A1 | 9/2002 | Harrison et al. |
| 2002/0162339 A1 | 11/2002 | Harrison et al. |
| 2003/0145380 A1 | 8/2003 | Schmid |
| 2004/0090093 A1 | 5/2004 | Kamiya et al. |
| 2004/0255364 A1 | 12/2004 | Feher |
| 2005/0274118 A1 | 12/2005 | McMurry et al. |
| 2005/0285438 A1 | 12/2005 | Ishima et al. |
| 2006/0053529 A1 | 3/2006 | Feher |
| 2006/0053805 A1 | 3/2006 | Flinner et al. |
| 2006/0087160 A1 | 4/2006 | Dong et al. |
| 2006/0117760 A1 | 6/2006 | Pieronczyk et al. |
| 2006/0117761 A1 | 6/2006 | Bormann |
| 2006/0130491 A1 | 6/2006 | Park et al. |
| 2006/0131325 A1 | 6/2006 | Wauters et al. |
| 2006/0137099 A1 | 6/2006 | Feher |
| 2006/0137358 A1 | 6/2006 | Feher |
| 2006/0150637 A1 | 7/2006 | Wauters et al. |
| 2006/0214480 A1 | 9/2006 | Terech |
| 2006/0273646 A1 | 12/2006 | Comiskey et al. |
| 2007/0086757 A1 | 4/2007 | Feher |
| 2007/0200398 A1 | 8/2007 | Wolas et al. |
| 2007/0251016 A1 | 11/2007 | Feher |
| 2007/0262621 A1 | 11/2007 | Dong et al. |
| 2007/0277313 A1 | 12/2007 | Terech |
| 2008/0000025 A1 | 1/2008 | Feher |
| 2008/0047598 A1 | 2/2008 | Lofy |
| 2008/0087316 A1 | 4/2008 | Inaba et al. |
| 2008/0148481 A1 | 6/2008 | Brykalski et al. |
| 2008/0164733 A1 | 7/2008 | Giffin et al. |
| 2008/0166224 A1 | 7/2008 | Giffin et al. |
| 2008/0173022 A1 | 7/2008 | Petrovski |
| 2008/0223841 A1 | 9/2008 | Lofy |
| 2009/0000031 A1 | 1/2009 | Feher |
| 2009/0025770 A1 | 1/2009 | Lofy |
| 2009/0026813 A1 | 1/2009 | Lofy |
| 2009/0033130 A1 | 2/2009 | Marquette et al. |
| 2009/0126110 A1 | 5/2009 | Feher |
| 2009/0193814 A1 | 8/2009 | Lofy |
| 2009/0218855 A1 | 9/2009 | Wolas |
| 2010/0001558 A1 | 1/2010 | Petrovski |
| 2010/0011502 A1 | 1/2010 | Brykalski et al. |
| 2010/0193498 A1 | 8/2010 | Walsh |
| 2011/0048033 A1 | 3/2011 | Comiskey et al. |
| 2011/0115635 A1 | 5/2011 | Petrovski et al. |
| 2011/0253340 A1 | 10/2011 | Petrovski |
| 2011/0296611 A1 | 12/2011 | Marquette et al. |
| 2012/0080911 A1 | 4/2012 | Brykalski et al. |
| 2012/0114512 A1 | 5/2012 | Lofy et al. |
| 2012/0131748 A1 | 5/2012 | Brykalski et al. |
| 2012/0227182 A1 | 9/2012 | Brykalski et al. |
| 2012/0319439 A1 | 12/2012 | Lofy |

FOREIGN PATENT DOCUMENTS

| | | |
|---|---|---|
| DE | 10101028 | 7/2002 |
| DE | 10115242 | 10/2002 |
| GB | 2390586 | 1/2004 |
| WO | WO 02/11968 | 2/2002 |
| WO | WO 03/051666 | 6/2003 |

OTHER PUBLICATIONS

Feher, Steve, Thermoelectric Air Conditioned Variable Temperature Seat (VTS) & Effect Upon Vehicle Occupant Comfort, Vehicle Energy Efficiency, and Vehicle Environment Compatibility, SAE Technical Paper, Apr. 1993, pp. 341-349.

Lofy, J. et al., Thermoelectrics for Environmental Control in Automobiles, Proceeding of Twenty-First International Conference on Thermoelectrics (ICT 2002), published 2002, pp. 471-476.

* cited by examiner

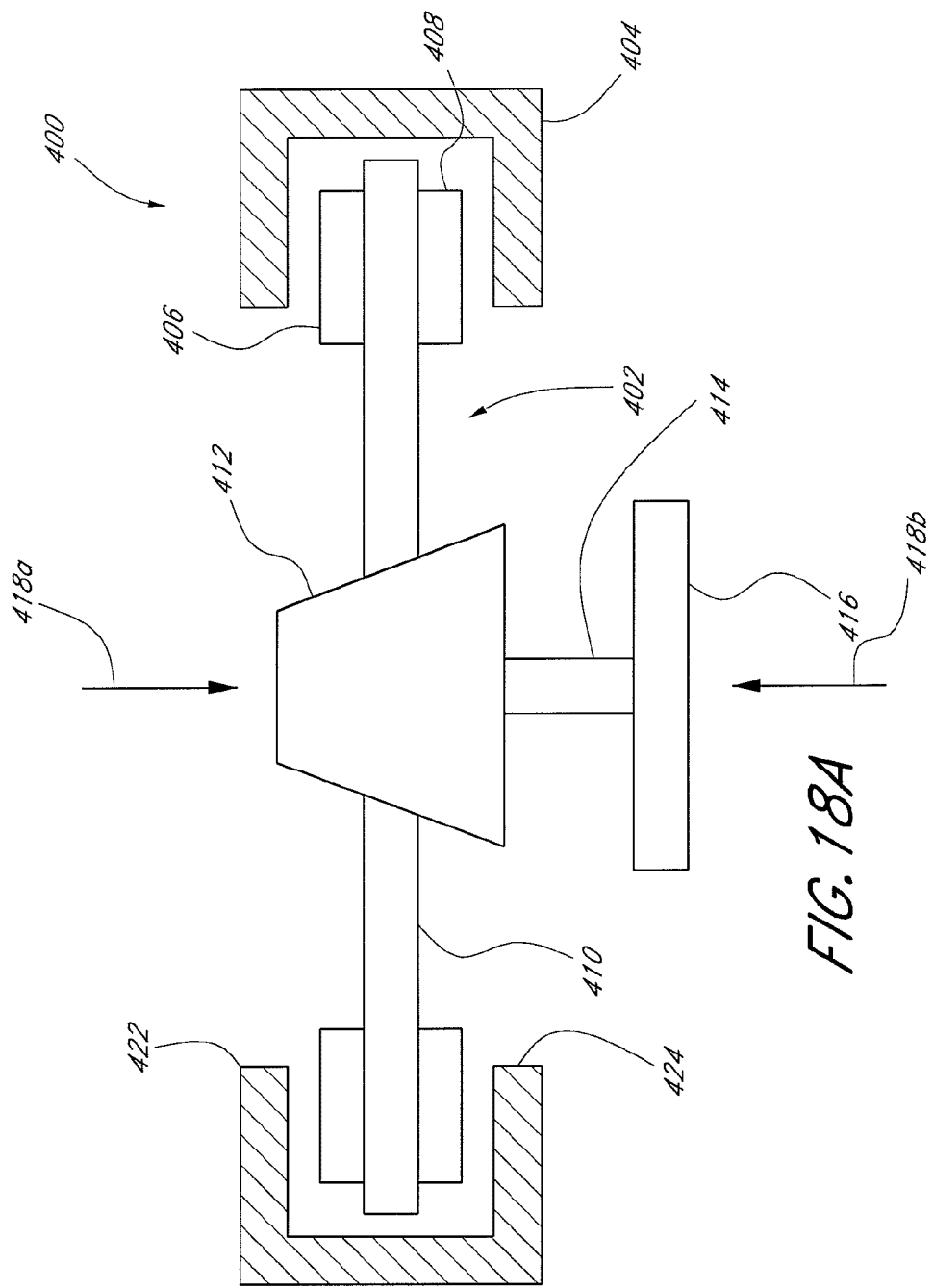

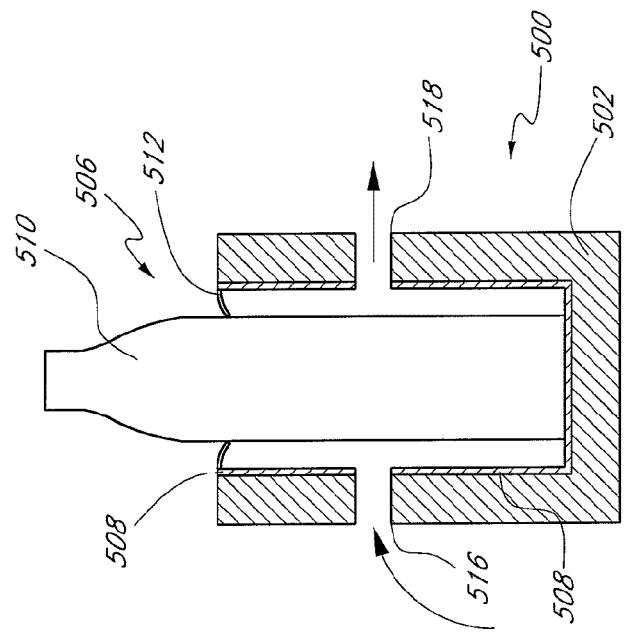
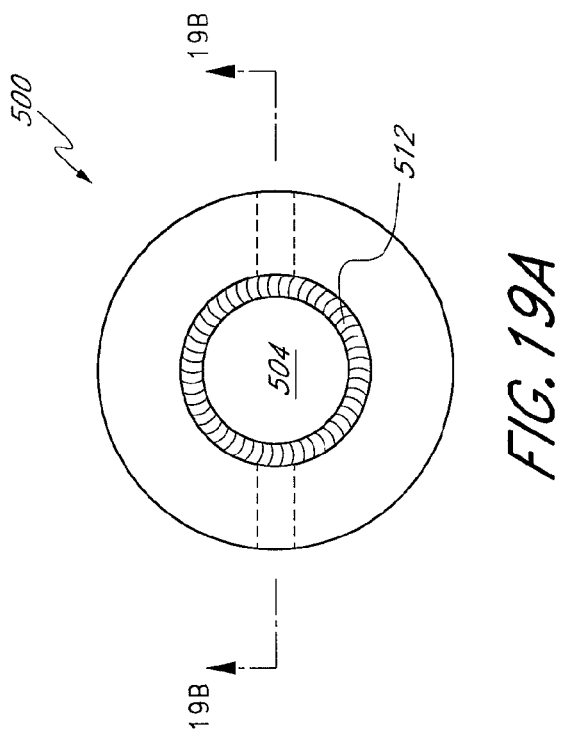

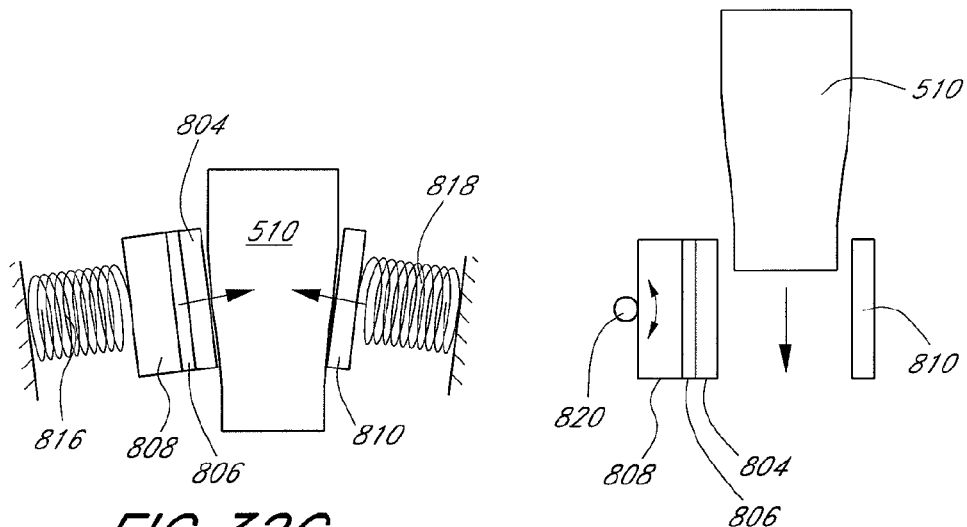
FIG.32C
FIG.32D
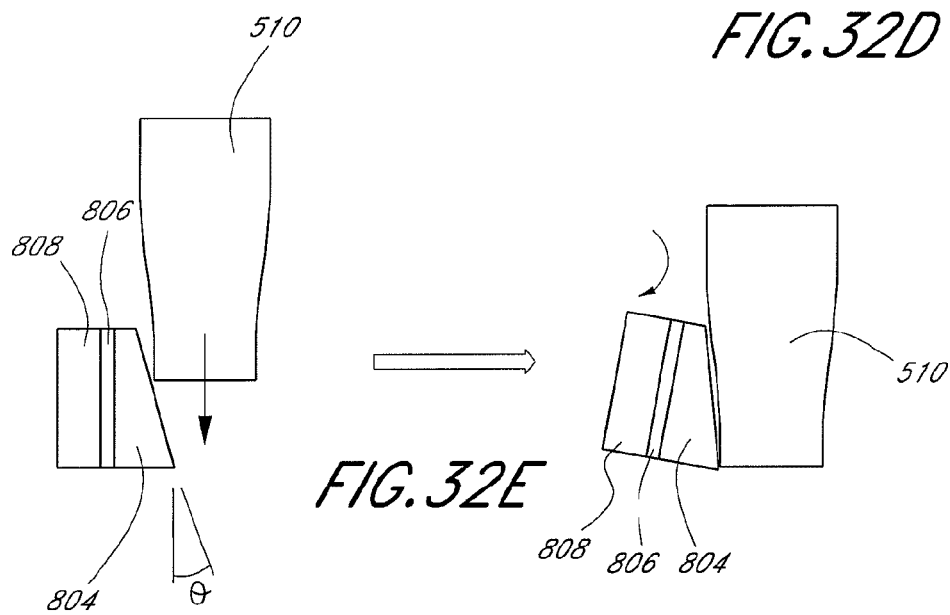
FIG.32E
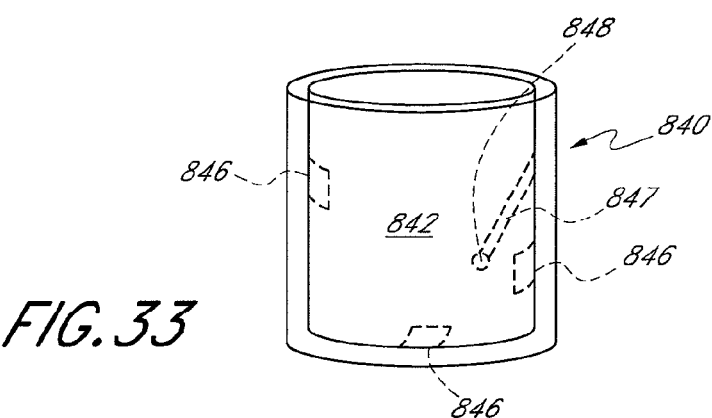
FIG.33

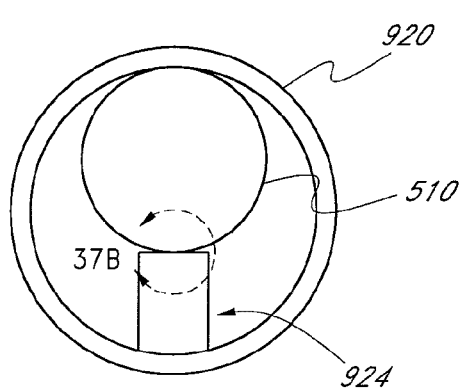
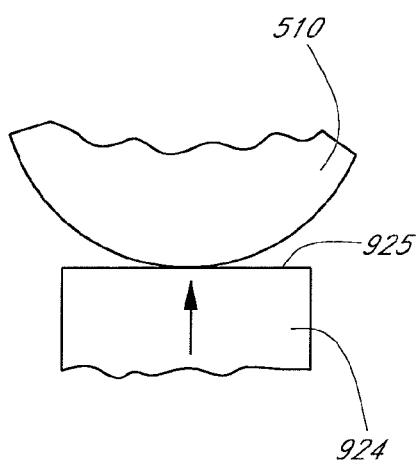
FIG.37A  FIG.37B
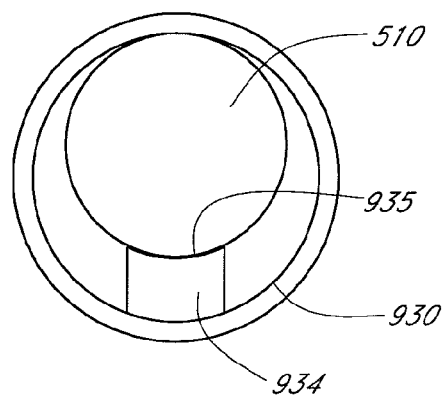
FIG.38

← INCREASING CONTAINER DIAMETER →

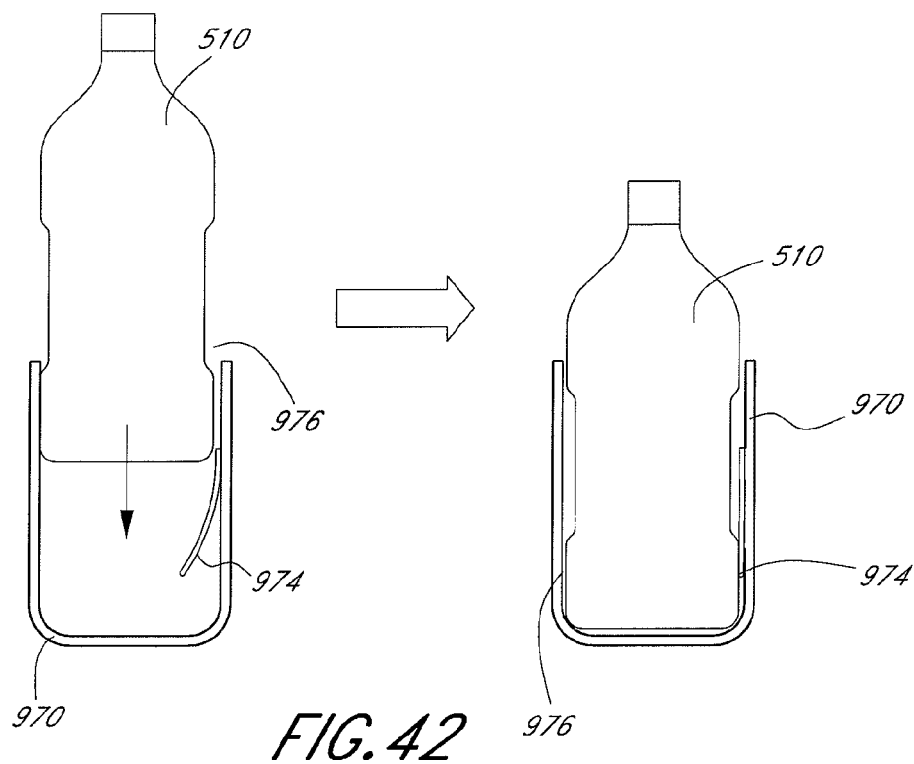
FIG. 42
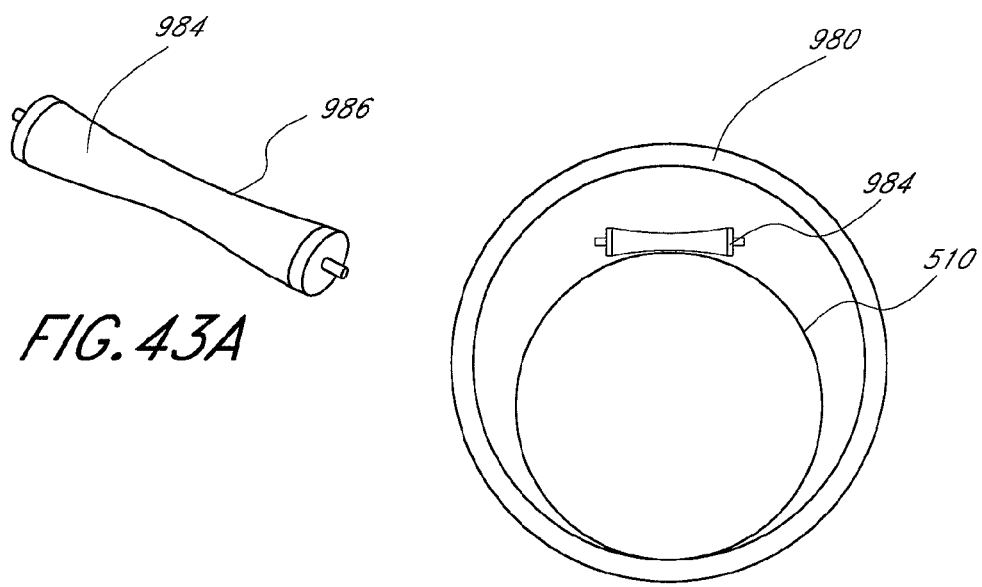
FIG. 43A
FIG. 43B

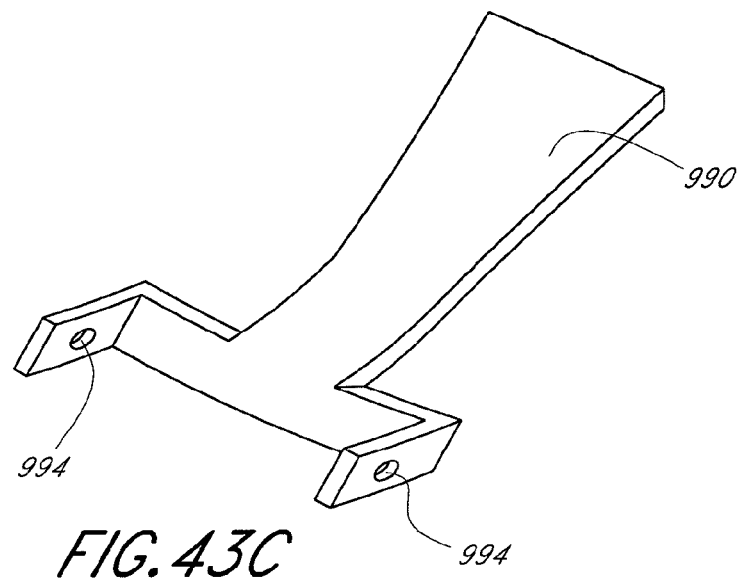
FIG. 43C
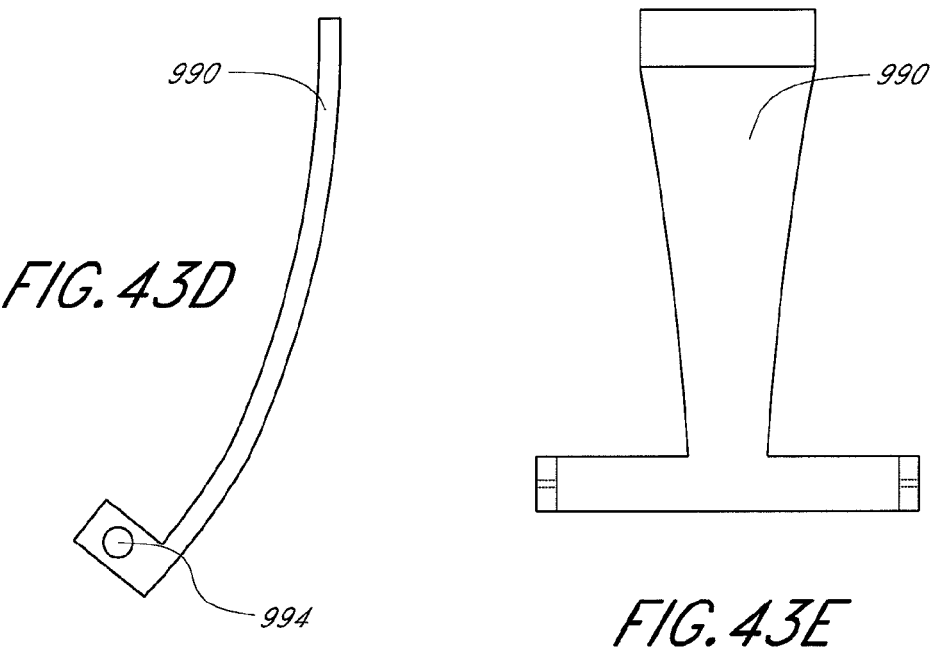
FIG. 43D
FIG. 43E

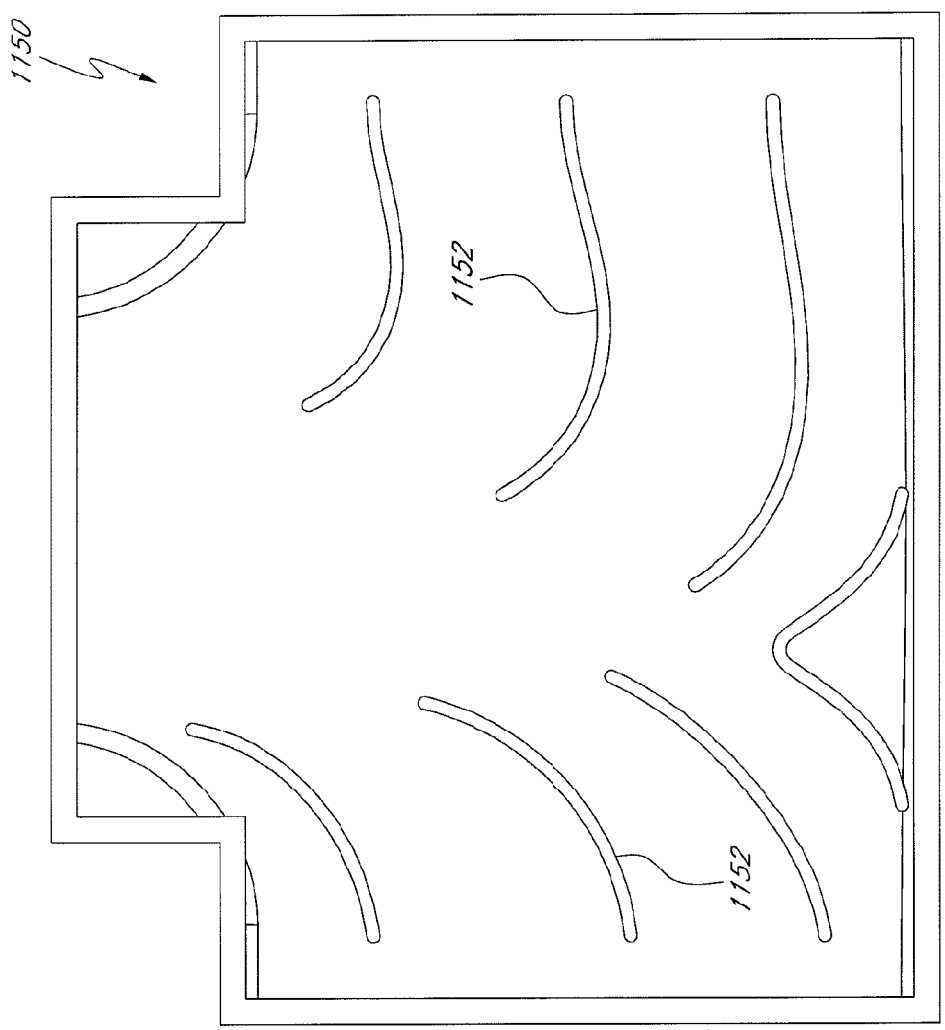

CLIMATE CONTROLLED BEVERAGE CONTAINER

CROSS-REFERENCE TO RELATED APPLICATIONS

This application is a continuation application of U.S. patent application Ser. No. 11/669,117, filed Jan. 30, 2007, which claims the priority benefit under 35 U.S.C. §119(e) of U.S. Provisional Application No. 60/763,460, filed Jan. 30, 2006 and U.S. Provisional Application No. 60/849,948, filed Oct. 6, 2006, the entireties of all of which are hereby incorporated by reference herein.

BACKGROUND

1. Field

This application relates to a temperature control system for a container. More specifically, this application relates to vehicle cup holders and cooling systems configured to receive and cool or heat a beverage.

2. Description of the Related Art

Most cars and other vehicles include one or more cup holders which are configured to receive a can, cup, bottle or other type of beverage container. Recently, some luxury vehicles have been provided with a cooled container. The cooled container can be used to store drinks and/or food at a temperature that is below the ambient temperature in the vehicle. Often, the container is cooled by a cooling system that includes a thermoelectric device (TED), which has a hot side and a cold side. A heat sink in the form of a waste side heat exchanger is thermally coupled to the hot side of the TED. A pump or fan is provided to promote convective heat transfer through the waste side heat exchanger. In some instances, the cold side of the TED is conductively coupled to the container. In other instances, the cool side of the TED is used to cool air, which, in turn, cools the container through convection.

SUMMARY OF THE INVENTION

There exists a need for a cup holder assembly that is configured to cool and/or heat a beverage container placed therein. Accordingly, one aspect of the present invention comprises a climate controlled container system for a vehicle. In some embodiments, the climate controlled container system includes a container comprising walls that define a cavity and a conduction element configured to cool the cavity and a cooling system. In some embodiments, the cooling system comprises a housing, an inlet in the housing, a fluid passage defined at least in part by the housing and a thermoelectric device positioned within the housing and having a cold side and a hot side. According to some embodiments, the cold side of the thermoelectric device is conductively coupled to the conduction element, while the hot side of the thermoelectric device is conductively coupled to a heat exchanger that is positioned within the fluid passage. The cooling system further comprises a fluid transfer device positioned within the housing. The fluid transfer device, which includes a fan configured for rotation about an axis, is configured to transfer air from the inlet to the fluid passage. In some embodiments, the fluid transfer device is configured such that the heat exchanger is positioned between the thermoelectric device and the fan of the fluid transfer device.

In one embodiment, the fan is a radial fan. In other embodiments, the fan is an axial fan. In some embodiments, the axis of the fan extends through the thermoelectric device. In yet other embodiments, the axis of the fan extends through the heat exchanger. In still another embodiment, the flow through the fluid passage is substantially perpendicular to the flow entering the fan.

According to another embodiment, a climate controlled container system for a vehicle includes a container comprising walls that define a cavity, an inlet into the cavity and an outlet out of the cavity, a thermoelectric device that comprises a cold side and a hot side, a hot side heat exchanger that is conductively coupled to the hot side of the thermoelectric device, a cold side heat exchanger that is conductively coupled to the cold side of the thermoelectric device, a cold side inlet passage that places the cold side heat exchanger in fluid communication with the inlet of the container, a fluid transfer device, a recirculation passage that is in fluid communication with the outlet of the cavity and the cold side inlet of the fluid transfer device, a cold side fluid passage that is in fluid communication with the cold side outlet of the fluid transfer device and the cold side heat exchanger and a hot side fluid passage that is in communication with the hot side outlet of the fluid transfer device and the hot side heat exchanger. According to some embodiments, the fluid transfer device includes a rotating fan, a cold side inlet, a cold side outlet, a hot side inlet, and a hot side outlet, the fluid transfer device being configured such that fluid entering the cold side inlet is transferred to the cold side outlet and fluid entering the hot side inlet is transferred to the hot side outlet.

In one embodiment, a cooled cup holder includes a container that defines a cavity having a first open end and a sealing member configured to form a seal about a beverage container inserted through the first open end and a cooling system that comprises a thermoelectric device. The cooling system is configured to provide cooled air to the cavity of the container. In other embodiments, the cup holder assembly includes two or more cup holder cavities, each of which can be independently temperature controlled.

In some embodiments, a cup holder assembly comprises a housing forming a first cup holder and a second cup holder, each cup holder defining a cavity having a first open end. In addition, a cup holder assembly includes a cooling system that comprises a first thermoelectric device having a first side conductively coupled to the first cup holder and a heat exchanger positioned within a passage and a second thermoelectric device having a first side conductively coupled to the second cup holder and a heat exchanger positioned within the passage, and a fluid transfer device configured to transfer air through the passage and to the heat exchangers of the first and second thermoelectric devices. In other embodiments, a cup holder assembly is configured so that each cup holder can be cooled and/or heated independently of the other cup holders.

According to other embodiments, the cup holder further comprises vanes positioned in the passage. The vanes are configured to distribute the air substantially evenly to the heat exchangers of the first and second thermoelectric devices. In other embodiments, the cup holder assembly further comprises vanes positioned in the passage, the vanes being configured to distribute the air substantially evenly across the heat exchangers of the first and second thermoelectric devices.

In other embodiments, a cup holder includes a housing that defines a cavity having a first open end, a cooling system that comprises a thermoelectric device and a sensor configured to sense the presence and/or the temperature of a container in the cavity.

In some embodiments, a container holder comprises a housing that includes a side wall that defines a cavity with at least one open end and that extends about a generally vertical axis, a cooling system that comprises a first thermoelectric device, a heat exchanger and a fluid transfer device configured to transfer air through the heat exchanger and means for tilting a cup with tapered sides against the side wall of the housing. Further, the thermoelectric device being conductively coupled to at least a portion of the housing.

In other embodiments, a container holder comprises a housing that includes a side wall that defines a cavity with at least one open end and that extends about a generally vertical axis, a moveable member extending from the side wall and configured to apply an inwardly directed force against a container positioned within the cavity and a cooling system that comprises a first thermoelectric device, a heat exchanger and a fluid transfer device configured to transfer air through the heat exchanger, the thermoelectric device being conductively coupled to at least a portion of the moveable member.

BRIEF DESCRIPTION OF THE DRAWINGS

These and other features, aspects and advantages of the present invention are described with reference to drawings of certain preferred embodiments, which are intended to illustrate, but not to limit, the present invention. It is to be understood that the attached drawings are for the purpose of illustrating concepts of the present invention and may not be to scale.

FIG. 18A is a schematic cross-sectional view of another embodiment of a fluid transfer device;

FIG. 19A is a top view of an embodiment of a cup holder;

FIG. 19B is a cross-sectional view of the cup holder taken through line 19B-19B of FIG. 19A;

FIG. 32C illustrates a side view of yet another embodiment for biasing a thermoelectric device;

FIG. 32D illustrates a side view of still another embodiment for biasing a thermoelectric device;

FIG. 32E illustrates time sequential side views of one embodiment for biasing a thermoelectric device for a cup holder;

FIG. 33 illustrates an embodiment of a cup holder with temperature sensors;

FIG. 37A illustrates a top view of an embodiment for biasing a container against a wall of a cup holder;

FIG. 37B illustrates a detailed top view of the cup holder of FIG. 37A;

FIG. 38 illustrates a top view of another embodiment for biasing a container against a wall of a cup holder;

FIG. 42 illustrates side views of one embodiment of a cup holder which is configured to receive a bottle;

FIG. 43A illustrates a perspective view of a roller pusher for a cup holder according to one embodiment;

FIG. 43B illustrates a top view of an embodiment of a cup holder which includes the roller pusher of FIG. 43A;

FIG. 43C illustrates a perspective view of a member configured to receive roller pusher for a cup holder according to one embodiment;

FIG. 43D illustrates a side view of the member of FIG. 43C;

FIG. 43E illustrates a top view of the member of FIG. 43C;

FIGS. 48A-48J are various views of an embodiment of a dual cup holder arrangement for a center console of an automobile.

DETAILED DESCRIPTION OF THE PREFERRED EMBODIMENTS

Various containers comprising cooling systems are disclosed herein. As discussed, such containers can have different shapes, sizes and configurations. The containers can be cooled (or heated) using a variety of methods, such as, for example, convective, conductive and/or other techniques.

Figure 1:
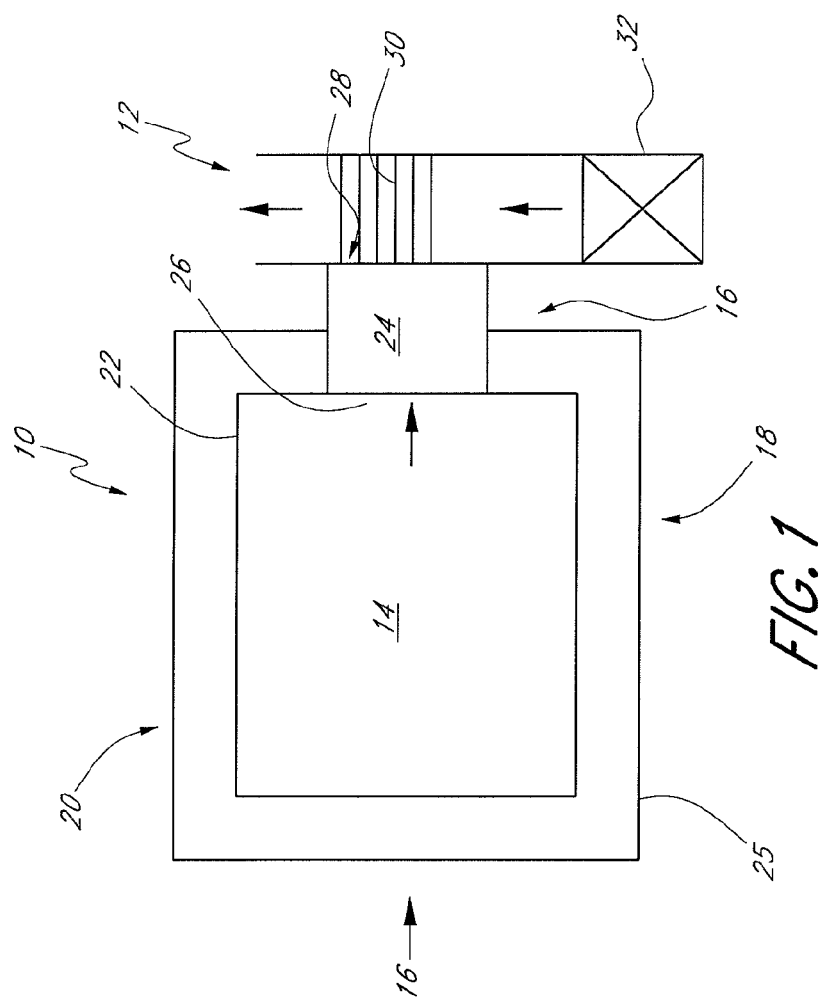
FIG. 1 is a schematic illustration of a container and cooling system in accordance with one embodiment.

FIG. 1 is a schematic illustration of container 10 and a cooling system 12 according to an embodiment of the present invention. In one embodiment, the container 10 and cooling system 12 are configured to be positioned within a vehicle (e.g., an automobile, airplane, etc.). In other embodiments, the container 10 and cooling system 12 can be used as a portable cooler. With respect to embodiments for an automobile, the container 10 can be positioned at various locations within the automobile, such as, for example, within the glove box, between the two front and/or back seats, within the trunk, in door panels, cup holders and/or along the sides of the interior (e.g., interior panels). In another embodiment, the container can be positioned within a bed of a pickup truck (e.g., within a tool container box or as a separate unit).

In the illustrated embodiment of FIG. 1, the container 10 defines an enclosed, partially-enclosed or enclosable interior space 14. Thus, the container can include one or more walls 16, a floor 18 and a top 20. The container 10 can also include a door or lid (not shown) to provide access to the interior space 14. The container 10 includes a conduction element 22, which can be placed on or near the interior 14 of the container 10. The conduction element 22 is preferably formed from a highly conductive material (e.g., copper, aluminum, etc.). The conduction element, in turn, can be surrounded by insulation 25, which can form an exterior surface of the container 10. The conduction element 22 can be positioned on or define the interior of the walls 16, floor 18, top 20 and/or door of the container 10 and/or any portion thereof.

With continued reference to FIG. 1, the cooling system 12 includes a thermoelectric device 24. As will be explained below, the thermoelectric device 24 is configured to cool the conduction element 22. In this manner, the interior space 14 of the container 10 is cooled through conduction. Thus, items (food, drinks, electronic devices, film) stored in the container 10 can be maintained at a temperature that is cooler than the environment outside the container 10.

In the illustrated embodiment, the thermoelectric device 24 comprises a cold side 26 and a hot side 28. As will be explained below, the cold side 26 of the device 24 is placed into conductive contact with the conduction element 22. The hot side, in turn, is placed into conductive contact with a heat sink/exchanger 30. In one embodiment, the heat sink 30 comprises convention elements (e.g., fins), which are configured to remove and/or transfer heat through convection.

It should be appreciated that in other embodiments the cold side 26 and hot side 28 can be reversed. That is, an advantage of thermoelectric devices 24 is that they can be used to provide heating or cooling. Thus, in a different mode of operation the "cold" side 26 becomes the "hot" side and the "hot" side 28 becomes the "cold" side. In this mode, the heat sink 30 is used to transfer heat from the ambient air (i.e., remove heat from the ambient air) and transfer it to the "hot" side 26 of the device. Accordingly, it should be appreciated that in the description herein the terms "cold side" and "hot side" can be used interchangeably depending upon whether heating or cooling of the container is desired. Moreover, in some embodiments, the cold and hot sides are referred to as the first and second sides of the thermoelectric device in order to emphasize the heating and cooling modes of the device.

With continued reference to FIG. 1, the cooling system can include a fluid transfer device 32 (e.g., a fan), which is configured to force air or another cooling fluid over the heat sink 30 to aid convection through the heat sink 30.

Figure 2:
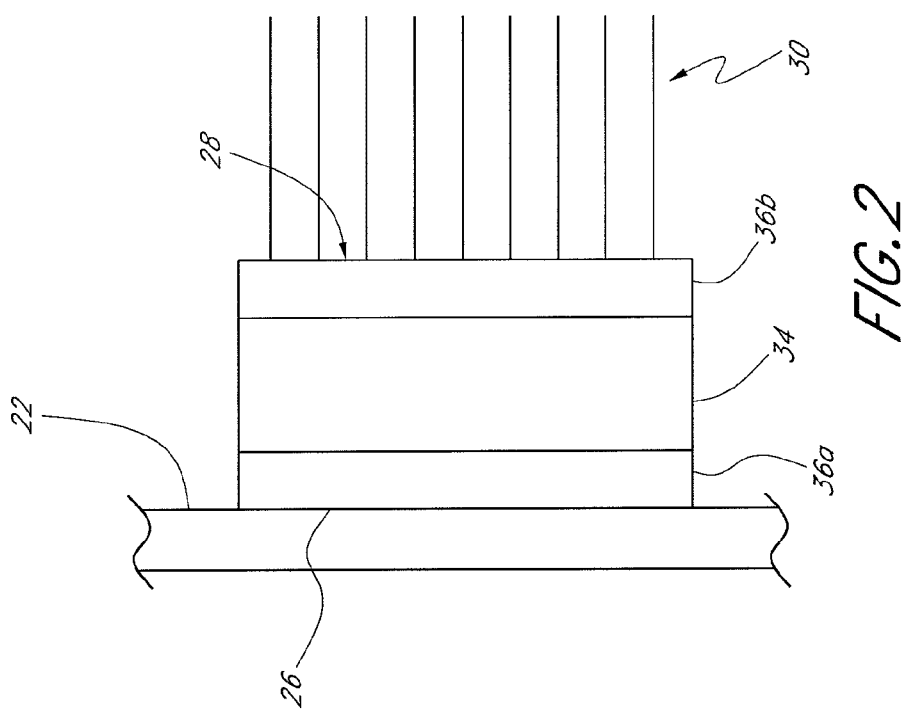
FIG. 2 is a schematic illustration of a thermoelectric device of the cooling system of FIG. 1.

The thermoelectric device 24 is preferably a Peltier device. One embodiment of such a device is shown schematically in FIG. 2. As described in the above embodiment, the thermoelectric device 24 includes the cold side 26, which is conductively connected to the conduction element 22, and a hot side 28 which is conductively connected to the heat exchanger 30. The Peltier device 24 also comprises at least one pair of dissimilar materials 34 connected electrically in series and thermally in parallel. The dissimilar materials 34 can be mounted between a pair of plates 36a, 36b positioned on the cold and hot sides 26, 28 of the device 24. The plates 36a, 36b can preferably provide for heat conduction and electrical insulation. A thermal interface material (e.g., grease, pad or solder) can be used to conductively couple the cold side plate 36a to the conduction member 22. In a similar manner, a thermal interface (e.g., grease, pad or solder) can be used to conductively couple the hot side plate 36b to a waste heat exchanger 30. In other embodiments, one or more intermediate elements can be provided between the plates 36a, 36b and the conduction element 22 and/or heat exchanger 30. The waste heat exchanger 30 is configured transfer heat to (and/or withdraw heat from) the ambient air. The fluid device 32 (see FIG. 1) is preferably configured to direct fluid through the waste heat exchanger 30 to facilitate the transfer of heat through convention.

Typically, the dissimilar materials 34 comprise a series of n-type and p-type semiconductor elements that are connected electrically in series and thermally in parallel. An electrical circuit is configured to pass current through the dissimilar materials 34. Depending on the direction of current passing through the thermoelectric device 24, one side of the device will be heated and the opposing side will be cooled. In the illustrated embodiment, the thermoelectric device 24 is configured such that the cold side 26 is cooled and the hot side 28 is heated when current is routed to the device 24. However, the device 24 can be configured such that the current can be reversed, causing the cold side 26 to be heated and the hot side 28 to be cooled.

Figure 3:
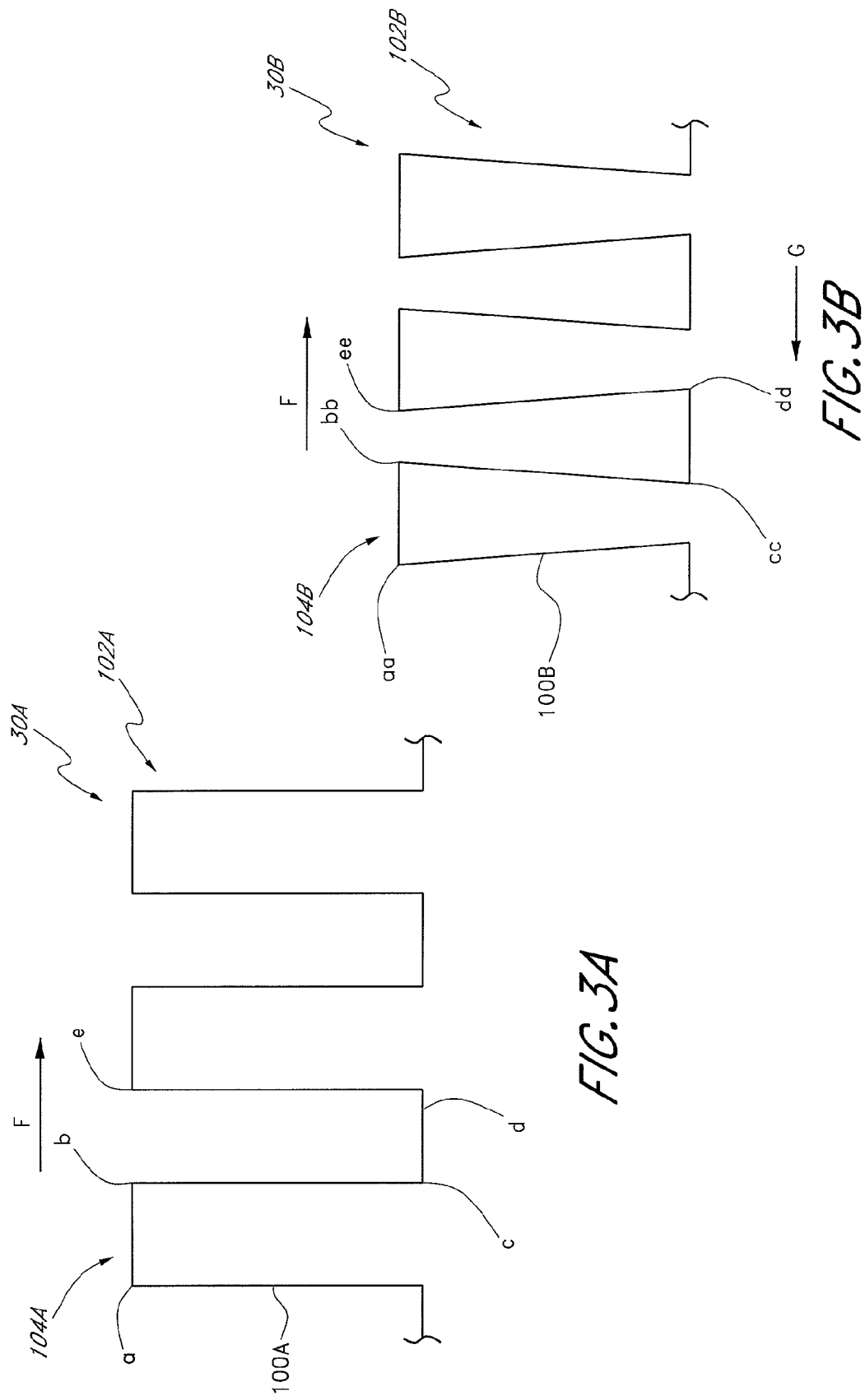
FIG. 3A is a schematic illustration of an embodiment of a heat exchanger.
FIG. 3B is a schematic illustration of another embodiment of a heat exchanger.

FIGS. 3A and 3B illustrate embodiments of the waste side heat exchanger 30A, 30B that can be positioned within a heat exchanger passage as described herein. In the embodiment illustrated in FIG. 3A, the heat exchanger 30A comprises a thin sheet 100A of highly conductive material (e.g., copper). The thin sheet is then bent into a plurality of folds 102A. As shown, on a first side 104A, a first fold a is provided such that the sheet 100A extends in a first direction F. A second fold b is provided such that the sheet 100 extends downwardly (with respect to orientation shown in FIG. 3A). A third fold c is then provided such that sheet 100A extends in the first direction F again. A fourth fold d is provided such that the sheet extends upwardly. A fifth fold e is provided and the pattern is repeated again.

In the alternative embodiment depicted in FIG. 3B, a thin sheet 100B is similarly bent into a plurality of folds 102B. As shown, on a first side 104B, a first fold aa is provided such that the sheet 100B extends in a first direction F. A second fold bb is provided such that the sheet 100B extends downwardly (with respect to orientation shown in FIG. 3B) and is slanted in a direction G that is generally opposite to the first direction F. A third fold cc is then provided such that sheet 100B extends in the first direction F again. A fourth fold dd is provided such that the sheet extends upwardly and is slanted in the second direction G, which is opposite to the first direction F. A fifth fold ee is provided and the pattern is repeated again.

With respect to FIGS. 3A and 3B, the flow is generally directed in a direction that is into and out of the page. The illustrated embodiments of the heat exchanger 30 have been proven to be highly effective. However, it is anticipated that modified embodiments can utilize heat exchangers of different or modified configurations. For example, various combinations of fins, porous or fibrous materials, cells (e.g., honeycombed shapes) can be used.

Figure 4:
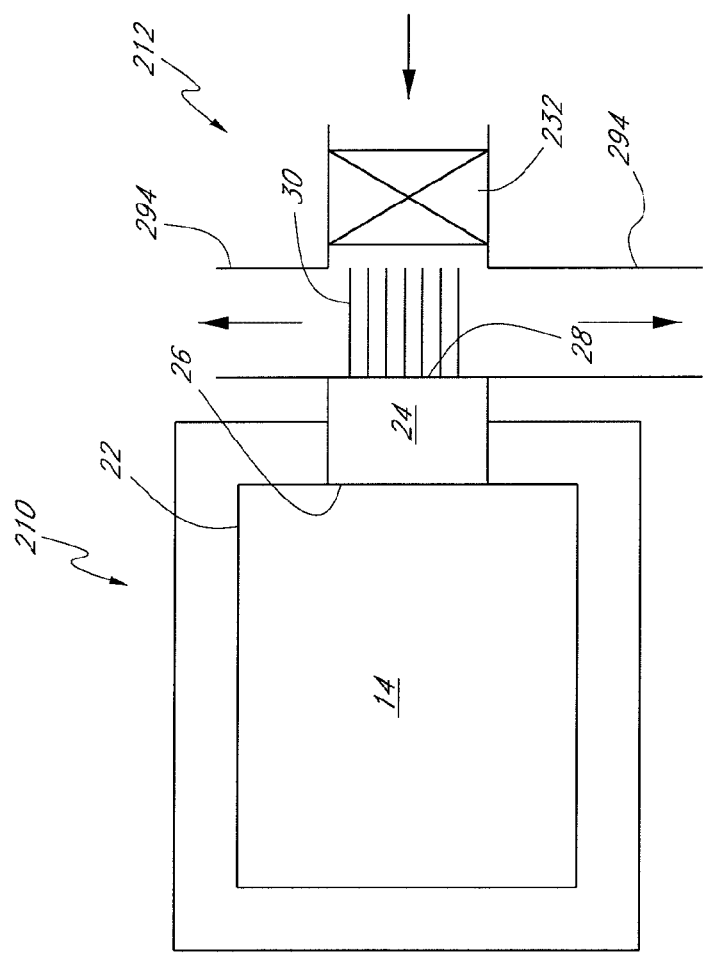
FIG. 4 is a schematic illustration of another embodiment of a container and cooling system.

FIG. 4 is a schematic illustration of another embodiment of a container 210 and cooling system 212. In this embodiment, reference numbers from previous embodiments are used to identify components that are similar or substantially similar. The illustrated embodiment includes a thermoelectric device 24 with a cold side 26 and a hot side 28. The cold side 26 is conductively coupled to the conductive element 22 of the container 210. The hot side 28 is conductively coupled to the heat exchanger 30. As shown, the fluid transfer device 232 is in the form of an axial fan. The heat exchanger 30 is preferably positioned behind the axial fan 232 and in front of the thermoelectric device 24. The air from the axial fan 232 is directed towards the heat exchanger 30 in a first direction. Then, either within or after the heat exchanger 30, the air is turned approximately 90 degrees towards an outlet 294. The system 212 can have one outlet 294 or a plurality of outlets 294 as shown in FIG. 4.

Figure 5:
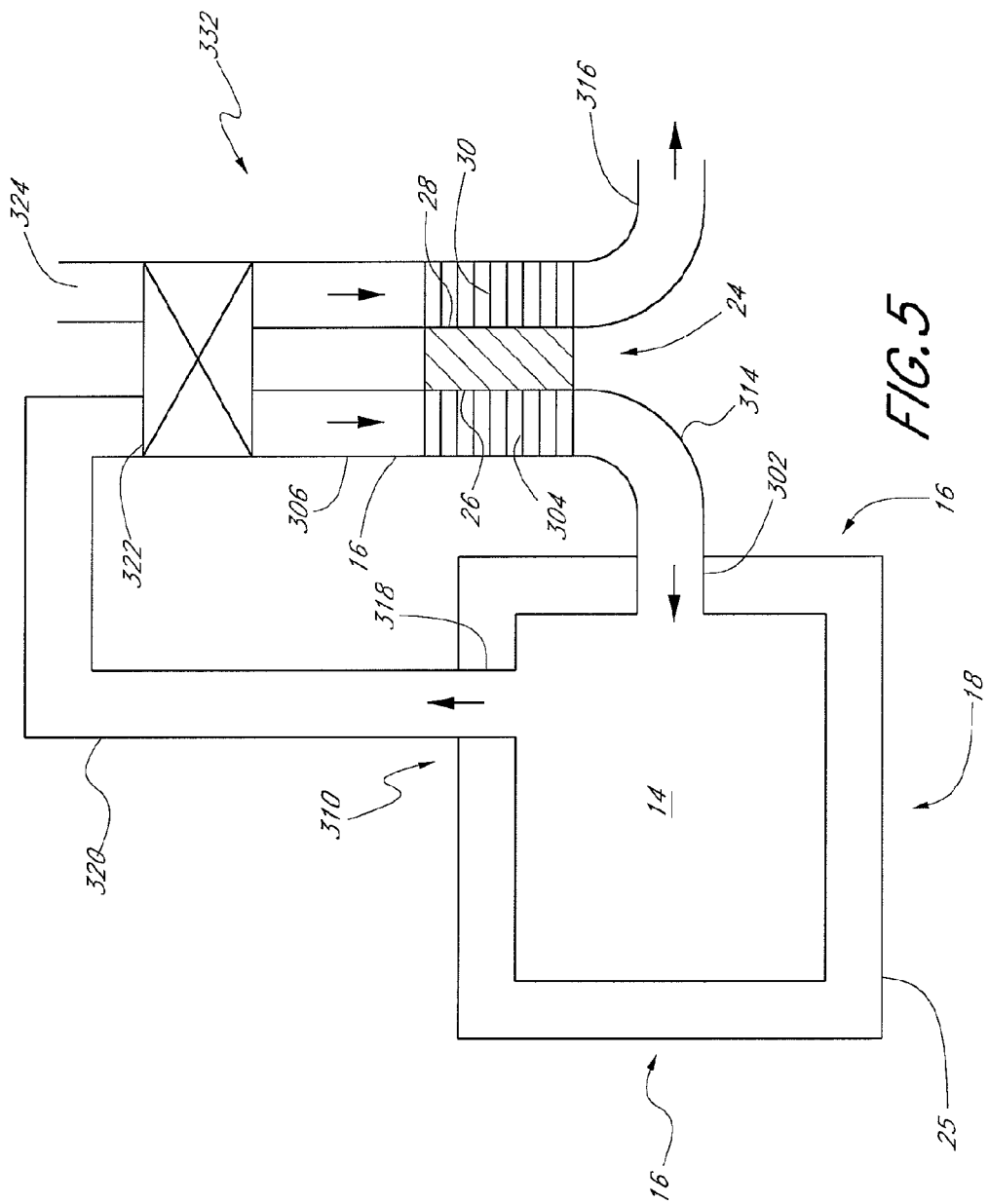
FIG. 5 is a schematic illustration of another embodiment of a container, cooling system and a fluid transfer device.

FIG. 5 is a schematic illustration of another embodiment of a container 310 and cooling system 312. In this embodiment, reference numbers from previous embodiments are used to identify components that are similar or substantially similar to the previous embodiment.

As shown, the container 310 can include one or more walls 16, a floor 18 and a top 20. The container 10 can also include a door or lid (not shown) to provide access to the interior space 14. The container 10 can include insulation 25, which can form an exterior surface of the container 10.

In this embodiment, the interior 14 is cooled through convection. Accordingly, an inlet 302 is provided for supplying cooled air to the interior 14 of the container 310. The cooling system 312 includes a thermoelectric device 24, which can be configured substantially as described above. The thermoelectric device 24 includes a cold side 26 and a hot side 28. The hot side 28 can be conductively coupled to a waste side heat exchanger 30 as described above. In this embodiment, the cold side 26 of the thermoelectric device 24 is conductively coupled to a cold side heat exchanger 304.

With continued reference to FIG. 5, a single fluid transfer device 332 can be provided to provide fluid to the heat exchangers 30, 304. The transfer device 332 can be provided with a cold side outlet 306 and a hot side outlet 308. The cold side outlet 306 directs fluid to the cold side heat exchanger 304 where the air is cooled before being transferred through an outlet passage 314 to the inlet 302 of the container 310. In a similar manner, the hot side outlet 308 directs fluid to the hot side heat exchanger 30 which is then discharged through a hot side outlet 316. In this manner, the thermoelectric device 24 can provide cooled air to the interior 14 of the container 310.

The container 310 can also include an outlet 318, which is connected to a recirculation passage 320. The recirculation passage 320, in turn, is connected to a first inlet 322 of the fluid transfer device 332. The fluid transfer device 332 preferably also includes a second inlet 324. The fluid transfer device 332 is preferably configured such that the air from the first inlet 322 is delivered to the cold side heat exchanger 304 through the cold side outlet 306. The fluid transfer device 332 is also preferably configured such that the air from the second inlet 324 is delivered to the hot side heat exchanger 30 through the hot side outlet 308. In this manner, the cold air delivered to the interior 14 of the container 310 can be recirculated to improve response times and cooling efficiencies. In modified embodiments, the cooling system can include two fluid transfer devices that are individually associated with the cool and hot side heat exchangers 304, 30.

With reference to FIGS. 6-10, another embodiment of the cooling system 12 will now be described. In this embodiment, the cooling system 12 advantageously provides a compact arrangement in which the thermoelectric device 24 (FIG. 10) and the fluid transfer device 32 are arranged in manner which conserves space. FIGS. 6-10 are front perspective, top, rear perspective, rear and cross-sectional views, respectively, of the cooling system 12. In the orientation shown, the cooling system 12 includes a top side 40, a bottom side 42, a rear side 44, a front side 46, a left side 48 and a right side 50.

With continued reference to FIGS. 6-10, the cooling system 12 comprises a housing or shell 52. In one embodiment, the housing 52 includes rear and front halves 54a, 54b. The housing 52 can be formed from of a variety of materials. In one embodiment, each half 54a, 54b is formed from a suitable plastic through a molding process. Alternatively, any other methods for manufacturing the halves 54a, 54b can be used (e.g., thermoforming, etc.). Each half 54a, 54b is preferably provided with corresponding connection bosses 56 such that the halves 54a, 54b can be joined together via fasteners (e.g., bolts or screws). One or more other connection methods can be used, either in lieu of or in addition to the fasteners. As will be explained below, the housing 52 is configured to house the thermoelectric device 24 and the fluid transfer device 32. The housing 52 is also configured to define various flow paths between the fluid transfer device 32 and the thermoelectric device 24.

Figure 6:
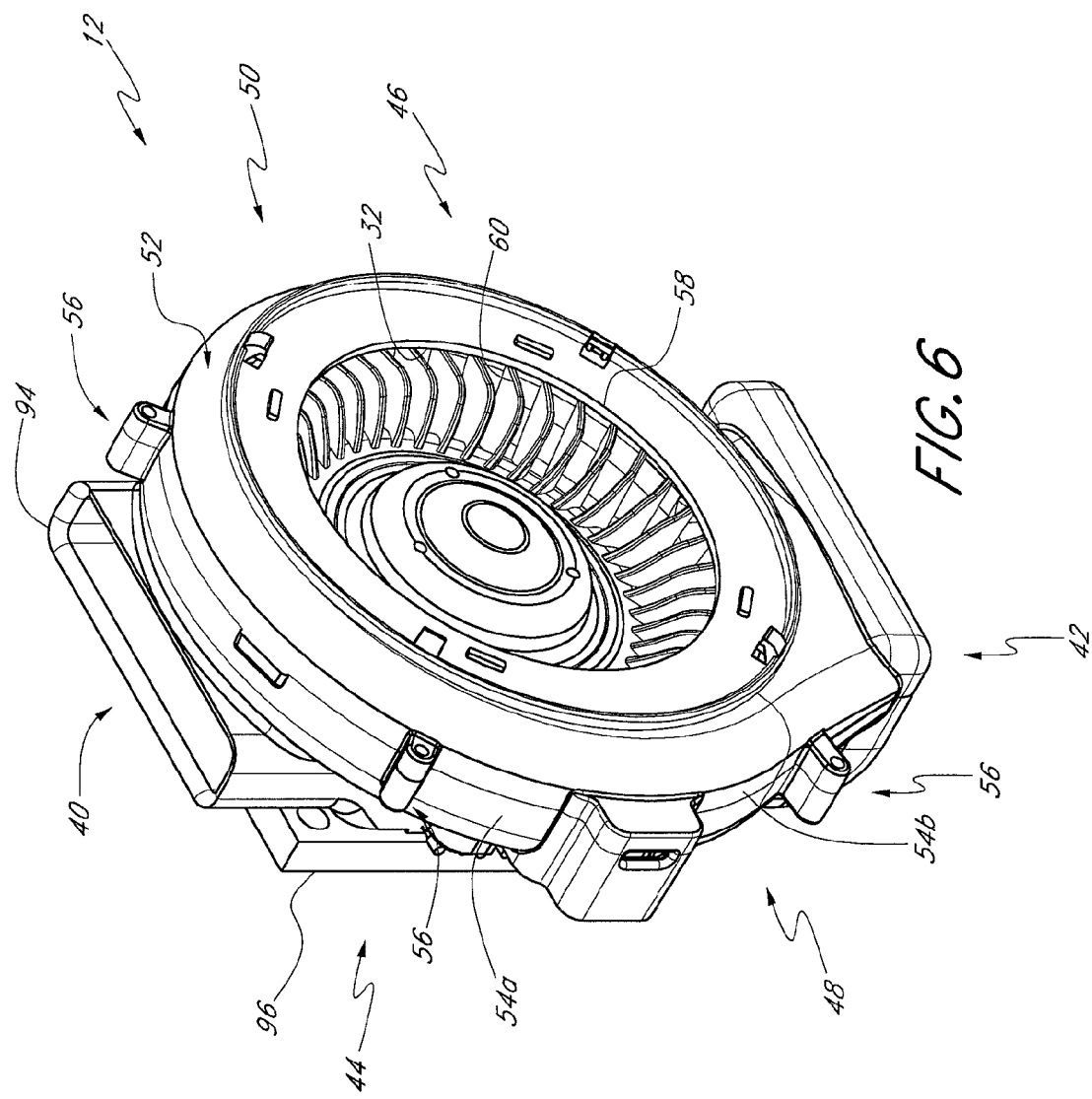
FIG. 6 is a front perspective view of an embodiment of a cooling system.
Figure 7:
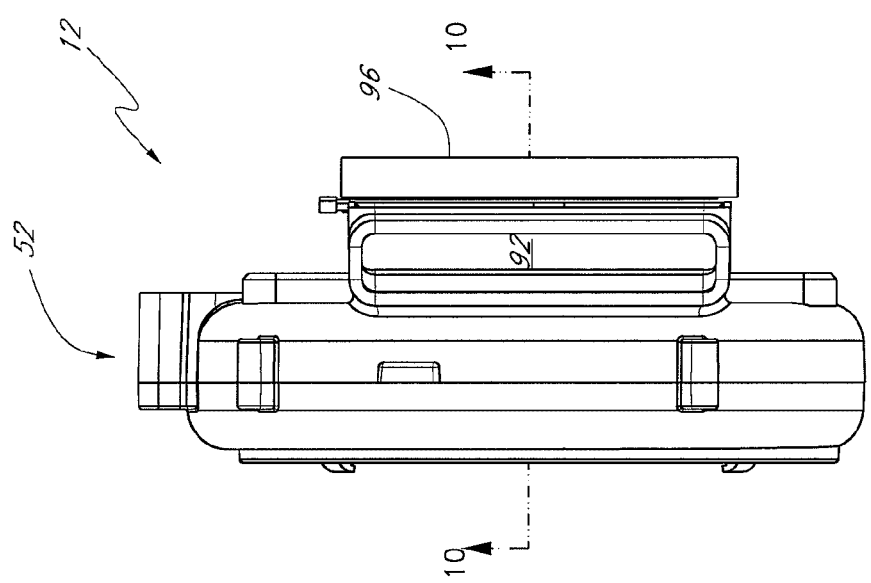
FIG. 7 is a top view of the cooling system of FIG. 6.
Figure 8:
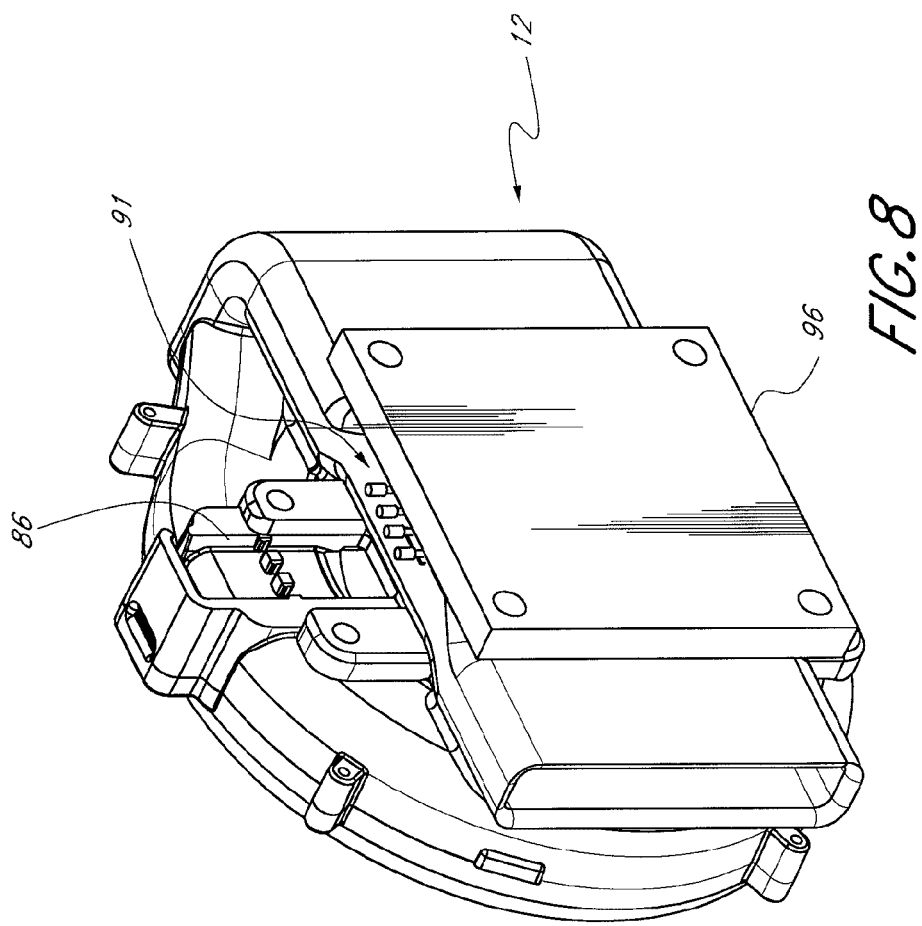
FIG. 8 is rear perspective view of the cooling system of FIG. 6.
Figure 9:
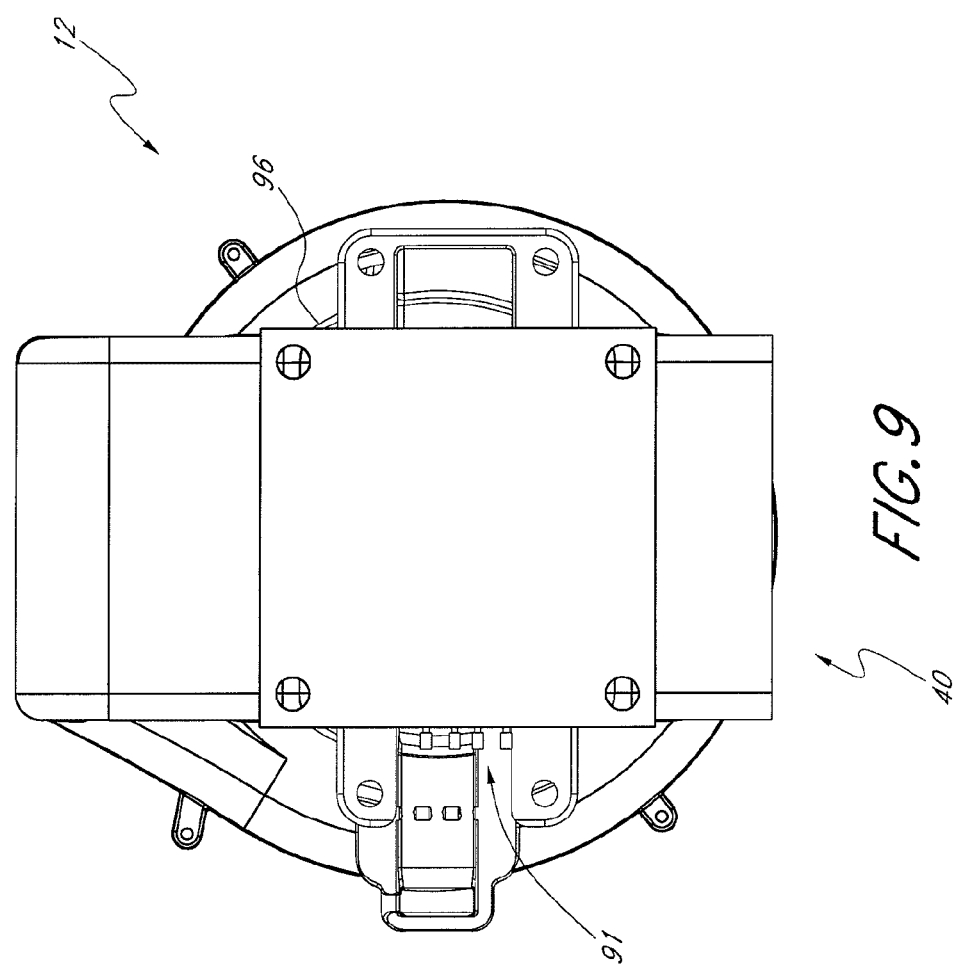
FIG. 9 is a rear view of the cooling system of FIG. 6.

In the illustrated embodiments, the front side 46 of the housing 52 defines a generally circular inlet opening 58 (see FIG. 6). Positioned below the opening 58 is the fluid transfer device 32. In this embodiment, the fluid transfer device 32 comprises a radial or centrifugal fan 61. Accordingly, the fluid transfer device 32 includes a series of radial fan blades 60.

Figure 11:
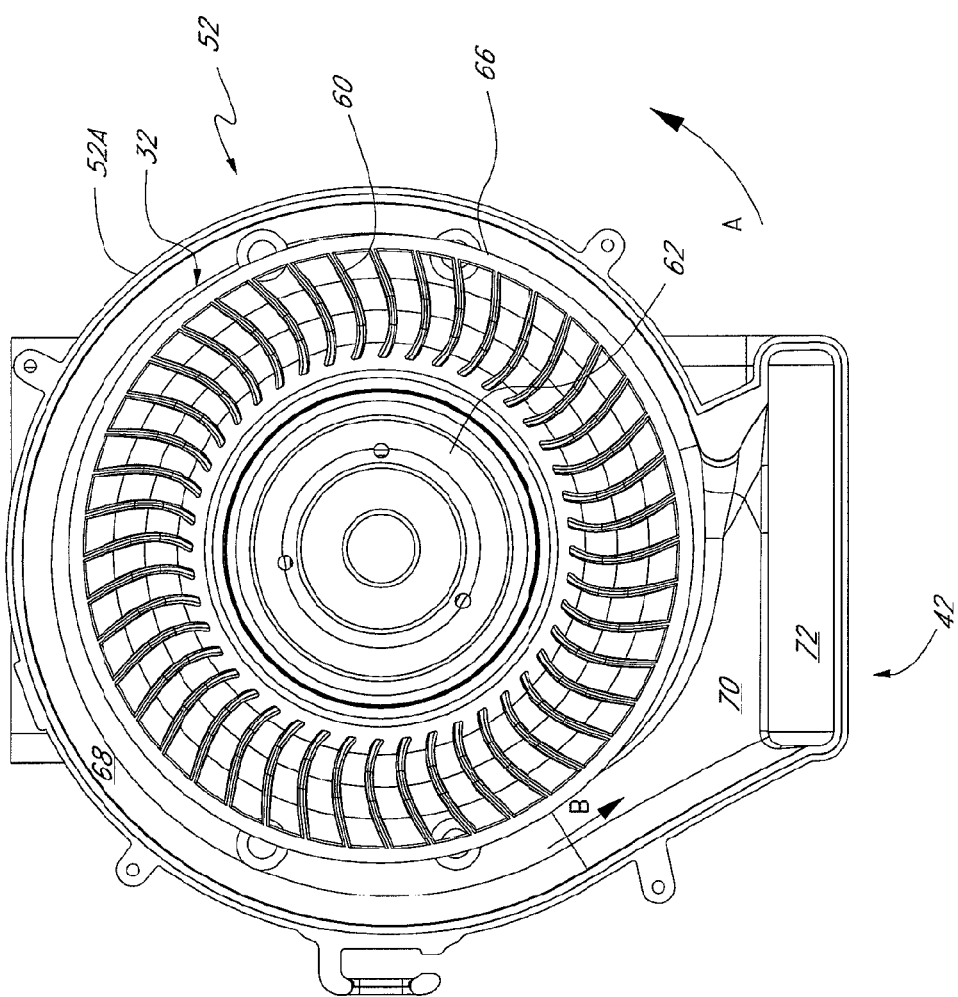
FIG. 11 is a front view of the cooling system of FIG. 6 with a top half of a housing removed.
Figure 12:
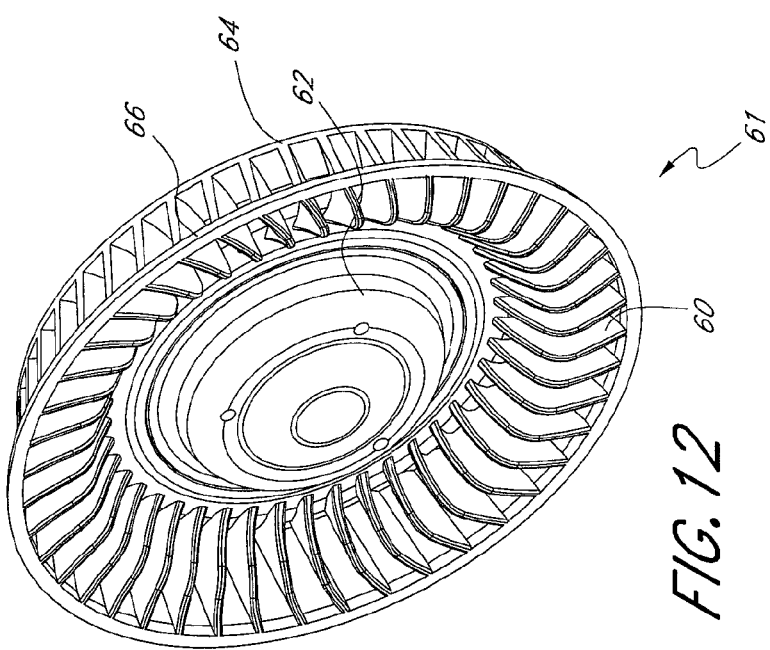
FIG. 12 is a front perspective view of a fan of the cooling system of FIG. 6.

With reference to the embodiment illustrated in FIGS. 11 and 12, the fan 61 further includes a hub 62 which is positioned on a disk-like base 64. The blades 60 extend upwardly from the base 64. An outer edge of the blades 60 are connected together by a circular rim member 66. As shown in FIG. 11, the housing 52 defines a generally annular enclosed space 68 in which the fan 61 is positioned. The enclosed space 68 has an outlet 70, which is generally positioned on the bottom end 42 of the cooling system 12. The outlet 70, in turn, can be connected to a transition passage 72 that is described in more detail below.

In use, as the fan 61 rotates in the direction of arrow A, air is drawn through the inlet opening 58 in a direction that is generally parallel to the rotational axis of the fan 61 (i.e., a generally axial direction). The air is then the drawn into the enclosed space 68 and turned approximately 90 degrees to a radial direction. The air flow is then directed as shown by arrow B toward the outlet 70. As shown, the enclosed space 68 has a cross-sectional flow area that preferably increases in the direction of arrow B.

Figure 10:
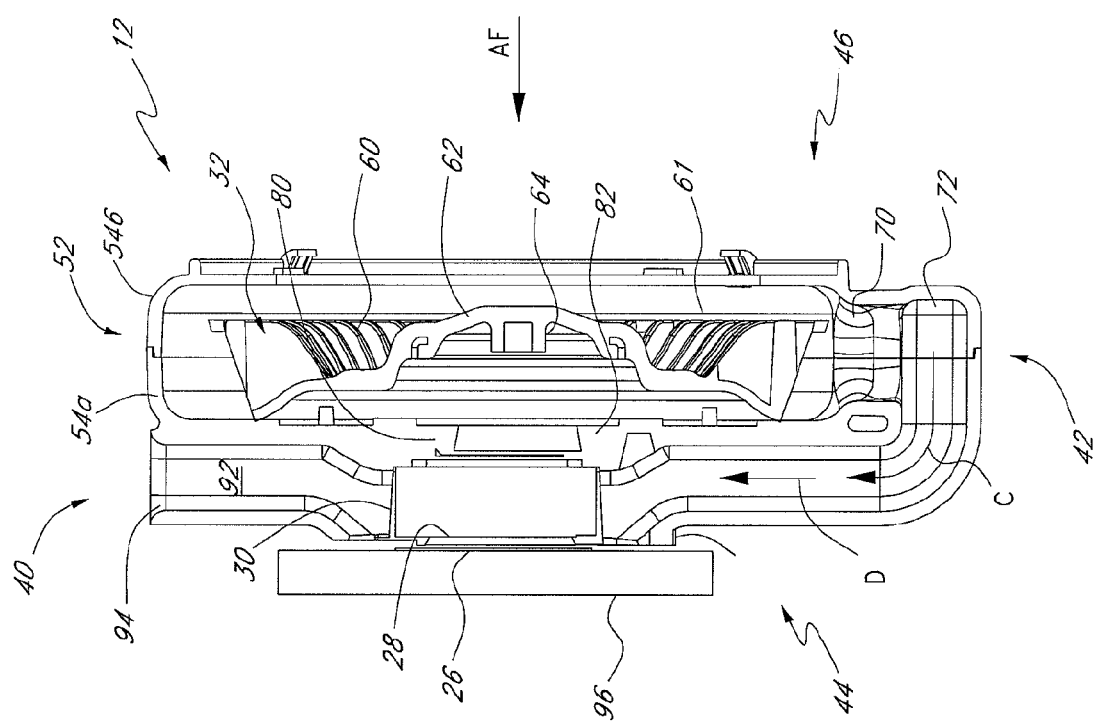
FIG. 10 is a cross-sectional view taken through line 10-10 of FIG. 7.

The cooling system 12 includes a motor 80 for rotating the fan 61. As seen in FIG. 10, the motor 80 can be positioned within a space defined beneath the hub 62 of the fan 61. As shown, the hub 62 can define a boss 64 for supporting a shaft (not shown) upon which the hub 62 is mounted. The shaft, in turn, is rotated by the motor 80, which is positioned generally beneath the hub 62. Electrical wires can be provided to power and control the motor 80. The wires can pass through an opening 86 provided on the left side of the housing 52 (see FIG. 8). In other embodiments, the motor, hub, wires and/or other components or items associated with the cooling system 12 can be configured differently than shown and discussed herein.

With reference to the embodiments illustrated in FIGS. 10 and 11, air drawn in by the fan 61 is directed towards the heat exchanger 30 of the thermoelectric device 24, which is preferably positioned within the housing 52. The thermoelectric device 24 is positioned generally on the rear side 44, preferably substantially behind the fan 61. In addition, in the illustrated embodiment, the thermoelectric device 24 is positioned such that the waste side heat exchanger 30 is situated within a heat exchange passage 90 that is also behind the hub 62 and motor 80. As shown, the heat exchange flow passage 90 is connected to the outlet 70 of the annular passage 68 by the transition passage 72. The transition passage 72 is configured to turn the flow rearwardly and then upwardly as shown by the arrow labeled C (FIG. 10). The flow in the heat exchange passage 90 then flows generally in an upward direction (arrow D) that is preferably generally parallel to the front and rear sides 44, 46 of the housing 52. Air flow in this passage (represented by arrow D) is preferably perpendicular to the axial flow of air entering the fan 61 (represented by arrow AF). Electrical connections 91 (see FIGS. 8 and 9) extend through the housing 52 to power and control the thermoelectric device 24.

With continued reference to FIG. 10, the rotational axis of the fan 61 preferably extends through the thermoelectric device 24. The axis of the fan 61 preferably also extends through the heat exchanger 30. Further, as illustrated, the fluid passage 90 is substantially perpendicular to the direction in which fluid enters the fan 61.

In some embodiments, as depicted in FIG. 10, the heat exchanger 30 is positioned within the heat exchange passage 90. Thus, the fan 61 is configured to direct fluid over the waste side heat exchanger 30. In this manner, when the thermoelectric device 24 has is activated, the cold side 26 of the thermoelectric device 24 is cooled as heat is transferred from the waste side heat exchanger 30 to the air flow though the passage 90. Further, air flowing over the waste side heat exchanger 30 is discharged through an exit passage 92, which, in the illustrated embodiment, is directed in the same general direction as the heat exchange passage 90. The exit passage 92 includes an outlet 94, which is generally positioned on the top side 40 of the cooling system 12 (see also FIG. 6).

In some embodiments, the cold side 26 of the thermoelectric device 24 can be coupled to a conductive member 96. For example, the conductive member 96 can comprise a plate of highly conductive material that is conductively coupled to a conduction element 22 of a container 10. In this manner, the cooling system 12 can be used to cool the interior 14 of the container 12 as described herein. In another embodiment, the cold side 26 of the thermoelectric device 24 can be directly coupled to the conduction element 22.

Figure 13A:
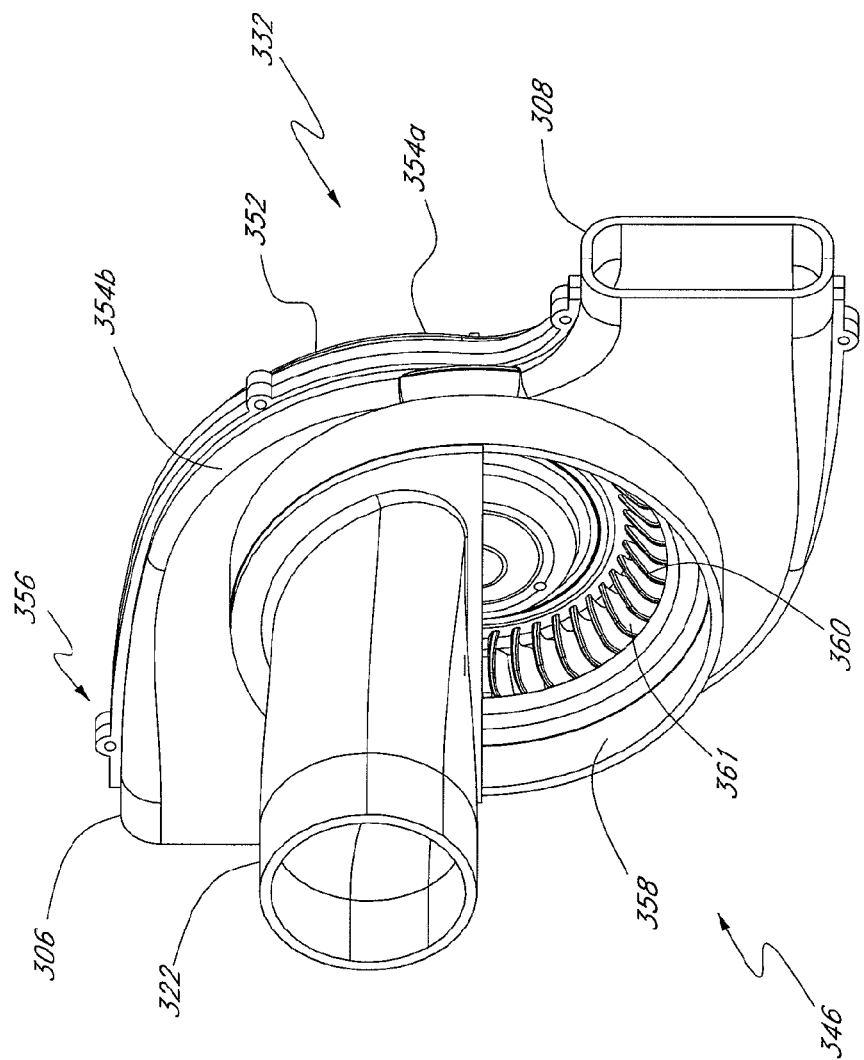
FIG. 13A is a front perspective view of an embodiment of a fluid transfer device.
Figure 13B:
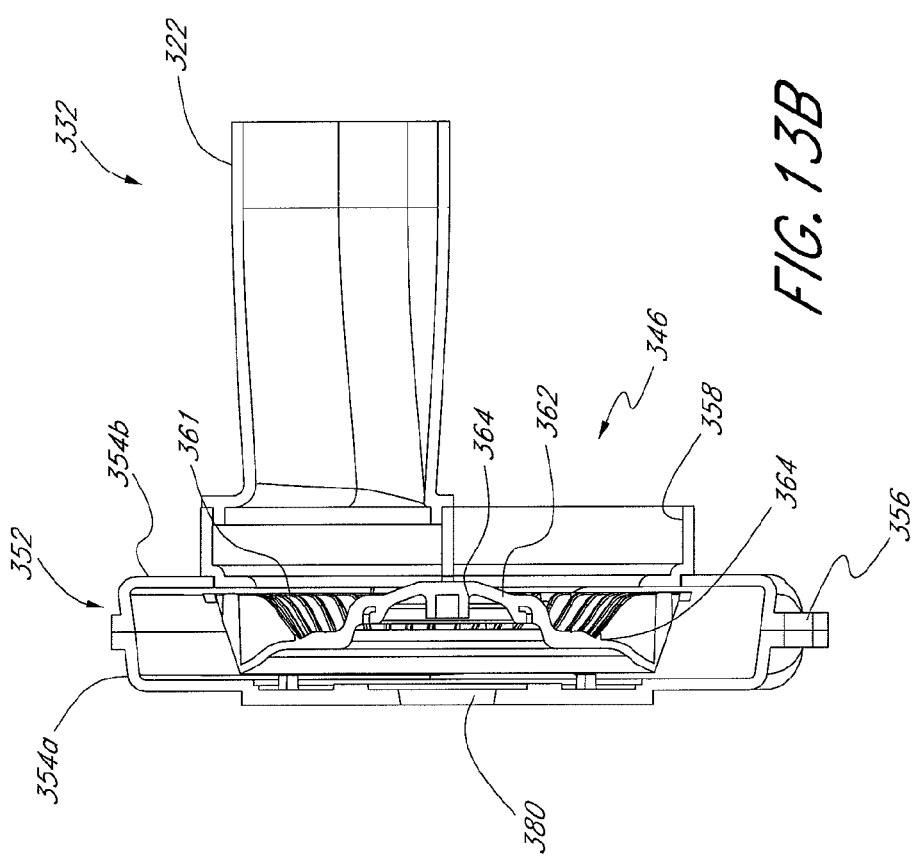
FIG. 13B is a cross-sectional view of the fluid transfer device of FIG. 13A.
Figure 14:
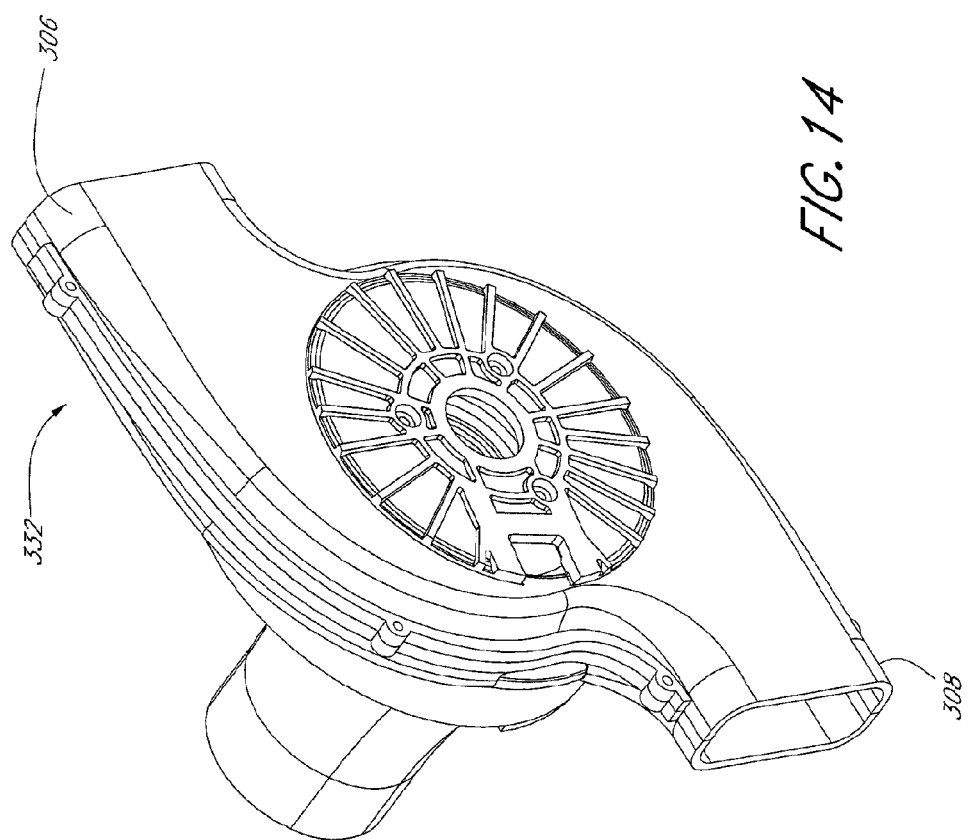
FIG. 14 is a rear perspective view of the fluid transfer device of FIG. 13A.
Figure 15:
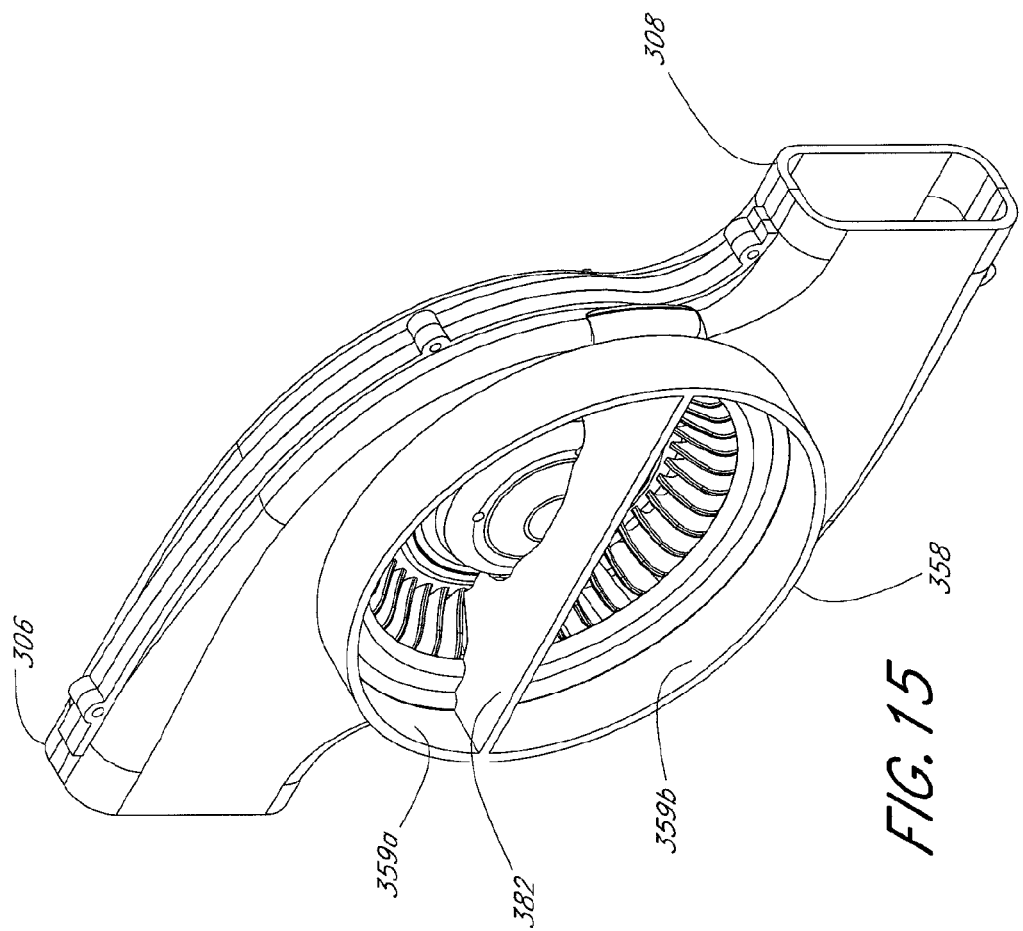
FIG. 15 is a front perspective view of the fluid transfer device of FIG. 13A with an inlet of the fluid transfer device removed.
Figure 16A:
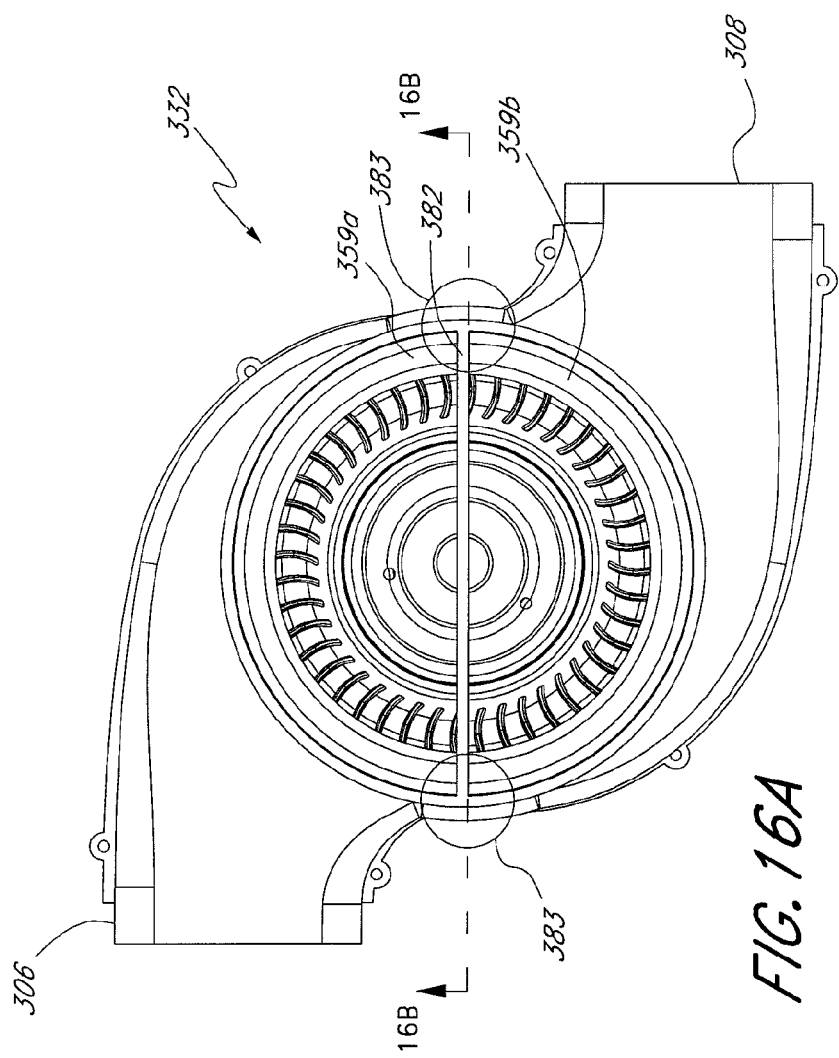
FIG. 16A is a front view of the fluid transfer device of FIG. 13A with the inlet removed.
Figure 16B:
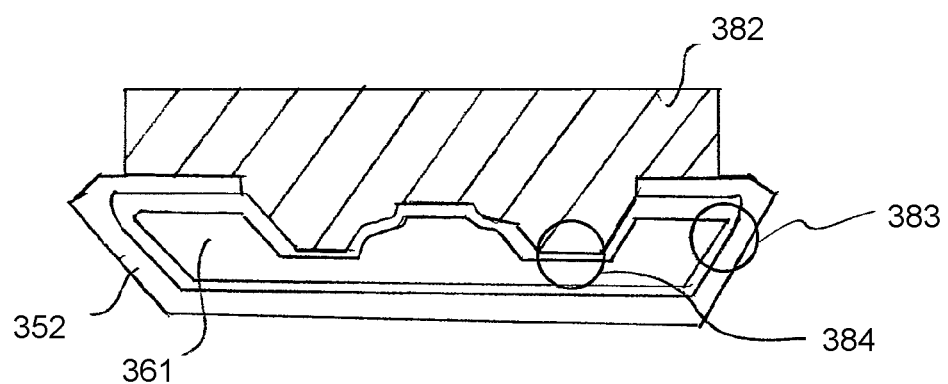
FIG. 16B is a cross-sectional view of the fluid transfer device of FIG. 16A.
Figure 17:
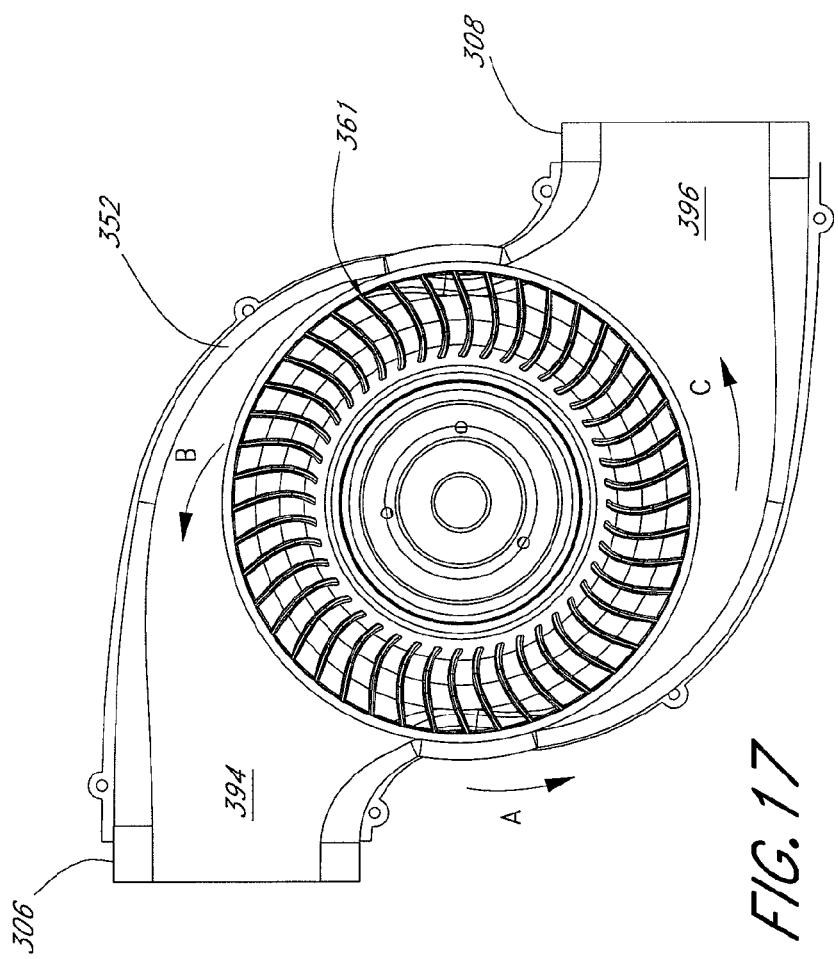
FIG. 17 is a front view of the fluid transfer device of FIG. 13A with a top half of a housing removed.

FIGS. 13A-17 illustrate embodiments of the fluid transfer device 332 illustrated in FIG. 5. These embodiments advantageously provide a compact fan with two inlets and two outlets. FIGS. 13A, 13B and 14 are front perspective, cross-sectional, rear perspective, rear and cross-sectional views, respectively, of the fluid transfer device 332. Further, FIGS. 15 and 16 are a front perspective and front views of the device 332 with a cool side inlet 322 removed. FIG. 17 is a front view of the device 332 with a top half of its housing removed. As will be explained below, this embodiment of the fluid transfer device 332 is particularly advantage in the context of the cooling system described below. However, those of skill in the art will recognize that certain features and advantages of this device 332 can be utilizes in other industrial and commercial applications in which it is advantageous to provide one rotating fan with two separate inlet and outlet combinations.

With initial reference to FIGS. 13A, 13B and 14, the fluid transfer device 332 can include a housing 352 which is formed into a rear and front halves 354a, 354b. The housing 352 can be formed from of a variety of materials. For example, in one embodiment, each half 354a, 354b is formed from a suitable plastic through a molding process. Each half 354a, 354b can be preferably provided with corresponding connection bosses 356 such that the halves 354a, 354b are joined together using one or more fasteners (e.g., bolts, screws, pins, etc.). As will be explained below, the housing 352 can be configured to house a centrifugal or radial fan. The housing 352 can also be configured to define various flow paths within the fluid transfer device 332.

With continued reference to FIGS. 13A-14, a front side 346 of the housing 352 defines a generally circular inlet opening 358 (see also FIG. 15). However, in other embodiments, the opening 358 can comprise a different shape (e.g., elliptical, rectangular, etc.). As shown, a radial fan 361 can be positioned below the opening 358. In some embodiments, the radial fan 361 is configured substantially similar to the embodiment described with reference to FIG. 6. Accordingly, the fan 361 can include a series of radial fan blades 360 which extend from a disk-like base 364. It will be appreciated, however, that the fan 361 can have an alternative configuration.

As illustrated in FIG. 13B, a motor 380 for rotating the fan 361 can be positioned within a space defined beneath a hub 362 of the fan 361. As shown, the hub 362 can define a boss 364 for supporting a shaft (not shown) upon which the hub 362 is mounted. The shaft, in turn, is rotated by the motor 380, which is positioned generally beneath the hub 362.

With reference to the embodiments illustrated in FIGS. 15 and 16A, the opening 358 is divided into two halves 359a, 359b by a splitter member 382 (e.g., splitter wall). In the depicted embodiment, the top half 359a forms the inlet or cold side passage 322. As discussed and illustrated in FIG. 5, the inlet or cold side passage can be connected to the re-circulation passage 320 described above with reference to FIG. 5. The bottom half 359b can define the hot side inlet passage 324, which is also discussed above with reference to FIG. 5.

With reference to the embodiment illustrated in FIG. 17, the fan 361 is positioned within the housing 352 of the fluid transfer device 332. The housing 352 can be configured so that air entering the top half 359a of the opening 358 is directed towards a cold side outlet space 394. Alternatively, air entering the bottom half 359b of the opening 358 is directed towards a hot side outlet space 396. The cold side outlet space 394 communicates with the cold side outlet 306, and the hot side outlet space 396 communicates with hot side outlet 308. In some embodiments, the cold side outlet 306 and the hot side outlet 308 are associated with the cold side heat exchanger 304 and the hot side heat exchangers 30, respectively, as described above and illustrated in FIG. 5.

In order to keep the cold side inlet passage separate from the hot side inlet passage, a small clearance can be provided between the outside of the fan 362 and the inner portion of the adjacent housing 352. In FIGS. 15, 16A and 16B, a tight clearance is provided in the radial direction on opposite sides of the fan 362 where the splitter wall 382 connects to or is in close proximity with the housing 352, near the areas designated by circles 383 (FIGS. 16A and 16B). As illustrated in FIG. 16B, a tight clearance could also be provided in the axial direction, near the area designated by circle 384 (FIG. 16B). In some embodiments, the radial and/or axial clearance is approximately 1 mm. However, the clearance can be greater or smaller, depending on the particular configuration.

With reference to FIGS. 15-17, in use, as the fan 361 rotates (e.g., in the direction represented by arrow A in FIG. 17), air is drawn through the inlet opening 358 in a direction that is generally parallel to the rotational axis of the fan 361 (e.g., a generally axial direction). The air is then the drawn into the housing 352 and re-directed approximately 90 degrees to a generally radial direction. Consequently, a portion of the air is then directed toward the cold side outlet 306 (as indicated by arrow B) and the remaining air is directed as toward the hot side outlet 308 (as indicated by arrow C). In the illustrated embodiments, approximately half of the air is directed toward the cold side outlet 306 and approximately half of the air is directed toward the hot side outlet 308. In other embodiments, however, the proportion of air going to each outlet 306, 308 can be different.

The embodiment of the fluid transfer device 332 described above advantageously provides a very compact arrangement of a fluid transfer device that includes two inlets, each of which is in fluid communication with a different outlet. However, it will be appreciated that the fluid transfer device 332 can be configured differently to provide more or fewer inlets and/or outlets. For example, in one embodiment, a partition or splitter wall can be configured to create three or more portions. Such portions can be configured to be in fluid communication with a different outlet.

FIG. 18A is a cross-sectional schematic view of another embodiment of a fluid transfer device 400 that defines two flow paths, each of which has a separate inlet and outlet. Such a fluid transfer device 400 can be used in a cooling system similar to that described above with respect to FIG. 5.

With continued reference to FIG. 18A, a radial, axial or other type of fan 402 is positioned within a housing 404. In the illustrated embodiment, the fan 400 includes a front and back set of blades 406, 408 which are mounted onto a common disk 410. As shown, the common disk 410 extends from a common hub 412, which is mounted to a shaft 414 that is rotated by a motor 416. The front and back portions of the fluid transfer device 400 are provided with front and rear openings 422, 424, respectively. In the illustrated embodiment, the front and rear openings 422, 424 are associated with the front and back set of blades 406, 408, respectively. Thus, as the fan 402 rotates, air is drawn into the housing 404 through the openings 422, 424. Air entering the housing 404 is then directed into a radial direction (e.g., turned approximately 90 degrees). The housing 404 is configured to maintain air within the front and rear sides of the fan 402 substantially separated as it is directed to separate outlets.

In the embodiment illustrated in FIG. 18A, air or other fluid can enter the fluid transfer device 400 through the front (illustrated generally by arrow 418a) and/or the rear (depicted generally by arrow 418b).

Figure 18B:
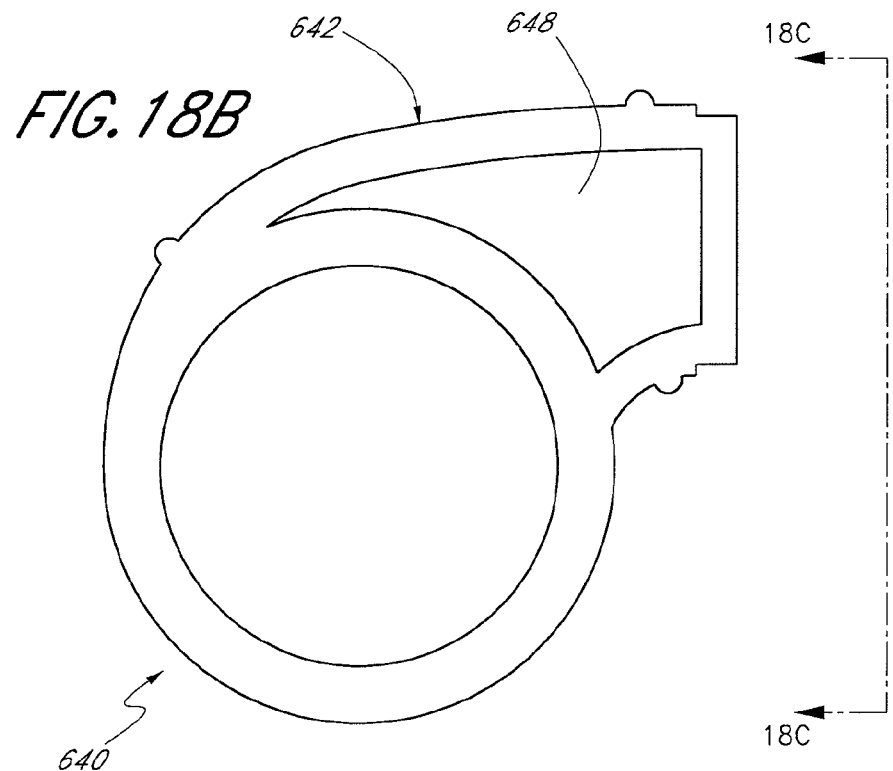
FIG. 18B is a top view of another embodiment of a fan configured to discharge two separate flow streams.
Figure 18C:
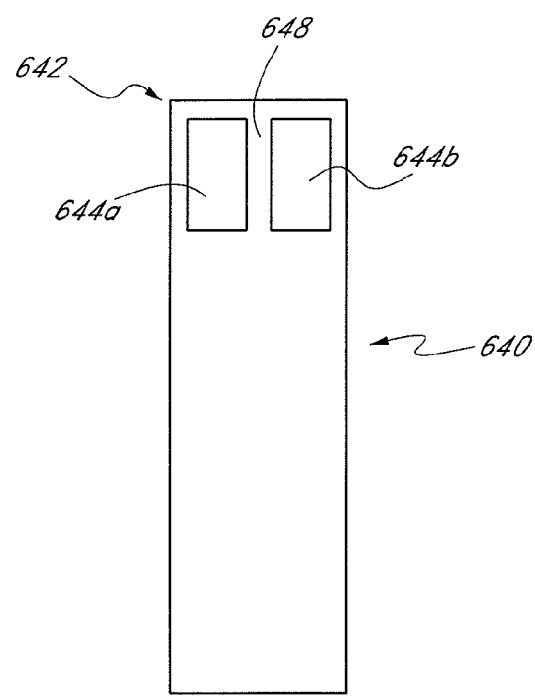
FIG. 18C is a side view of the fan of FIG. 18B.

In some embodiments, a fluid transfer device, such as the one illustrated in FIG. 18A, comprises two or more outlets which are hydraulically separated from each other. For example, as shown in FIGS. 18B and 18C, the outlet portion 642 of the fluid transfer device 640 includes two different outlets 644a, 644b, which can be separated by a splitter 648 or other member. In some embodiments, the splitter 648 comprises a wall which is situated between the outlets 644a, 644b. However, in other embodiments, the splitter can be differently configured. As depicted in FIG. 18C, the outlets 644a, 644b have a generally rectangular cross-sectional shape. However, the outlets can have a different shape, size and/or general configuration. In addition, as discussed, a single fluid transfer device can comprise three or more different outlets.

Figure 18D:
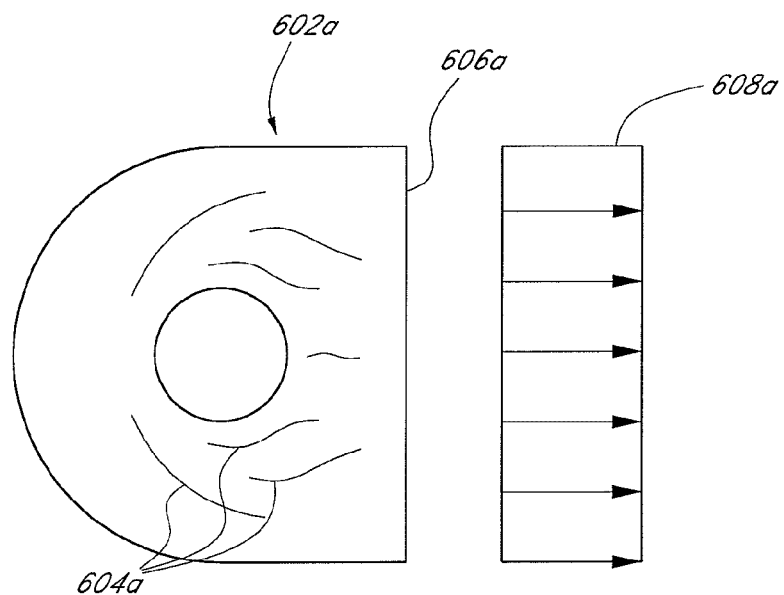
FIG. 18D is a schematic illustration of a fan with a plurality of vanes according to one embodiment.

Various fan or blower configurations can be used in cooling systems to transfer air to and from a thermoelectric device. For example, FIG. 18D illustrates a fan 602a having a plurality of interior vanes or baffles 604a that act to more evenly distribute the air flow at the outlet 606b. FIG. 18D also includes a schematic representation of an air flow distribution pattern 608a according to one embodiment. It will be appreciated that the distribution pattern 608a can be varied as desired or required by a particular application. One or more features of the fan 602a, including its size, shape and dimensions, the number, shape, size and position of the vanes or baffles 604a and the like can be altered to provide a different flow distribution at the fan outlet 606a.

Figure 18E:
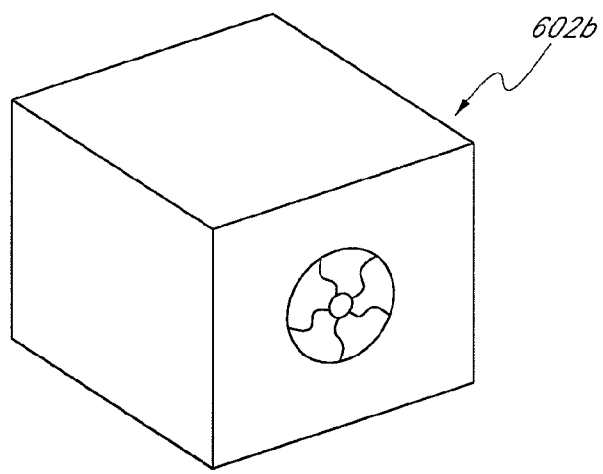
FIG. 18E is a modified fan arrangement according to another embodiment.

FIG. 18E illustrates an axial fan 602b that can be configured to transfer air to and past a thermoelectric device. It will be appreciated that one or more other fan designs and configurations can be used within a particular cooling system.

Figure 18F:
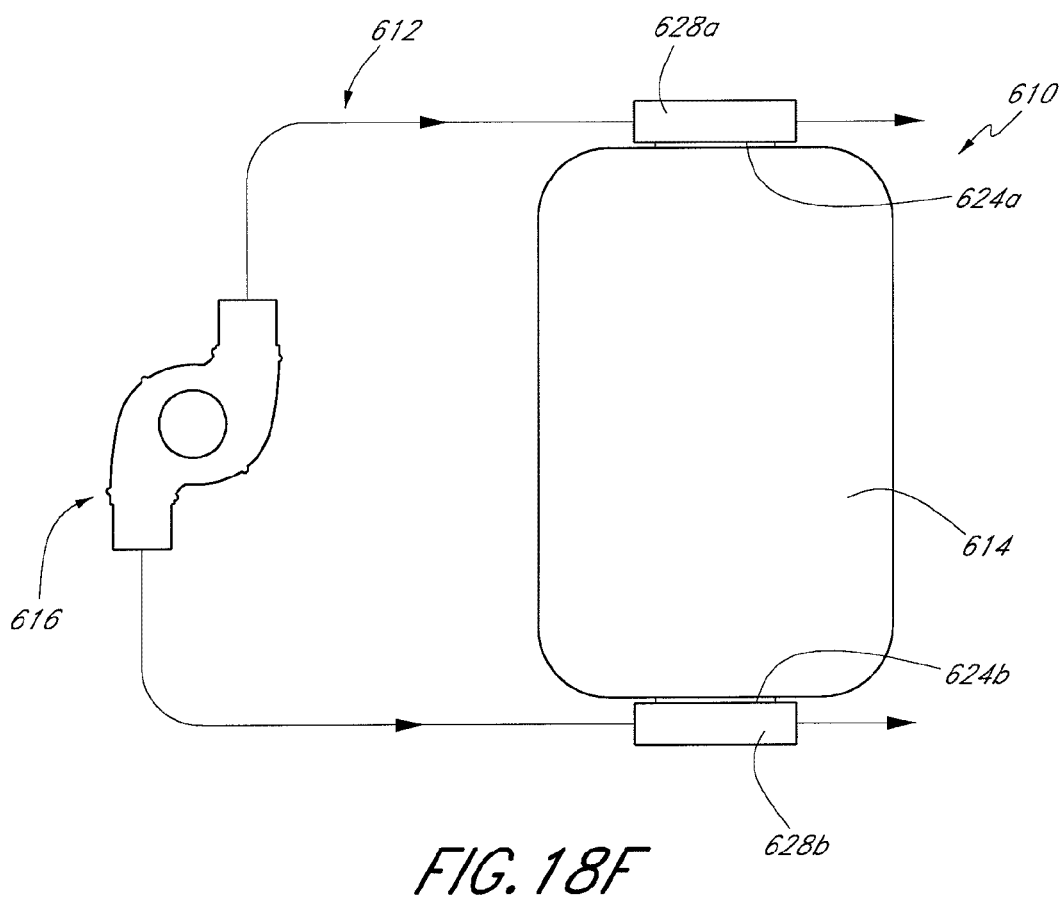
FIG. 18F is a schematic illustration of an cooling system according to one embodiment.

FIG. 18F is a schematic illustration of another embodiment of a cooling system 612 that can be used to cool (or heat) a container 610. In the depicted embodiment, two thermoelectric devices 624a, 624b are thermally coupled to a container 610. As discussed, the thermoelectric devices 624a, 624b comprise a cold side and a hot side. In one embodiment, the cold sides of the devices are placed into conductive contact with the container 610. The hot side of each thermoelectric device 624a, 624b, in turn, is placed into conductive contact with a heat sink/exchanger 628a, 628b. The heat sink/exchangers 628 can comprise one or more convention elements (e.g., fins), which are configured to remove and/or transfer heat through convention.

With continued reference to FIG. 18F, the cooling system 612 includes a dual outlet fan 616 which is configured to simultaneously deliver air past each of the heat sink/exchangers 628a, 628b. In other embodiments, a single fan can be configured to deliver air to two or more thermoelectric devices located on different containers. It will be appreciated that the number of thermoelectric devices, fans and/or other components of the cooling system 612 can be different than illustrated in FIG. 18F.

Beverage Container

In addition, one or more of the features and aspects of the embodiments described above can be used in combination with an open cavity (e.g., cup holder, other container, etc.) configured to hold a beverage container (cup, can, bottle, etc.). Such cavities or containers are sometimes referred to as cup holders in this application. FIGS. 19A and 19B are top and cross-sectional views, respectively, of one embodiment of a cup holder 500 having certain features and advantages according to the present invention.

With reference to the embodiment illustrated in FIGS. 19A and 19B, the cup holder 500 includes a body 502 that defines a cavity 504 with an open, upper end or opening 506. The body 502 can be formed from an insulating material (e.g., foam, etc.). As illustrated, a layer or liner 508 (e.g., a plastic liner) can be positioned along the inner surface of the cavity 504. In FIG. 19B, a beverage container 510 has been inserted through the open end 506 of the cup holder 500. In some preferred embodiments, the opening 506 comprises one or more sealing members 512. Such sealing members 512 can be configured to provide a seal between the beverage container 510 and the upper opening 506. Preferably, the sealing member 512 is configured to provide a substantial seal around beverage containers placed within the cup holder 500 regardless of the size (e.g., diameter) of the beverage container.

Figure 19C:
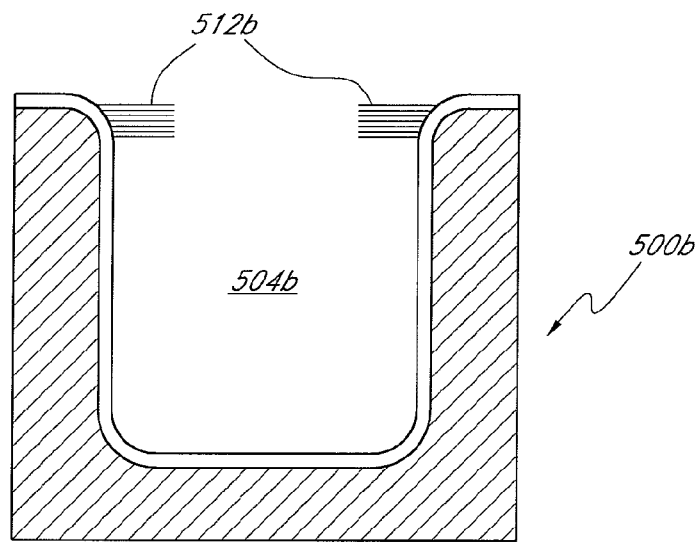
FIG. 19C is a cross-sectional view of another embodiment of a cup holder.
Figure 19D:
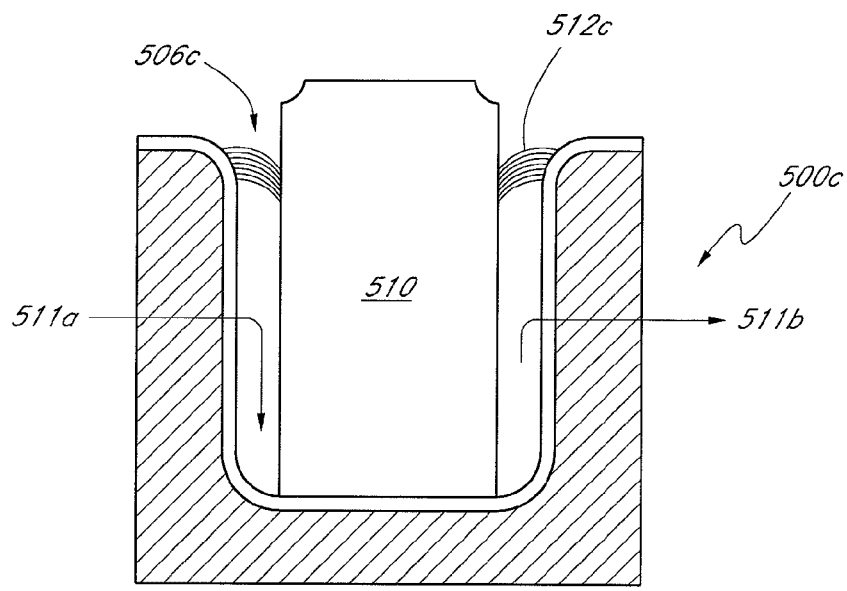
FIG. 19D is a cross-sectional view of another embodiment of a cup holder.

In some embodiments, the sealing member 512 comprises a series of brushes or bristles that extend radially inwardly from the open end 506, near the upper portion of the cup holder 500. As shown in FIG. 19B-19D, the bristles can deform to substantially form a seal around the beverage container 510.

With continued reference to FIG. 19B, the cup holder 500 can include an side inlet 516 into the cavity 504 and a side outlet 518. In the illustrated embodiment, the inlet and outlet 516, 518 are positioned on generally opposite sides of the cavity 504. However, in other arrangements, the inlet and outlet 516, 518 can have a different orientation with respect to each other and/or other cup holder components. In other embodiments, the cup holder 500 includes two or more inlets and/or outlets.

The inlet 516 can receive cooled air from a cooling system that can be arranged as described above. In turn, the outlet 518 can be configured to serve as an exhaust for the cooling air. Alternatively, the outlet 518 can be in fluid communication with a recirculation passage 320, as described above with reference to FIG. 5.

Thus, cooled air can be directed into the cavity 504 of a cup holder 500 and cool (or heat) a beverage container (e.g., cup, can, bottle, etc.) and its contents stored therein. As discussed, the sealing members 512 can help prevent the undesirable escape of cooled air which enters the cavity 504 through the inlet 516.

In modified embodiments, the sealing member 512 can have variety of different shapes, sizes, configurations and other characteristics. For example, in one embodiment, the sealing member 512 can comprise an annular flange made out of a deformable or flexible material (e.g., rubber). In another embodiment, the annular flange can include notches to promote movement of the flange as the container 510 is moved into and out of the opening 506.

In other embodiments, the cup holder 500 includes one or more conduction elements 22 as described above with reference to FIG. 1. The conduction elements 22 can be placed along the interior of the cavity 504 and can be conductively coupled to a cold side of a thermoelectric device as described above. Thus, cooling of a container, and thus a beverage or other foodstuff contained therein, can be cooled (or heated) using conduction rather than convection. In other embodiments, a cup holder can comprise both conductive and convective type cooling/heating elements.

In the embodiment illustrated in FIG. 19D, a series of brushes or bristles 512c that extend radially inwardly from the open end 506c of the cup holder 500c help to form a seal around the beverage container 510 (e.g. can, bottle, cup, etc.). As indicated by arrows 511a, 511b, air cooled by convection, as described in the various embodiments herein, can be passed along the outer surface of the container 510 to cool it. Cooled air can be injected at one end of the container 510 and removed from an opposite end. In other embodiments, the entry and exit locations of the cooled air may be different. In addition, such an arrangement can be used with warm air being passed along the outer surface of a container 510 to maintain the container 510 at a higher temperature (e.g., above ambient).

With continued reference to FIG. 19D, the brushes or bristles 512c can be configured to deflect downward when the container 510 is inserted into the cup holder 500c. Thus, the brushes or bristles 512c can be resilient so as to return to a resting position, such as that illustrated in FIG. 19C, when a container 510 is not situated within the cup holder cavity. In some embodiments, the brushes or bristles 512c are arranged uniformly around the interior space of the cup holder 500c to snugly retain the container 510. The brushes or bristles 512c can be manufactured from one or more materials, such as, for example, metals, thermoplastics, foams, rubbers, other synthetic materials and/or the like.

Figure 20A:
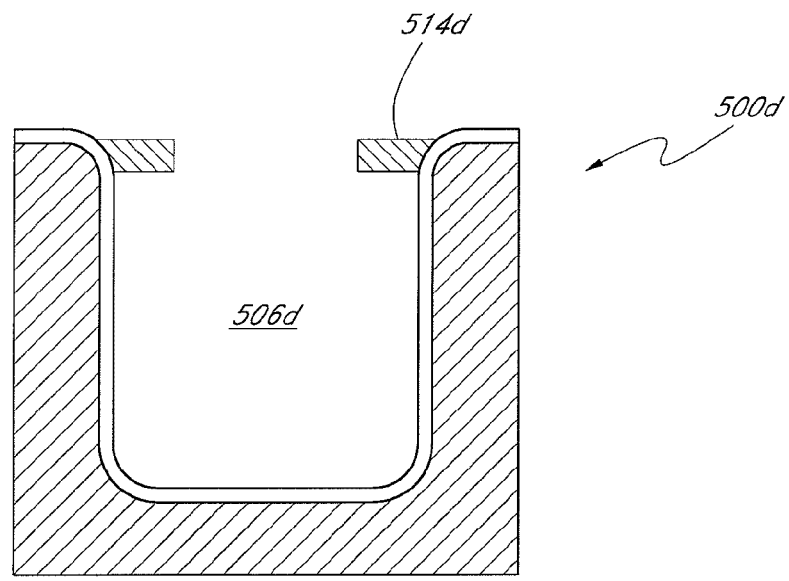
FIG. 20A is a cross-sectional view of yet another embodiment of a cup holder.
Figure 20B:
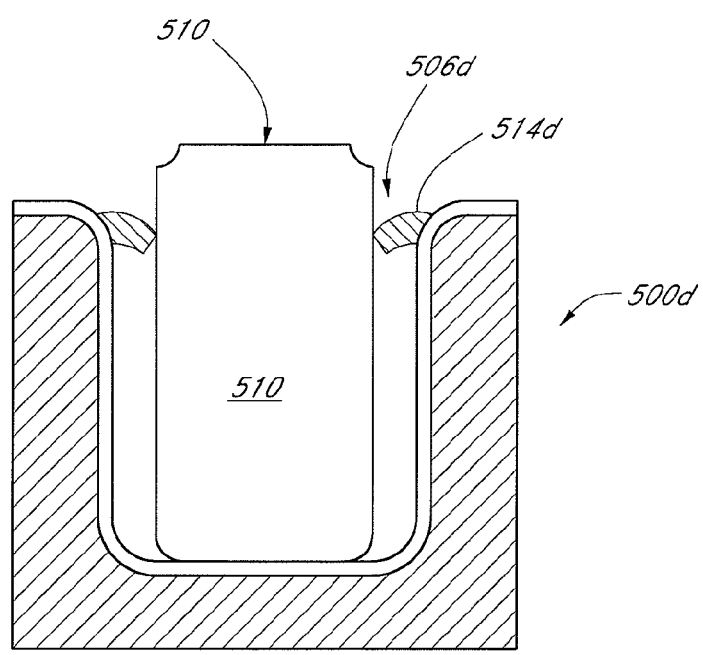
FIG. 20B is a cross-sectional view of still another embodiment of a cup holder.

FIGS. 20A and 20B illustrate another embodiment of a cup holder 500d configured to retain a container 510 (e.g., cup, can, bottle, etc.) within its inner cavity 506d. The depicted cup holder 500d includes a deformable ring 514d along its upper opening 506d. In some embodiments, the deformable ring 514d is manufactured from foam, rubber, flexible thermoplastic or other resilient material. In addition, the ring 514d can be continuously or intermittently disposed around the opening 506d of the cup holder 500d. Regardless of its exact configuration, the deformable ring 514d can help securely maintain a container 510 within the cup holder cavity, as shown in FIG. 20B. The use of bristles or deformable rings 541d permits the cup holder 500d to be used for containers of different diameters and other outer dimensions. Thus, cup holders comprising bristles, deformable rings or other deformable sealing members can accommodate beverage containers of varying shape, size and other dimensional characteristics.

Figure 21A:
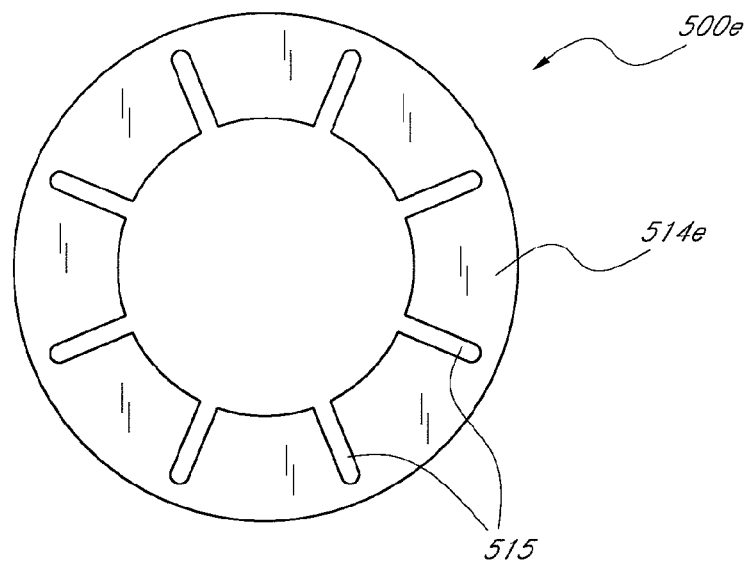
FIG. 21A is a top view of one embodiment of a cup holder.

With reference to the embodiment illustrated in FIG. 21A, a deformable ring 514e includes a plurality of radial slits 515 that begin at its interior diameter and extend outwardly toward its outer diameter. The slits 515 can help alleviate hoop tension in the ring 514e when a container is positioned within the cup holder 500e. Thus, the shape of the deformable ring 514e can more easily adjust to the outer diameter or other dimension of a beverage container (e.g., cup, can, bottle, etc.).

Figure 21B:
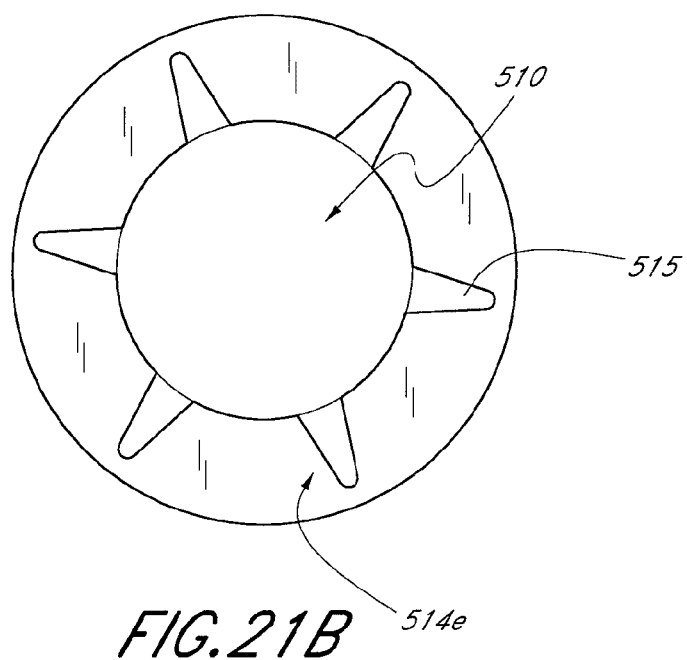
FIG. 21B is a top view of another embodiment of a cup holder.

As shown in the top view of FIG. 21B, when a container 510 (e.g., can) is positioned within a cup holder having such a deformable ring 514e with radial slits 515, the slits 515 can move relative to one another. In the illustrated embodiment, the deformed slits form triangular or U-shaped openings when viewed from the top. However, depending on how the deformable ring 514e and/or its slits 515 are configured, the openings can have a different shape (e.g., circular, wedge, etc.). Further, the number, radial extent, the shape and other characteristics of slits 515 can be different than illustrated and discussed herein.

Figure 22A:
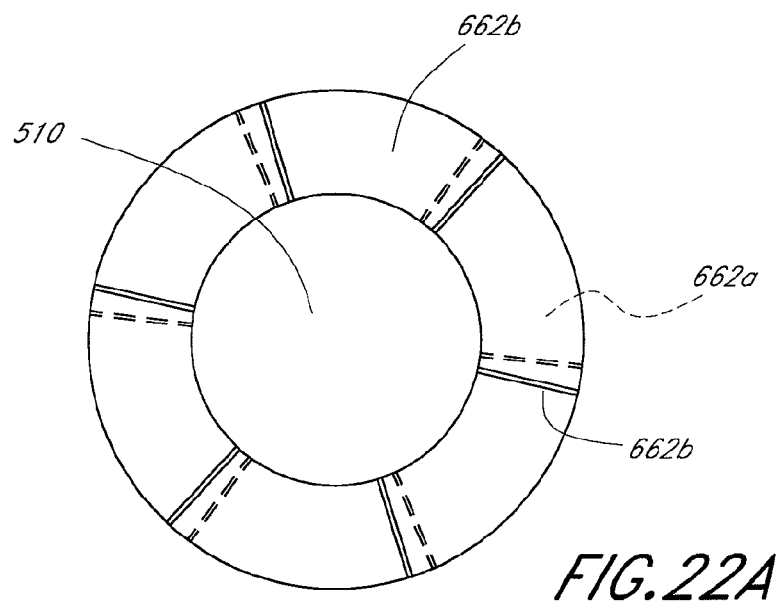
FIG. 22A is a top view of another embodiment of a cup holder.

In order to help reduce the size of openings in the deformable ring or similar member, when a container is positioned within the cup holder, overlapping resilient (e.g., foam, rubber, thermoplastic, etc.) pieces can be used, as illustrated in FIG. 22A. Openings, such as those illustrated in FIG. 21B may permit cooled air to undesirably escape from the interior of the cup holder cavity. Thus, overlapping resilient pieces 662 can provide a way of eliminating or reducing the size of openings in a deformable ring or other sealing member. In the illustrated embodiment, the overlapping pieces 662 are configured to move relative to one another as a container is inserted or removed from the cup holder.

Figure 22B:
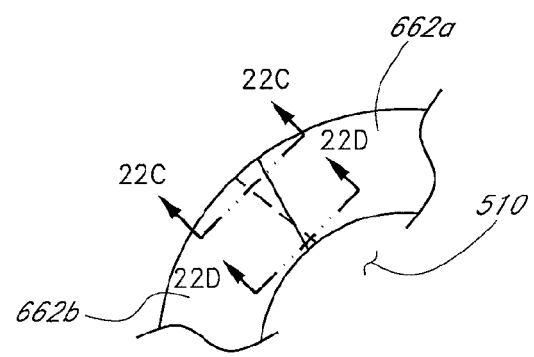
FIG. 22B is a top view of yet another embodiment of a cup holder.
Figure 22C:
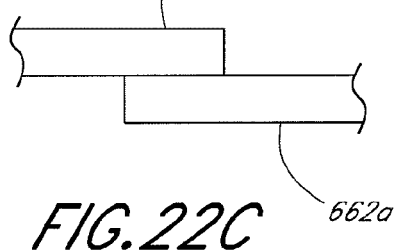
FIG. 22C is a cross-sectional view taken through line 22C-22C of FIG. 22B.
Figure 22D:
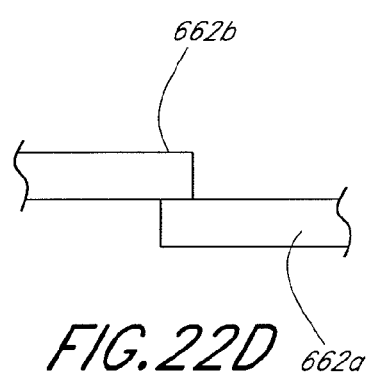
FIG. 22D is a cross-sectional view taken through line 22D-22D of FIG. 22B.

In one embodiment, as illustrated in FIG. 22A, the overlap between adjacent overlapping resilient pieces 662 remains approximately constant in the radial direction from the center of the cup holder. However, in other embodiments, such as the one depicted in FIGS. 22B-22D, the overlap between adjacent overlapping resilient pieces 662, 662b varies depending on the radial distance of the overlapping pieces relative to the container. In FIG. 22B, the overlap between adjacent overlapping pieces 662a, 662b generally decreases toward the center of the cup holder cavity. This is caused by the greater vertical displacement of the resilient ring near the center of the cup holder.

In other embodiments, more or fewer overlapping pieces are used to help seal the cavity of a cup holder. Some or all of the overlapping pieces can be resilient. Alternatively, some of all of the overlapping pieces can be semi-rigid or rigid. It will be appreciated that the shape, size, dimensions, configuration and/or other characteristics of the overlapping pieces can vary.

Figure 23A:
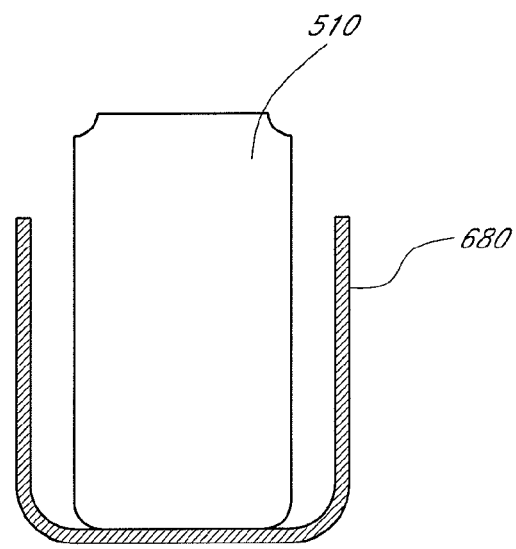
FIG. 23A is a schematic cross-sectional view of another embodiment of a cup holder.
Figure 23B:
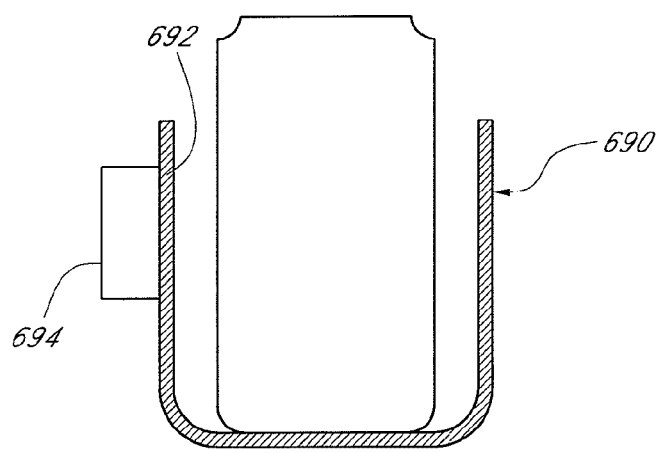
FIG. 23B is a schematic cross-sectional view of yet another embodiment of a cup holder.

It may be desirable to maximize or increase the contact between the outer portion of a container and the interior surface of the cup holder in which the container is positioned, especially if the container is cooled by conductive contact. For instance, as illustrated in FIG. 23A, a cup holders 680 is typically configured so that a beverage container 510 (e.g., cup, can, bottle, etc.) primarily contacts a bottom surface of the cup holder cavity 682. However, some embodiments include thermoelectric devices along one or more the sidewalls of the cup holder and rely primarily on conduction to transmit or remove heat from a beverage container positioned within the cup holder. In such arrangements, the heat transfer (e.g., cooling or heating) of a beverage container can be improved by urging the container toward the sidewalls. In FIG. 23B, for example, a thermoelectric device 694 is positioned along the sidewall portion 692 of a cup holder 690 and is used to conductively cool the side walls of the cup holder 690. Thus, in order to enhance heat transfer between the beverage container and an thermoelectric device, it can be desirable to include one or more methods of urging a beverage container positioned within a cup holder toward the sidewall portion of the cup holder.

Figure 24A:
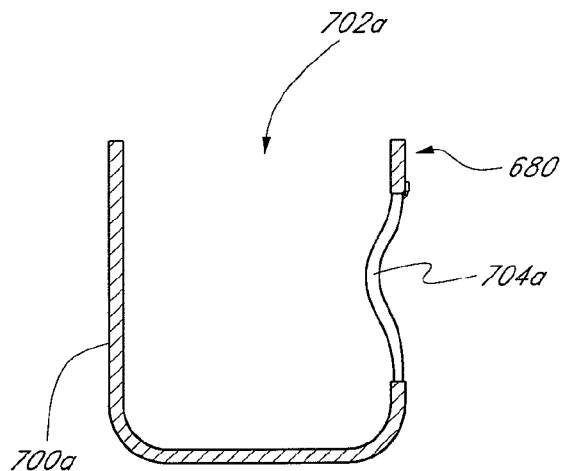
FIG. 24A illustrates one embodiment of a bias member for a cup holder.

In some embodiments, the contact between a beverage container (e.g., cup, can, bottle, etc.) and an inside sidewall of a cup holder can be accomplished using various spring-type devices. For example, in FIG. 24A, the cup holder 700a includes a spring 704a along one or more portions of its sidewall that extends into the cup holder cavity 702a. The spring 704a, which can be constructed of metal, plastic or any other resilient material, can be configured to impose a lateral force against a beverage container (not shown) positioned within the cup holder cavity 702a. Consequently, the container is urged into contact with a sidewall to which one or more thermoelectric devices (not shown) can be conductively coupled. In FIG. 24A, the spring 704a or other biasing member can be attached to one or more locations of the cup holder 700a (e.g., above and/or below the opening in the cup holder sidewall).

Figure 24B:
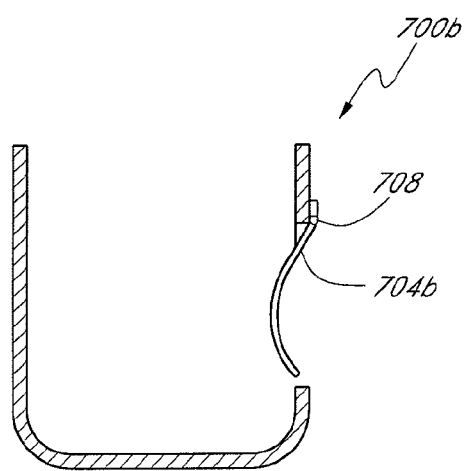
FIG. 24B illustrates another embodiment of a bias member for a cup holder.

FIG. 24B illustrates a spring 704b that is connected to the cup holder sidewall using a hinge 708. The hinge 708 is preferably configured to permit the spring 704b to move relative to the sidewall of the cup holder 700b. In such embodiments, the hinge 708 may permit the spring 704b to move closer towards the center of the cup holder cavity 702b. Thus, this may facilitate contact between a beverage container (e.g., cup, can, bottle, etc.) and the cup holder sidewalls, even for smaller containers. Alternatively, the hinge 708 can be used to increase and/or decrease the lateral force exerted upon a container.

Figure 24C:
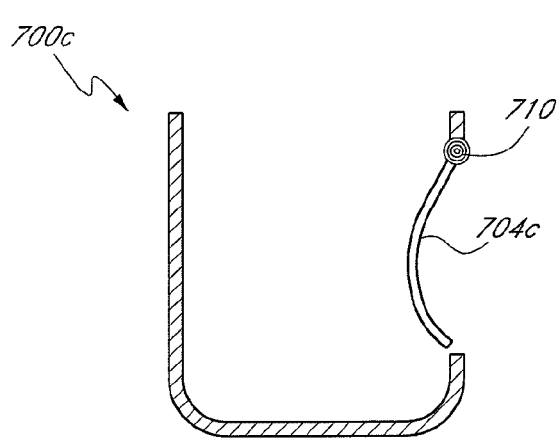
FIG. 24C illustrates yet another embodiment of a bias member for a cup holder.

With reference to FIG. 24C, a coil spring 710 can be used to connect a resilient member 704c to the cup holder sidewall. Like with the hinge arrangement discussed above, the coil spring 710 is preferably configured to maintain the resilient member 704c toward the middle of the cup holder cavity 702c. When a beverage container is inserted into the cup holder 700c, the resilient member 704c is displaced outwardly (e.g., toward the cup holder sidewall). Consequently, like with similar embodiments discussed herein, the coil spring 710 can exert a lateral force on an adjacent beverage container (e.g., cup, can, bottle, etc.), urging the beverage container into contact with the opposite sidewall of the cup holder 700c.

In some embodiments, a cup holder can be configured to automatically adjust to the varying diameters (or other transverse or outside dimension) and/or shape (e.g., cup draft angle) of different beverage containers by using one or more adjustable bladder members. In some embodiments, bladder members or other expandable members are used to maintain a beverage container within the cavity of a cup holder. In addition, such bladder members can be used to seal the inside cavity of the cup holder to more effectively cool (or heat) a beverage placed therein. The bladder member or other expandable members can be inflated and/or deflated pneumatically. For example, a small blower, air pump or compressor can be used to inflate the bladder member. One or more valves or other items can also be used to regulate air or other fluid flow into and out of the bladder member.

Figure 25:
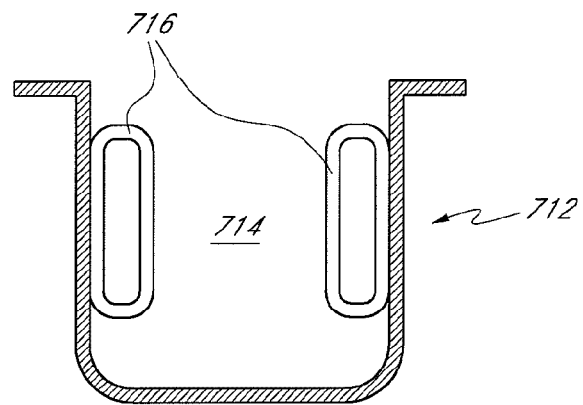
FIG. 25 illustrates a cross-sectional view of an embodiment of a bladder arrangement for a cup holder.

The cross-sectional view of FIG. 25 illustrates a cup holder 712 having a bladder member 716 along an interior portion of the cup holder cavity 714. In the depicted embodiment, the bladder member 716 has a generally annular shape that surrounds the interior wall of the cup holder cavity. However, as discussed in greater detail below, bladder members can have a different shape, size, configuration and/or other characteristics.

Figure 26A:
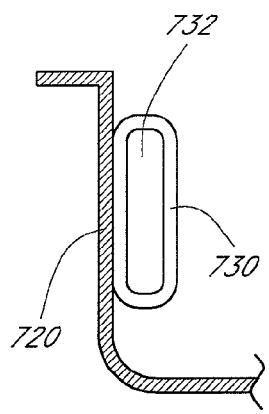
FIG. 26A illustrates a cross-sectional view of another embodiment of a bladder arrangement for a cup holder.

With reference to FIG. 26A, the bladder member 730 includes an internal cavity 732. As shown, the bladder member 730 is adjacent to the inside sidewall of the cup holder 720. In some embodiments, the bladder member 730 can be attached to the sidewall using one or more connections methods. For example, the bladder member 730 can be attached to the cup holder 720 using an adhesive, fastener and/or other connection method. The bladder member 730 is preferably constructed of a durable, resilient material, such as, for example, rubber, flexible plastic, other elastomer or the like. The bladder member 730 can comprise one or more exterior covers for protection of the resilient member, for decorative purposes and/or the like. For example, in one embodiment, a durable fabric can be joined to the outside of the bladder member 730.

Figure 26B:
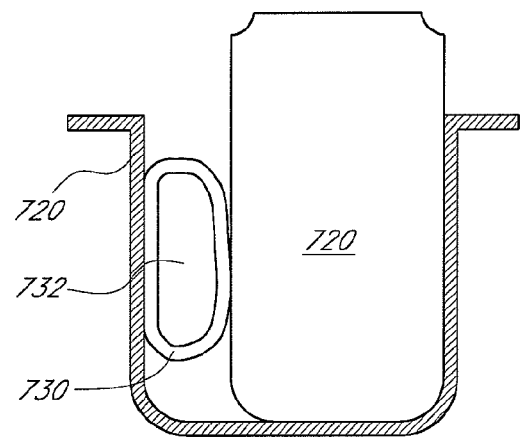
FIG. 26B illustrates a cross-sectional view of the cup holder of FIG. 26A with the bladder arrangement in a different position.

FIG. 26B illustrates the cup holder 720 of FIG. 26A with the bladder member 730 in an expanded state. The bladder member 730 can be expanded so that it moves toward the center of the cup holder cavity 712 by injecting air into the bladder member's internal cavity 732. The pump, compressor or device used to inject air or other fluid into the bladder member 730 can be activated and deactivated electrically, pneumatically or using any other method. As shown in FIG. 26B, expansion of the bladder member 730 can cause the bladder member 730 to contact the exterior portion of a container 510 (e.g., beverage cup, can, bottle, etc.) positioned within the cup holder 720. The continued expansion of the bladder member 730 urges the container 510 against a cup holder sidewall for improved thermal contact between the container 510 and the sidewall.

Since such bladder members 730 comprise internal cavities which are capable of being expanded and deflated, the bladder members can include one or more fluid passages that are configured to direct fluid (e.g., air) into and/or out of the internal cavity. In some embodiments, fluid passages are in fluid communication with a compressed fluid source for relative quick expansion of the bladder member. Further, the fluid passages can include one or more valves that facilitate the expansion and deflation of the bladder member.

Figure 27A:
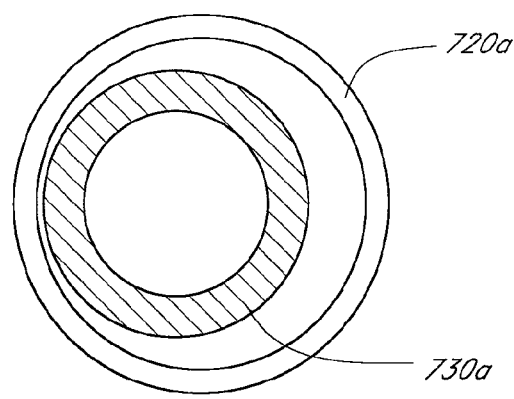
FIG. 27A illustrates a bladder arrangement for a cup holder according to another embodiment.
Figure 27B:
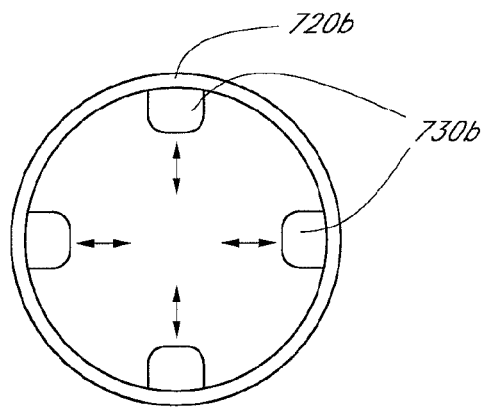
FIG. 27B illustrates a bladder arrangement for a cup holder according to yet another embodiment.
Figure 27C:
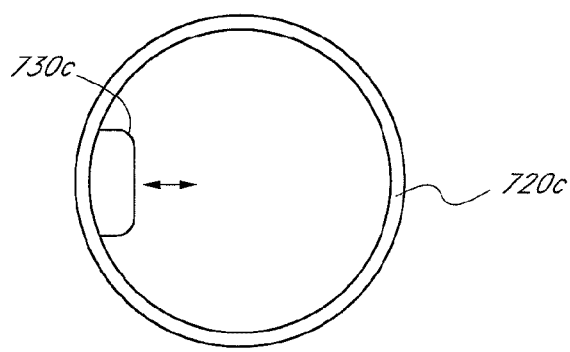
FIG. 27C illustrates a bladder arrangement for a cup holder according to still another embodiment.

As illustrated in the top views of FIGS. 27A-27C, the bladder member can take various forms. For example, in the embodiment depicted in FIG. 27A, the bladder member 730a is shaped as an annular ring. Thus, in its expanded shape, the bladder member 730a can move to occupy a substantial majority of the cup holder cavity. Alternatively, the bladder member 730a may be attached at various locations along the interior circumference of the cup holder cavity. Thus, as the bladder member 730a is expanded, it maintains a beverage container (not shown) positioned within the cup holder 720a toward the center of the cup holder cavity.

FIG. 27B illustrates a cup holder 720b comprising a total of 4 smaller bladder members 730b, equally spaced (at 90 degree intervals) around the cavity of the cup holder. In other embodiments, the cup holder 720b includes fewer or more bladder members 730b, as needed or required by a particular application.

In the embodiment depicted in FIG. 27C, the cup holder 720c includes a single bladder member 730c which, as shown, is positioned along one side of the cup holder cavity. Thus, as the bladder member 730c is expanded, it will effectively decrease the volume of the cup holder cavity. A beverage container (not shown) situated within the cavity will be urged towards the opposite end of the bladder member 730c as the bladder member 730c is expanded.

Figure 28A:
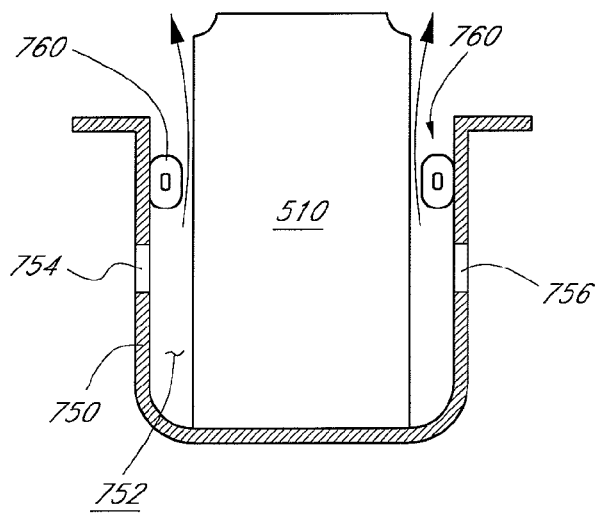
FIG. 28A illustrates another embodiment of a bladder arrangement for a cup holder.
Figure 28B:
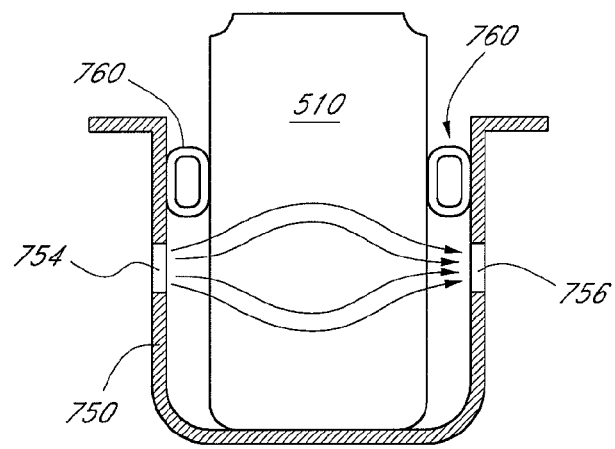
FIG. 28B illustrates the cup holder of FIG. 28A with the bladder arrangement in a different position.

With reference to FIGS. 28A and 28B, a bladder member 760 can be positioned along the upper portion of the cup holder cavity 752. As shown, the bladder member 760 has a generally annular shape. Therefore, the bladder member 760 is configured to continuously surround a beverage container 510 which is positioned within the cup holder cavity 752. In the illustrated embodiment, in order to cool the container 510, the bladder member 760 is expanded (e.g., inflated) so that the bladder member 760 contacts an exterior surface of the container 510 (FIG. 28B). Preferably, the expanded bladder member 760 is configured to substantially seal a portion of the cup holder cavity 752. Conditioned fluid (e.g., cooled or heated air) can then be delivered into the sealed or substantially sealed cavity 752 of the cup holder 750 through one or more inlets 754. The cooled air moves around the exterior of the container 510, as indicated by the arrows, and exits through one or more outlets 756. The temporary seal formed between the container 510 and the expanded bladder member 760 prevents or limits the escape of cooled air from the cup holder cavity 752. Thus, the heat transfer efficiency of the cup holder 750 can be enhanced.

In other embodiments, the bladders described herein can be filled with a highly compressible material (e.g., foam, gel etc.). In such arrangements, the bladders can be configured to be in fluid communication with the appropriate fluid source.

In addition, the bladders can comprise valves, pumps and other components or features that facilitate their expansion and deflation.

In certain embodiments, a cup holder includes one or more sensors which can be used to detect the presence of a beverage container or other item within the container's cavity. Such sensors can help control when the cup holder's cooling (or heating) features should be activated or deactivated. In addition, in embodiments having one or more bladder members 760, sensors can be used to determine when such bladder members should be expanded to engage a portion of a container positioned within the cup holder cavity.

Figure 29A:
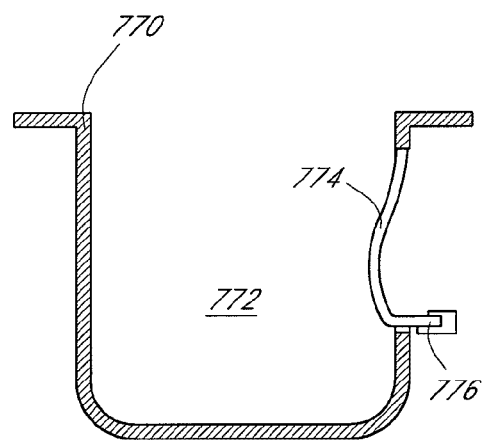
FIG. 29A illustrates an embodiment of a cup holder that is configured to detect the presence of an item placed therein.
Figure 29B:
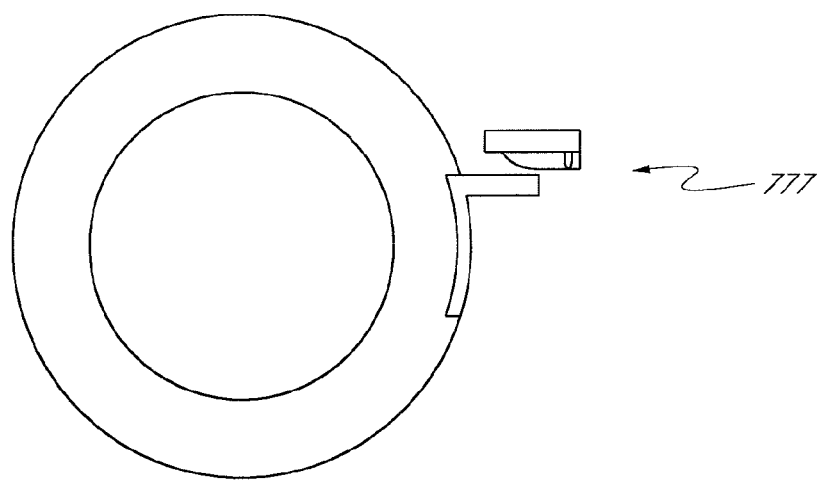
FIG. 29B schematically illustrates an embodiment of a contact switch for use in the cup holder of FIG. 29A.

In the embodiment illustrated in FIG. 29A, the cup holder 770 includes a resilient member 774 which protrudes into the cavity 772 of the cup holder 770. In this embodiment, the resilient member 774 includes a lever 776 which is configured to move relative to a contact switch 777. Therefore, when a beverage container is positioned within the cup holder 770, the resilient member 774, and thus, the lever 776 connected thereto, move relative to the contact switch 777. The contact switch 777 and the lever 776 are preferably configured so that even a slight movement of the resilient member 774 away from its resting position will establish a contact. However, the degree of relative movement between the contact switch 777 and the lever 776 that will establish a contact can be varied. In some embodiments, for example, the degree of relative movement that will establish a contact can be adjusted by a user (e.g., using a knob or other controller). Once the lever 776 contacts the contact switch 777, the cup holder 770 is informed that a container has been placed within it. The contact is broken when the container is fully removed from the cup holder cavity 772. Thus, when the contact between the lever and the switch is broken, the cooling system can be deactivated.

Automated methods of detecting the presence of a container within the cup holder cavity can be used to eliminate a manual switch that activates the heating or cooling function of the cup holder. In some embodiments, such methods is used in combination with a temperature sensor, which can detect whether a container is "hot" or "cold". The system can then automatically determine whether the container should be heated or cooled. In other embodiments, a manual switch can be used in conjunction with one or more automated methods, allowing the operator to override the automated function of the temperature control features. The terms "hot" and "cold" are relative terms whose values can vary. For example, in some embodiments, "hot" and "cold" are used to refer to temperatures that are above or below particular thresholds, respectively.

Figure 30:
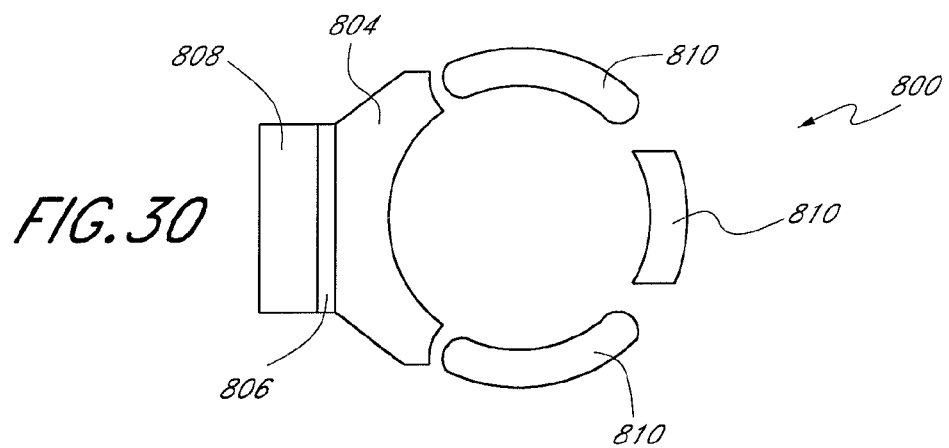
FIG. 30 illustrates a top view of an embodiment for biasing a thermoelectric device.

FIG. 30 illustrates another embodiment of a cup holder 800 configured to cool or heat a beverage container (e.g., cup, can, bottle, etc.) or other item placed therein. In the depicted embodiment, the cup holder 800 includes a heat transfer block 804 which partly defines the interior cavity 802 of the cup holder 800. A thermoelectric device 806 is conductively coupled to a portion of the heat transfer block 804 for temperature control purposes. Therefore, the heat transfer block can be heated or cooled to control the temperature of the container. The "hot" side of the thermoelectric device 806 can be placed into conductive contact with a heat sink/exchanger 808. The heat sink/exchanger 808 can comprise one or more convention elements (e.g., fins) that are configured to remove and/or transfer heat through convention.

With continued reference to FIG. 30, the cup holder 800 includes one or more other housing members 810 that form the cavity 802 into which a beverage container or other item can be placed. In some embodiments, the housing members 810 are also connected to thermoelectric devices to further enhance the temperature control features of the cup holder 800. The housing members 810 can be constructed of plastic or any other rigid or semi-rigid materials.

Figure 31A:
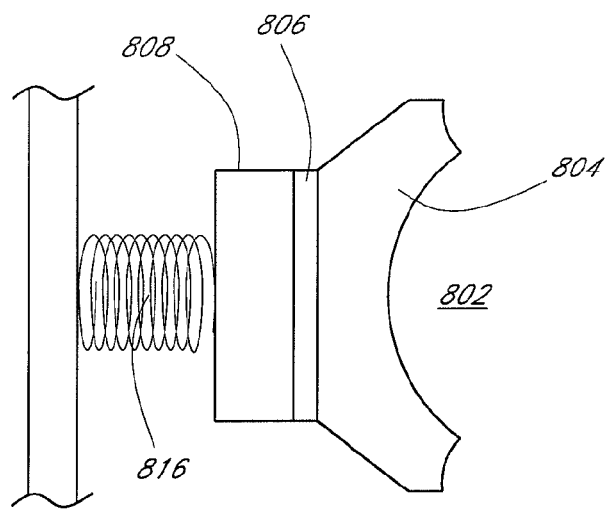
FIG. 31A illustrates a side view of an embodiment for biasing a thermoelectric device.

In order to provide good thermal conductivity with a container, the heat transfer block 804 can be movable relative to one or more of the other housing members 810. In FIG. 31A, the heat transfer block 804 is attached to a spring member 816, which, when compressed, is configured to exert a force on the heat transfer block 804 in the direction of the cup holder cavity 802. Such a spring-loaded heat transfer block 804 can be configured to contact a beverage container that is situated within the cup holder 800.

Figure 31B:
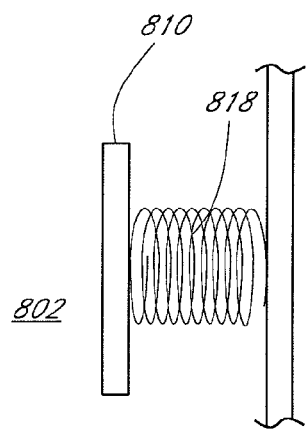
FIG. 31B illustrates a side view of another embodiment for biasing a thermoelectric device.

FIG. 31B illustrates a similar spring system incorporated into the design of one of the housing members 810. As shown, the housing member 810 is attached to a spring member 818 that urges the housing member 810 toward a container positioned within the cup holder cavity 802. In other embodiments, resilient members other than springs (e.g., pistons) are used to exert a force on the heat transfer block 804 and/or the housing members 810.

Figure 32A:
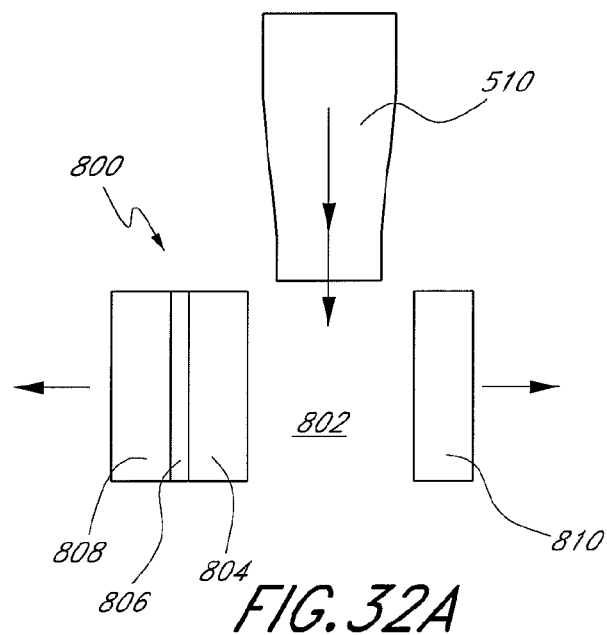
FIG. 32A illustrates a side view of one embodiment for biasing a thermoelectric device.

FIG. 32A illustrates a beverage container 510 (e.g., cup, soda can, etc.) being inserted within the cavity 802 of the cup holder 800. In the depicted embodiment, in order for the container 510 to be positioned within the cavity 802, the heat transfer block 804 and/or one or more housing members 810 may need to move away from the container 510. The spring members, as discussed above, can be configured to permit the heat transfer block 804 and the housing members 810 to move relative to each other so as to permit the container 510 to be securely positioned within the cup holder cavity 802. Thus, good thermal contact can be maintained between the heat transfer block 804 and an adjacent surface of the container 510. Further, cup holders which include a spring-loaded heat transfer block and other housing members can accommodate a wider range of container types, sizes, shapes and configurations.

Figure 32B:
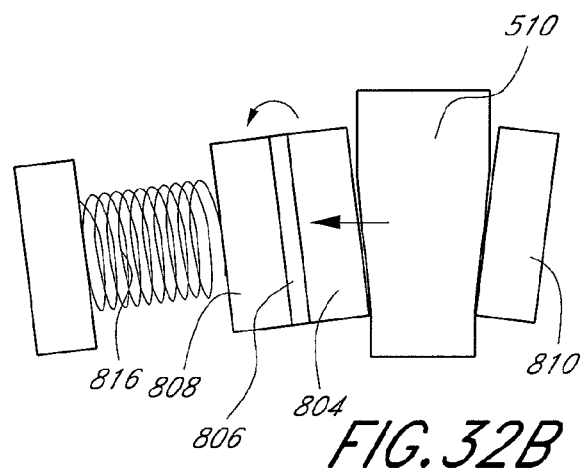
FIG. 32B illustrates a side view of another embodiment for biasing a thermoelectric device.

As illustrated in FIGS. 32B and 32C, the spring members 816, 818 effectively acting on a container 510 may cause rotation of the heat transfer block 804 and/or the housing members 810. Thus, in the embodiment depicted in FIG. 32C, one or more spring-loaded housing members 810 is used to balance the forces exerted on a beverage container by a spring-loaded heat transfer block. This can help eliminate unwanted moments and/or forces on a container 510 that, otherwise, may cause it to overturn.

Alternatively, the housing members 810 can be provided with a desired angle in the vertical direction in order to counter the moment generated by a spring-loaded heat transfer block 804. Such an angle can better accommodate a beverage container which has a draft angle or other non-vertical surface features. In one embodiment, the contact surface of a housing member 510 is shaped (e.g., angled) to substantially match the average angle for typical cup designs. In other arrangements, the angle of the housing members 510 may be self-adjusting or adjustable by a user to accommodate different container types, shapes, size and configurations.

Although the above embodiments have been described with the use of spring members, other types of resilient members may also be used, either in lieu of or in addition to springs. For example, helical springs, foam springs or other foam padding that provides the desired resiliency, flat springs and the like.

In other embodiments, as illustrated in FIG. 32D, the position of the heat transfer block 804 is connected to a pivot member 820, which allows the heat transfer block 804 to rotate as a beverage container 510 (e.g., cup, can, bottle, etc.)

is inserted and/or removed from the cup holder cavity. In addition, the rotation of the heat transfer block 804 can further improve contact (e.g., increase the contact surface area) between the heat transfer block 804 and the adjacent container 510.

With reference to the embodiment illustrated in FIG. 32E, the heat transfer block 804 is configured with an angle relative to vertical ($\theta$) to facilitate receipt of the container 510 within the cup holder cavity. As shown, the angled heat transfer block 804 provides a larger effective opening at the top of the cup holder cavity. Although not depicted in FIG. 32E, similar countered or angled housing members can be provided opposite and/or adjacent to the heat transfer block 804. Thus, as a beverage container 510 is lowered into the cup holder cavity, the heat transfer block 804 and/or one or more housing members can rotate to better match the outer shape of the container 510. As discussed above, such rotation can be accomplished using a spring member, pivot member, other resilient member or the like. As a result, contact between the heat transfer block and the container is improved, and the beverage container can be cooled (or heated) more effectively.

In some of the above embodiments, the heat transfer block translates and/or rotates in response to a container being placed in or removed from the cup holder. Consequently, the thermoelectric device and heat exchanger (e.g., fins) attached to the heat transfer block also translate and/or rotate accordingly. Thus, flexible air ducts can be used to connect one or more fans or blower to the heat exchangers. Alternatively, each assembly comprising a heat transfer block, thermoelectric device and heat exchanger can include its own blower that moves with the assembly.

As mentioned above, a temperature-controlled cup holder can be configured to automatically detect whether the container should be cooled or heated. For example, the cup holder can include one or more temperature sensors along an interior portion of the cup holder cavity. The temperature sensors can be constantly activated. Alternatively, the sensors can remain inactive until a container is inserted into cup holder. In such arrangements, the cup holder can also comprise one or more other sensors (e.g., as in the embodiments described above) that determine whether a container has been situated within the cup holder cavity 842, such as, for example, weight sensors, lever, contact switch, IR beam or the like. FIG. 33 illustrates a cup holder 840 comprising a total of three temperature sensors 846. The temperature sensors 846 can be positioned at any cup holder location, such as, for example, the interior wall of the cavity (as illustrated in FIG. 33), along the upper portion (e.g., rim) of the cup holder or the like. In some embodiments, temperature sensors 846 are desirably positioned along two or more portions of the cup holder 840 to allow temperature detection for containers of different types, shapes and sizes. In the embodiment depicted in FIG. 33, two temperature sensors 846 are positioned along the interior wall of the cup holder cavity 842, and the third temperature sensor 846 is positioned along the bottom of the cup holder cavity 842. However, in other embodiments, a cup holder can have more or fewer temperature sensors than illustrated in FIG. 33.

With continued reference to FIG. 33, one or more temperature sensors 848 can be positioned on a member 847 which extends into the interior portion of the cup holder cavity 842. For example, as discussed below with reference to other embodiments, the temperature sensor 848 can be situated on a spring, coil or other resilient member. Positioning the temperature on such an extending member 847 can increase the likelihood of adequate contact between the sensor 848 and a beverage container (not shown) positioned within the cup holder cavity 842, especially if the shape, size and general configuration of the container does not coincide with the internal surface of the cup holder cavity 842. For example, such a sensor 848 may be desirable if odd-shaped bottles (e.g., plastic containers for carbonated beverages, contoured bottles, etc.) are placed within the cup holder 840.

If the temperature sensors 846 detect a temperature change (e.g., higher or lower than ambient), the cooling (or heating) features of the cup holder 840 can be activated. For example, if a warm/hot disposable coffee cup is inserted into the cup holder, one or more temperatures sensors 846 will desirably detect a rise in temperature. Consequently, the temperature sensors 846 can signal to activate one or more thermoelectric devices to maintain the coffee cup and its contents at a desired heated temperature. If the cup or other beverage container is subsequently removed from the cup holder, the temperature drop can alert the sensors to deactivate the appropriate thermoelectric devices.

Likewise, the temperature sensors can be configured to activate one or more thermoelectric devices (and/or the associated fluid transfer devices) upon detecting the presence of a cooled or chilled container in the cup holder. For example, if a paper cup, aluminum can, plastic bottle or the like contains a cooled beverage or other food item, the temperature sensors can activate one or more thermoelectric devices that will provide a cooling effect to the cup holder.

As discussed, the temperature sensors can be configured to activate or deactivate a thermoelectric device when a sudden temperature change is detected. In alternative embodiments, activation or deactivation of the sensors occurs as a result of the sensors detecting temperatures above or below particular threshold levels. Further, the thermoelectric devices can be activated or deactivated based on one or more other sensors, such as, for example, weight sensors, IR beam detectors and the like. In other embodiments, a user is allowed to select the manner in which the thermoelectric devices, and thus the heating and/or cooling features, are activated and/or deactivated. By being configured to activate and/or deactivate the thermoelectric devices or other heating or cooling members, the temperature sensors can be used to ensure that a container is not overly heated or cooled.

To accommodate the preferences of different users, a cup holder can operate at different temperature settings. For example, based on the temperature detected by the sensors, the cup holder can operate at a "Very Hot," "Hot" or "Lukewarm" setting. It will be appreciated that more or fewer settings can be provided. Similar levels can be provided with respect to the cooling of containers. Alternatively, the user can manually select such a desired temperature setting (e.g., via a specific temperature setting on a dial).

In one embodiment, after a user places a container in the cup holder, the temperature sensors, based on the temperature or the resulting temperature change, determine whether the container should be cooled or heated. This can cause one or more thermoelectric devices to activate and/or deactivate. Further, an indicator light or other display can be triggered to alert the user of the operational mode of the cup holder. For example, if the cup holder begins heating the container, a red light could appear. Alternatively, if the cup holder begins cooling the container, a blue light could appear. In other embodiments, other ways of indicating such information to the user are provided. For example, an audible, text or an other sensory alert can be used.

If a user notices that the controller is not operating under the desired mode (e.g., cooling, heating, etc.), he or she can override the automatic mode selection by pressing a button, manipulating a knob or switch or the like. Alternatively, in some embodiments, a user can switch operational modes (e.g., heating to cooling, cooling to heating, etc.) by removing and reinserting the container into the cup holder cavity. In other embodiments, a user can switch modes by simply pressing a button. It will be appreciated that other ways of selecting the operational mode of the temperature controlled cup holder can be used.

In other embodiments, through the use of one or more sensors (e.g., temperature sensors, contact sensors, weight sensors, etc.), a cup holder can select the desired operational mode based on previous operational information or trends. For example, if the cup holder is configured to detect the general shape of the beverage container placed within its cavity, the cup holder can automatically select the same operational mode used the previous time such a beverage container was placed in the cup holder. Thus, in some embodiments, the selected operational mode depends on the exterior shape of the beverage container. In other embodiments, the operational mode can be selected based on one or more other factors, such as, for example, the exterior temperature of the container, the weight of the container and the like. Therefore, if the cup holder detects a container having a particular temperature, shape, weight and/or one or more other properties, it can be configured to mimic the operational mode used for such container in the past.

In other embodiments, a micro-switch or some other beverage/food sensing device can be used, either in lieu of or in addition to, the use of other types of switches.

Figure 34A:
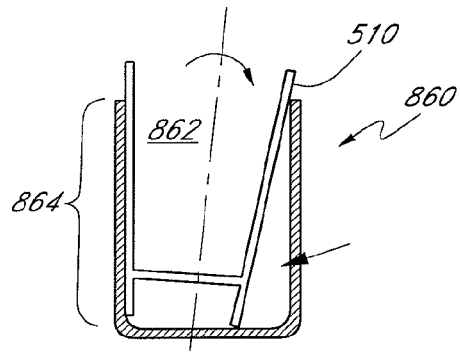
FIG. 34A illustrates an embodiment for biasing a container against a wall of a cup holder.

Depending on the size or shape of the particular container placed in the cup holder cavity, it may be difficult to provide a desired level of conductive cooling or heating. For example, FIG. 34A illustrates an embodiment of a container 510 having angled sides and a bottom recessed area from which the container contents are excluded. In such arrangements, the conductive heating/cooling of the depicted container 510 can be difficult as contact between the container 510 and the interior surfaces of the cup holder 860 are limited. Thus, in one embodiment, the container 510 is conductively cooled and/or heated by tilting the container as indicated in FIG. 34A. Consequently, improved contact between the beverage container 510 and the cup holder 860 occurs along the portion of the interior wall designated as 864.

Figure 34B:
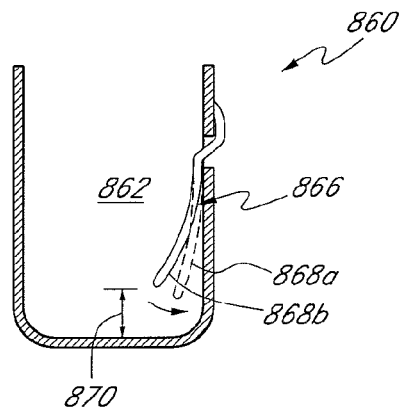
FIG. 34B illustrates another embodiment for biasing a container against a wall of a cup holder using a tilting member.

In order to bring such a container 510 into contact with a side wall or other surface of the cup holder, the cup holder can include a tilting member or similar device. With reference to FIG. 34B, the tilting member 866 is configured to articulate between a resting position 868a (shown in phantom) and an extended position 868b to provide improved contact between the container (not shown) and one or more interior surfaces of the cup holder 860. The tilting member 866 can be activated to extend to the second position 868b if it is determined that the container does not contact the tilting member 866 upon placement in the cup holder cavity. Other ways of detecting such limited contact can also be used to extend the tilting member 866. For example, one or more contact sensors (not shown) positioned along the inner surface of the cup holder cavity 862 can determine that additional conductive contact is needed.

In some embodiments, the tilting member 868 includes a flat spring or other metal (e.g., steel), plastic or other resilient or non-resilient materials. For a more efficient tipping motion, the distance 870 between the leading edge of the tipping member 866 (at its extended position) and the bottom surface of the cup holder cavity 862 can be relatively small, as indicated in FIG. 34B. However, for certain types of containers, such as, for example, rounded bottles, it may be desirable for distance 870 to be greater or smaller than indicated in FIG. 34B. This can help ensure that the tilting member will contact the container along a substantially vertical portion of the container.

The tilting member and the other components of the cup holder can be configured to prevent damage to the container, such as, for example, collapsing, puncturing, cracking, denting, buckling or the like. Thus, in one embodiment, the tilting member can contact the container (e.g., coffee cup) at approximately 30 mm from the bottom of the container. In other embodiments, depending on the type of beverage container or other item to be placed in the cup holder cavity, this distance can be smaller or greater than 30 mm.

Further, as discussed in greater detail herein, to ensure that the container is not damaged by the tilting member, the contacting portion of the tilting member can be curved or otherwise shaped to reduce point loads on a beverage container (e.g., cup, can, bottle, etc.).

Figure 35:
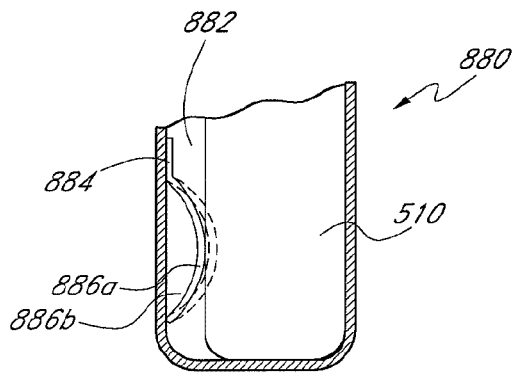
FIG. 35 illustrates one embodiment for biasing a container against a wall of a cup holder.

With reference to the embodiment illustrated in FIG. 35, the resilient member 884 is attached to an inside surface of the cup holder cavity 882. The resilient member 884 (e.g., cantilever spring) can be a metal or plastic spring or any other device. In FIG. 35, the resilient member 884 has a generally rounded (e.g., circular, concave, bowed, etc.) outer surface that extends toward the center of the cup holder cavity 882. While in its rested position (as illustrated by phantom line 886a), the resilient member 884 extends far enough into the cup holder cavity 882 so that it contacts at least a portion of a container 510 inserted therein. As the container 510 is fully inserted into the cavity 882 of the cup holder 880, the resilient member 884 is moved away from the container 510. Consequently, a resiliency of the member 884 creates a lateral force against the container 510, urging the container 510 into contact with an opposite interior wall of the cup holder 880.

Figure 36A:
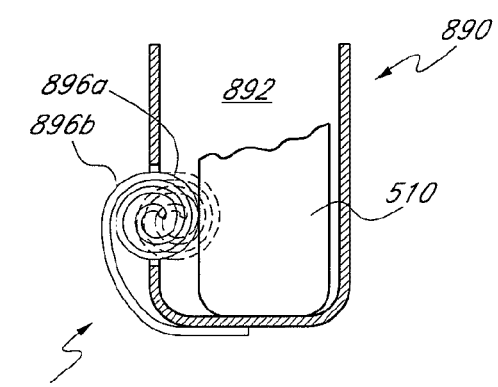
FIG. 36A illustrates another embodiment for biasing a container against a wall of a cup holder.
Figure 36B:
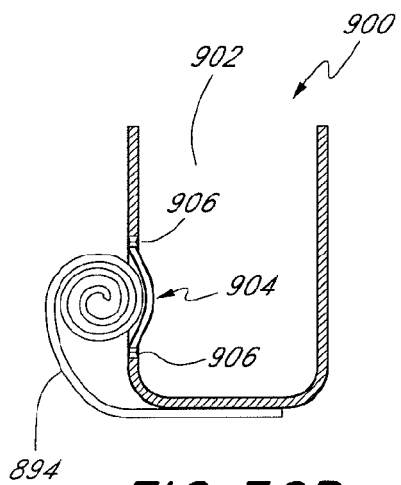
FIG. 36B illustrates yet another embodiment for biasing a container against a wall of a cup holder.
Figure 36C:
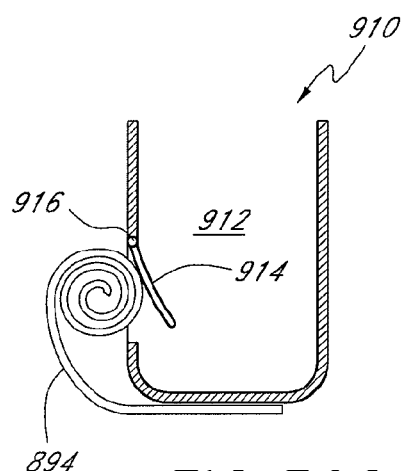
FIG. 36C illustrates still another embodiment for biasing a container against a wall of a cup holder.
Figure 39A:
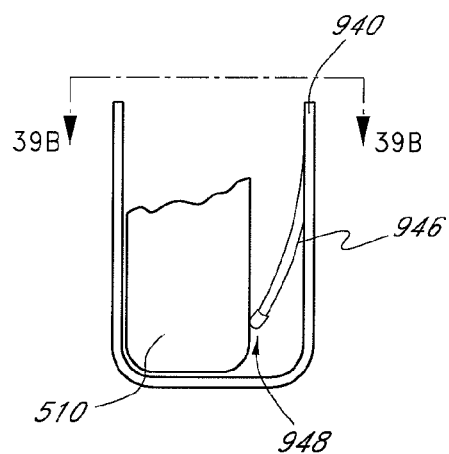
FIG. 39A illustrates a side view of one embodiment for biasing a container against a wall of a cup holder.
Figure 39B:
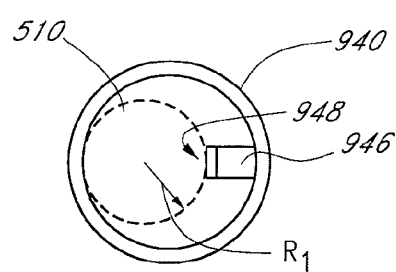
FIG. 39B is a cross-sectional view of the cup holder of FIG. 39A.
Figure 39C:
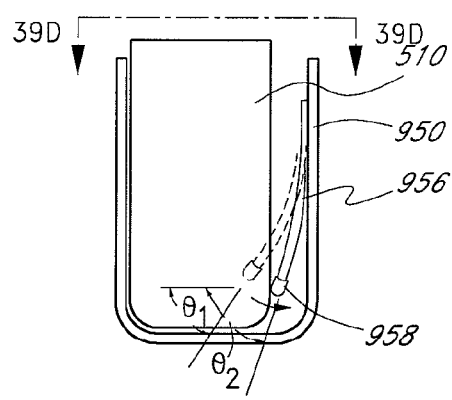
FIG. 39C illustrates a side view of the cup holder of FIG. 39A in which a beverage container has been placed.
Figure 39D:
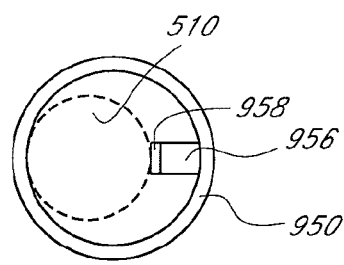
FIG. 39D is a cross-sectional view of the cup holder and beverage container of FIG. 39C.

Similarly, as illustrated in the embodiment of FIG. 36A, a coiled spring 894 can be used to create the same resilient force on the container 510 to bring it into conductive contact with an interior wall of the cup holder 890. Additional embodiments using a coiled spring 894 are illustrated in FIGS. 36B and 36C. Use of a coiled spring having a constant radius desirably provides a constant force to deflection curve. However, it will be appreciated that springs that do not provide a constant force to deflection curve can also be used.

In FIG. 36B, a portion of the cup holder wall comprises a flexible member 904 (e.g., rubber or elastomeric patch) or other non-rigid area. In the depicted embodiment, the rubber member 904 is configured to move inwards, towards the interior of the cup holder cavity 902, upon the application of an external force. For example, a coiled spring 894 can be positioned adjacent to the flexible member 904 so that it urges the flexible member 904 into the interior cavity 902 of the cup holder 900. In some arrangements, bellows 906 or other stretchable members can be positioned around the rubber member 904 to facilitate movement of the rubber member 904 relative to the remaining portion of the cup holder 900. Insertion of a container (not shown) into the cavity 902 forces the rubber member 904, the bellows 906 and the coiled spring 894 in a direction generally away from the container. As discussed above with reference to FIGS. 35 and 36A, the resilient force created by the coiled spring 894 can help urge the container into contact with an opposite portion of the cup holder cavity to facilitate with conductive heat transfer.

In the embodiment illustrated in FIG. 36C, a similar effect is accomplished by replacing the rubber member with a hinged lever 914, gate or the like. In some of the embodiments discussed above, a spring or other resilient member desirably provides a force on the beverage container that is substantially constant, regardless of the extent to which such spring or other resilient member protruding within the cup holder cavity is deflected. However, in other embodiments, the force exerted by a resilient member on a beverage container can vary according to its deflection.

One concern with using a resilient or pushing member to urge the container into conductive contact with the cup holder includes the possibility of damaging (e.g., collapsing, puncturing, cracking, denting, buckling, etc.) the container. Such damage is likely when the pushing force generated by the resilient member is excessively large. In addition, the container may be damaged a mismatch exists between the curvature of the container and the curvature of the portion of the resilient member that contacts the container. One embodiment of such a mismatch is illustrated in FIGS. 37A and 37B. As shown, the leading edge 925 of the pusher 924 is substantially flat, while the container 510 has a generally rounded, cylindrical body. Thus, such a configuration can create undesirable concentrated point forces where the pusher 924 contacts the container 510.

With reference to FIG. 38, the pusher 934 can be advantageously shaped to substantially match the shape of a container 510. In the illustrated embodiment, the pusher 934 includes a generally curved leading edge 935 which has a diameter approximately equal to that of the container 510 placed in the cup holder 930. The diameter of the leading edge 935 of the pusher may be larger or smaller than the diameter of the adjacent container surface.

In some embodiments, as illustrated in FIGS. 39A-39D, the tip or leading edge of the pusher 946, 956 advantageously includes a deformable tip 948, 958 that is configured to generally conform to the outer shape of the adjacent container 510, thereby helping to avoid point stresses on the container 510. In addition, the deformable tip 948, 958 of the pusher 946, 956 can be configured to change shape as a container 510 is being moved relative to the cup holder cavity. The deformable tip can be attached to the pusher 946, 956 using one or more connection methods, such as, for example, using adhesives, fasteners, etc. In other embodiments, the deformable tip 948, 958 is molded or otherwise formed so that it forms a unitary member with the pusher. The deformable tip 948, 958 can be manufactured from one or more flexible or malleable materials, such as, for example, rubber, soft thermoplastics, elastomers, silicone, gel and/or the like.

Figure 40:
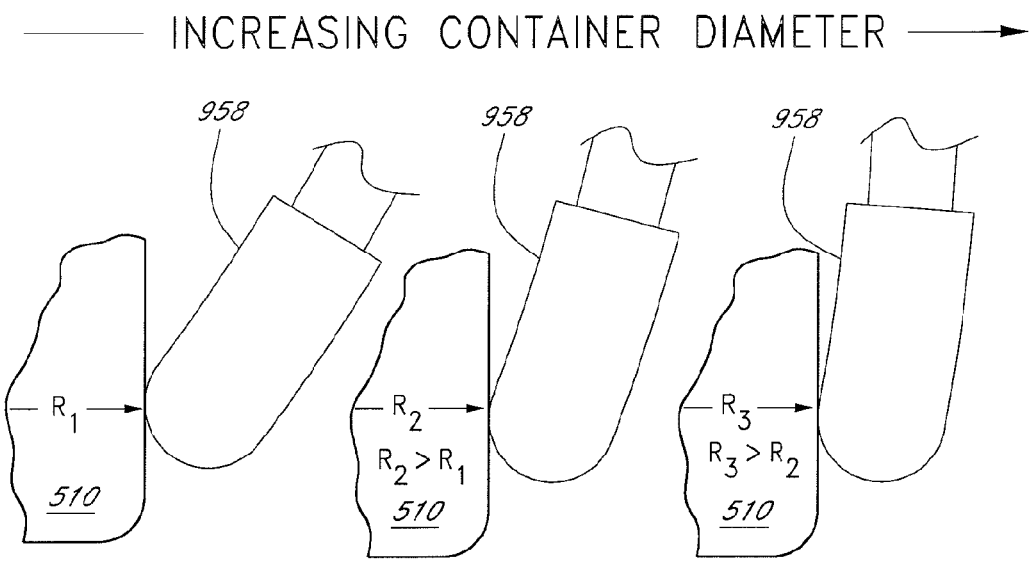
FIG. 40 illustrates the varying positions of a biasing member according to one embodiment.

With reference to FIG. 40, the pusher tip 958 is illustrated in different positions according to the extent to which it is deflected by an adjacent container. As shown, the effective diameter of the tip 958 can change as the position of the pusher changes. Therefore, as the diameter of a container increases, the effective diameter of the tip also increases (shown left to right in the illustrated chart). Thus, the use of a deformable tip at the leading edge of a pusher, as discussed above, can further ensure that a beverage container will not be damaged when positioned within a cup holder cavity.

Figure 41A:
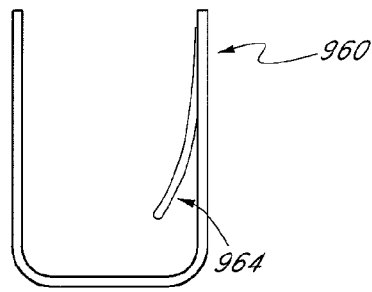
FIG. 41A illustrates a cross-sectional view of another embodiment for biasing a container against a wall of a cup holder.
Figure 41B:
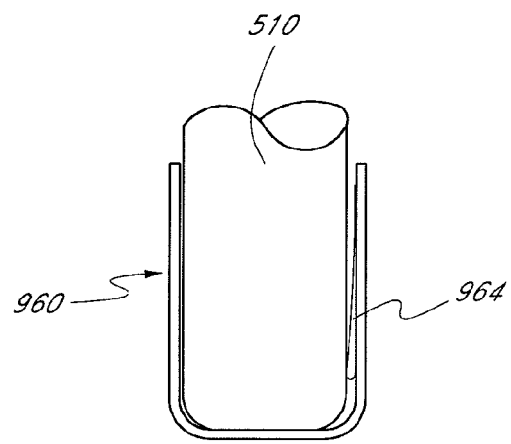
FIG. 41B illustrates a side view of the cup holder of FIG. 41A in which a beverage container has been placed.

In one embodiment, as illustrated in FIGS. 41A and 41B, the pusher 964 is configured to lie generally flat when fully deflected by a container 510. This can be desirable when attempting to place a relatively large diameter container within the cup holder. As shown in FIG. 41B, the clearance between the outside of the container 510 and the interior walls of the cup container cavity is relatively tight.

In some embodiments, the cup holder is configured to accommodate beverage containers which have an uneven exterior shape or one or more other unique features or characteristics. For example, in FIG. 42, the cup holder 970 includes a pusher 974 that can be configured to clear most or all steps 976 or other contours that may be present along the exterior surface of a container 510. If the pusher 974 in FIG. 42 were permitted to engage the container 510 (e.g., plastic bottle) above the step 976, the user may encounter problems removing the container from the cup holder cavity. Thus, in the illustrated embodiment, the pusher 974 is positioned at a sufficiently low location to prevent such undesirable "catching."

In one embodiment, the pusher 974 is positioned so that its leading edge engages the container to more than 40 mm from the bottom of the container. It will be appreciated that such distances may be greater or smaller to accommodate changes in container technology. In some embodiments, the pusher 974 is configured to move (e.g., slide) up and down along an interior cavity wall. This allows a user to adjust the pusher 974 according to the type of beverage container 510 that will be placed within the cup holder. In other arrangements, the cup holder, using one or more sensor as described herein, can detect the type of beverage container and automatically adjust the vertical position of the pusher 974. The pusher can be adjusted using a motor or some other type of mechanical device.

In some embodiments, a roller pusher 984 is used to urge a container 510 into conductive contact with an interior wall of the cup holder 980. With reference to the embodiments illustrated in FIGS. 43A-43E, a roller pusher 984 includes a curved surface 986 which is configured to engage an outer portion of the container 510. Further, the roller pusher 984 can be configured to rotate about an axis 987 to facilitate movement of the pusher 984 relative to an adjacent container 510, especially when the container 510 is being inserted into or removed from the cup holder cavity. In addition, as with other embodiments discussed herein, the curved outer surface 986 of the roller pusher 984 helps prevent concentrated loading on the sides of the container 510. This can avoid or minimize buckling, denting, puncturing and/or other damage to the container 510.

With reference to FIG. 43C-43E, the roller pusher (not shown) can be positioned on a specially designed receiver member 990 that includes openings 994 for the roller pusher. In the illustrated embodiment, a pin 985 (FIGS. 43A and 43B) which coincides with axis 987 is shaped, sized and otherwise configured to be placed within the corresponding openings 994 of the specially designed receiver member 990. Preferably, a sufficient clearance between the inner diameter of the openings 994 and the outer diameter of the pin 985 exists to permit the roller pusher 984 to rotate relative to the receiver member 990. This can facilitate with the positioning of a beverage container into and/or out of the cup holder cavity. It will be appreciated that a roller pusher 984 can have a different shape than illustrated herein. In addition, the method the roller pusher 984 connects to the receiver member 990 can also be different.

Figure 44A:
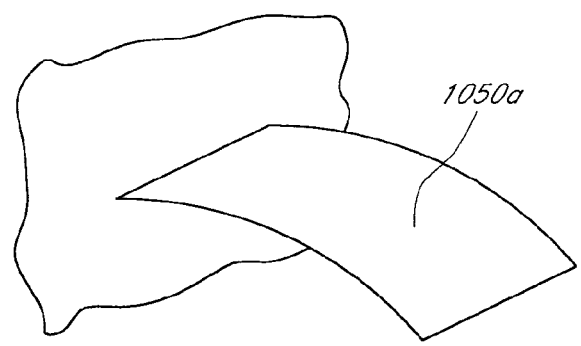
FIG. 44A illustrates a perspective view of one embodiment of a pusher or biasing member.
Figure 44B:
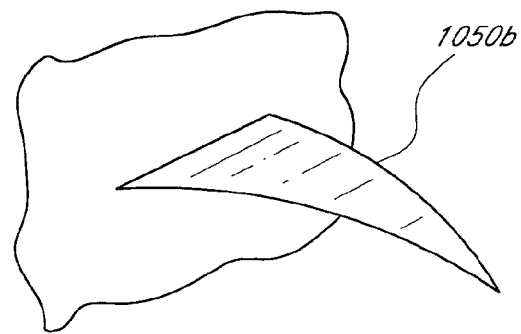
FIG. 44B illustrates a perspective view of another embodiment of a pusher or biasing member.
Figure 44C:
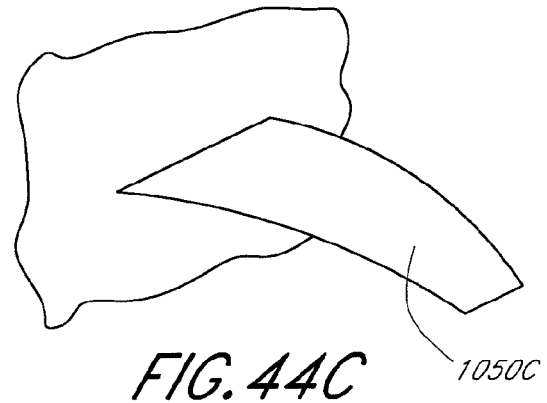
FIG. 44C illustrates a perspective view of yet another embodiment of a pusher or biasing member.

FIGS. 44A-44C illustrate three different embodiments of a cantilever type pusher 1050a, 1050b, 1050c used to urge a container (not shown) into conductive contact with an interior portion of the cup holder cavity. As shown, the pushers 1050a, 1050b, 1050c can have any shape, such as for example, generally triangular (FIG. 44B) or generally trapezoidal or rectangular (FIGS. 44A and 44C). One or more factors can be considered in choosing the size, shape and general configuration of a pusher, such as, for example, the anticipated forces acting on the pusher, the diameter and depth of the cavity, etc. In one embodiment, for a cantilever spring type pusher, a trapezoidal shaped pusher is configured to provide enhanced resistance against various forces and bending stresses.

Figure 45:
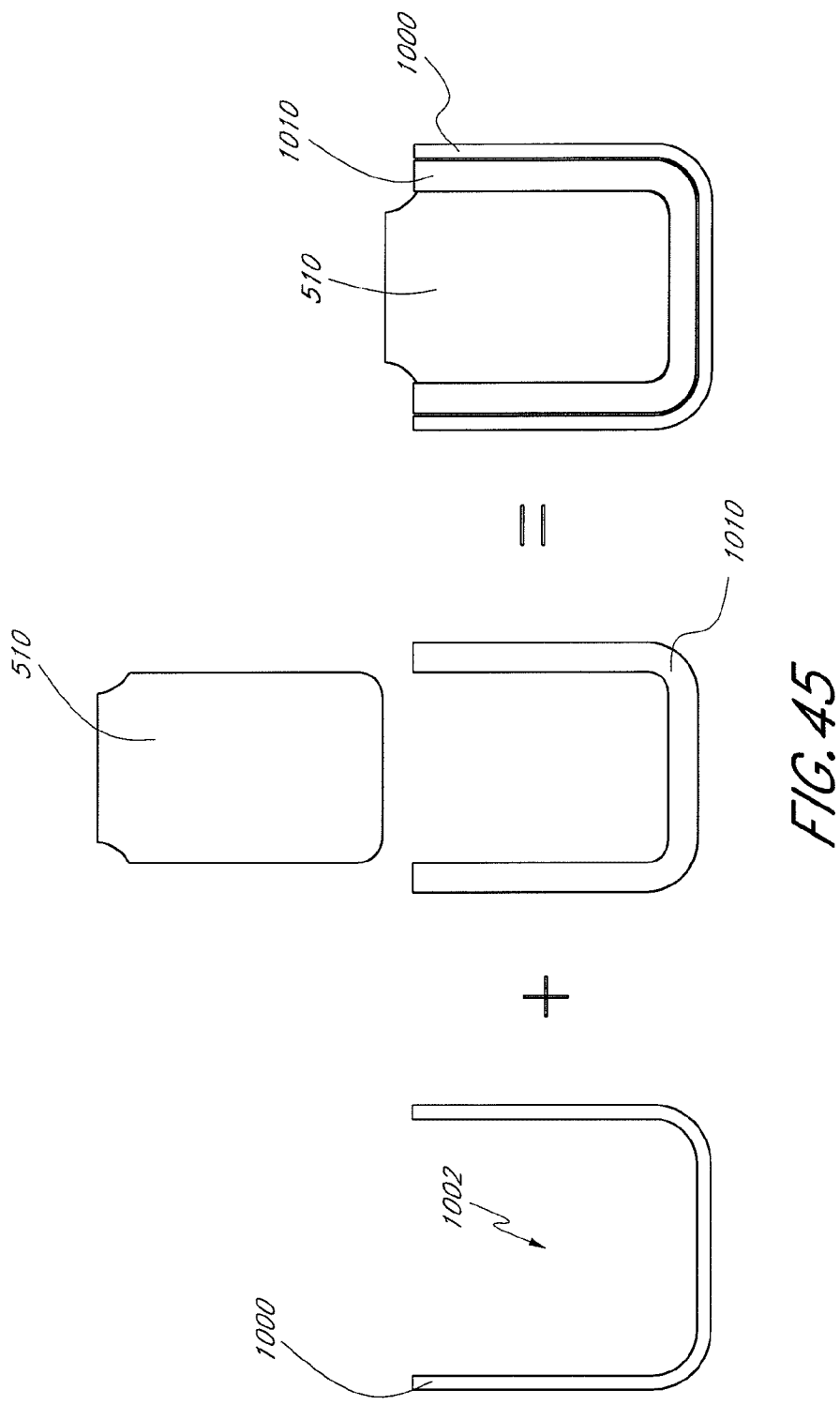
FIG. 45 illustrates side views of a cup holder and a cup holder insert according to one embodiment.

FIG. 45 illustrates one embodiment of a cup holder 1000 comprising an insert 1010, which is configured to snugly retain an aluminum can (e.g., a 12-ounce soda can). Therefore, if the diameter or other transverse size of the cup holder's cavity is larger than a particular type beverage container (e.g., aluminum can, disposable coffee cup, plastic bottle, energy drink can, etc.), an insert 1010 can be included to provided a tighter, more secure fit. In some embodiments, the insert 1010 is constructed of a material that is efficient is conducting thermal energy to provide enhanced heat transfer between the beverage container cup holder 1000, the insert 1010 and the container 510. In some embodiments, the outside of the insert 1010 is configured to conform to the shape of the cup holder cavity 1002. However, in other embodiments, the clearance between the outside of the insert 1010 and the inside of the cup holder 1000 can vary. It will be appreciated that inserts specifically designed for other types of containers can also be used.

Multiple-Cavity Beverage Containers

Figure 46A:
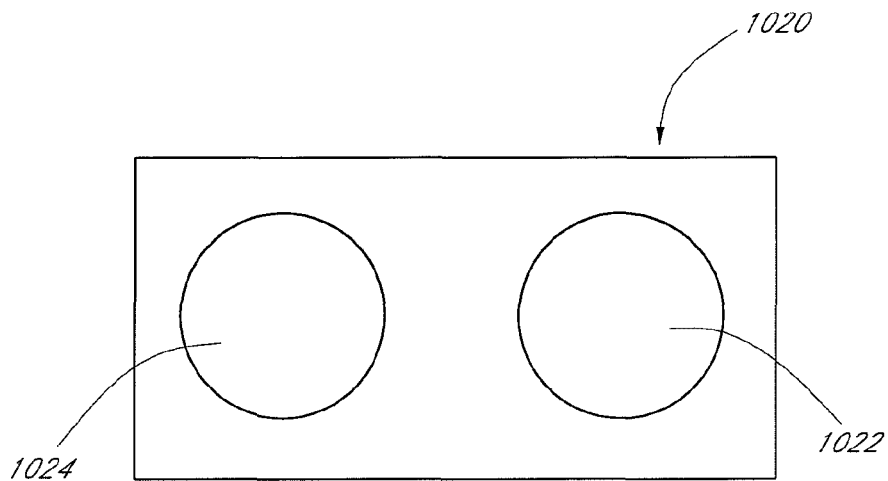
FIG. 46A illustrates a top view of one embodiment of a dual cup holder assembly.

FIG. 46A illustrates a cup holder 1020 having two side-by-side cavities 1022, 1024, each of which is configured to receive a container. Such an arrangement can allow users to store, and if desired possibly temperature regulate, two or more different containers in a single cup holder assembly. In some embodiments, one cavity 1022 can provide a cooling effect to a beverage container placed therein, while the other cavity 1024 provides a warming effect to a beverage container placed therein. Alternatively, both cavities 1022, 1024 can be cold or hot, as desired by the user. In other embodiments, additional cavities (e.g., three, four, five, etc.) can be provided.

Figure 46B:
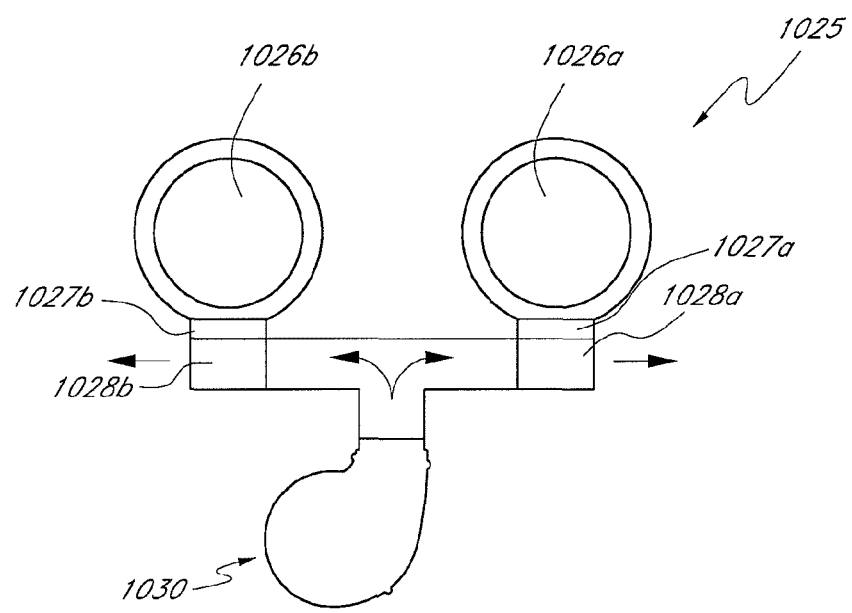
FIG. 46B illustrates a schematic of one embodiment of a dual cup holder assembly.

In the embodiment of a multi-cavity cup holder arrangement 1025 illustrated in FIG. 46B, each cavity 1026a, 1026b includes a thermoelectric device (TED) 1027a, 1027b coupled to dedicated heat exchanger 1028a, 1028b (e.g., fins). In other embodiments, a cup holder arrangement can include more or fewer cavities, TEDs and/or heat exchangers. As illustrated, a first side of the TED 1027a, 1027b can be conductively coupled to the cup holder cavity 1026a, 1026b as described above. In FIG. 46B, the first side of each TED is configured to be cold. Therefore, the second side, which is coupled to a heat exchanger is hot.

With continued reference to FIG. 46B, the cup holder arrangement 1025 includes a single blower 1030 which is configured to deliver air or other fluid past both heat exchange units 1028a, 1028b (e.g., fins). Thus, heat generated by the second side of the TEDs 1027a, 1027b can be transferred to the passing fluid and advantageously moved away from the cup holder arrangement 1025. By using a single blower 1030 to deliver fluid to both heat exchangers 1028a, 1028b, the size of the depicted cup holder arrangement 1025 can advantageously reduced. In addition, the construction of the cup holder arrangement is simplified and the electrical demand related to air delivery can be reduced.

Figure 47A:
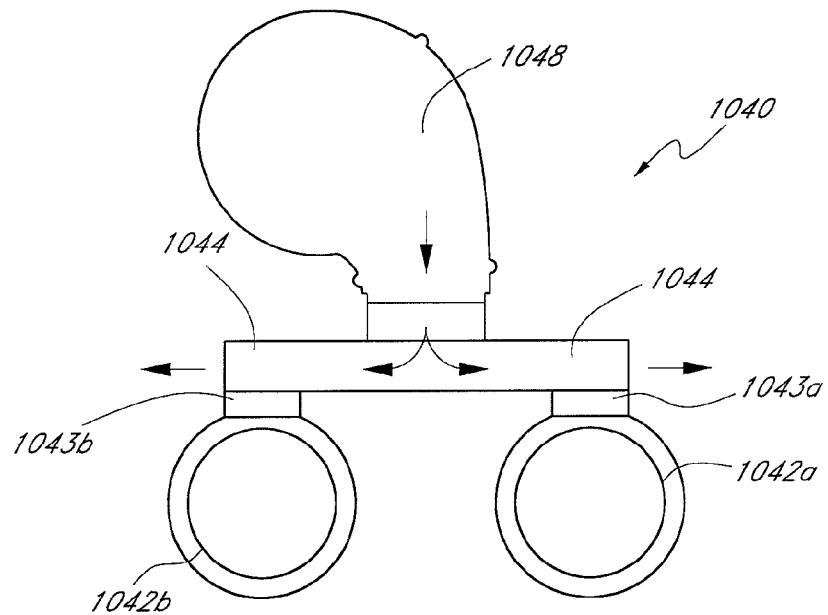
FIG. 47A illustrates a schematic of another embodiment of a dual cup holder assembly.
Figure 47B:
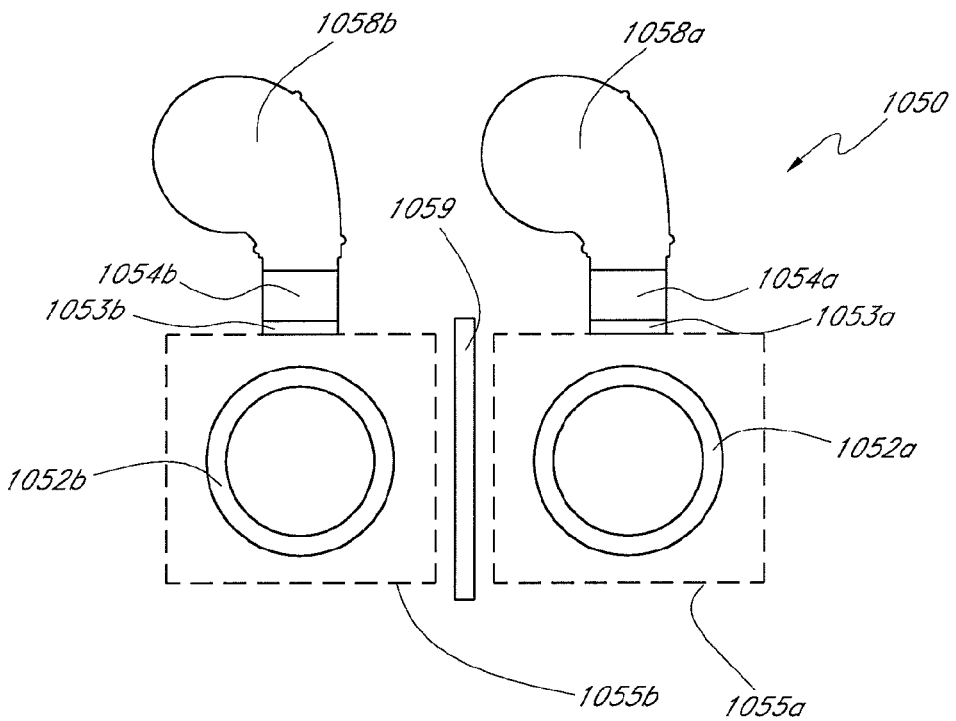
FIG. 47B illustrates a schematic of yet another embodiment of a dual cup holder assembly.
Figure 47C:
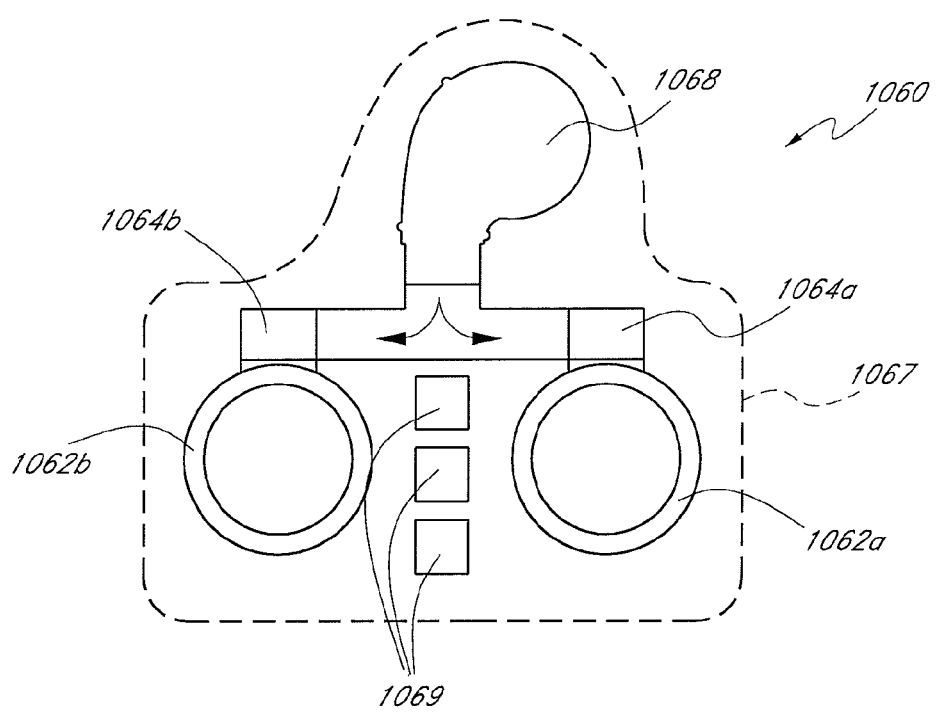
FIG. 47C illustrates a schematic of still another embodiment of a dual cup holder assembly.

FIGS. 47A-47C illustrate other embodiments of a multi-cavity cup holder 1040, 1050, 1060. In FIG. 47A, two thermoelectric devices 1043a, 1043b are thermally connected to a common heat exchanger 1044. Air can be delivered to the common heat exchanger 1044 using a single blower or fan 1048. In one embodiment, the heat exchanger can be constructed from extruded aluminum or other materials with desirable heat transfer properties (e.g., copper, beryllium, etc.). In some embodiments, the thermal communication between the two thermoelectric devices 1043a, 1043b in the form of a common heat exchanger 1044 can affect the thermal performance of the cup holder's cooling or heating system.

In the embodiment of a multi-cavity cup holder assembly 1050 schematically illustrated in FIG. 47B, the thermal bridging or thermal communication between the two cavities 1052a, 1052b is reduced by separating the two heat exchange elements 1054a, 1054b from each another. As shown, to enhance thermal isolation, the two cavities 1052a, 1052b are in separate housings 1055a, 1055b. Further, a flow of air (represented by arrow 1059) can be passed between the two cavities 1052a, 1052b for additional thermal isolation. Airflow between the two cavities 1052a, 1052b can be provided in a dedicated duct or conduit. Alternatively, a volume of air can be continuously or intermittently delivered between the two cavities 1052a, 1052b (or housings 1055a, 1055b) without using a duct or conduit.

With reference to FIG. 47C, the two cavities 1062a, 1062b are contained within a single housing 1067. As shown, each cavity 1062a, 1062b includes its own heat exchanger 1064a, 1064b. In addition, a single blower or fan 1068 is used to direct fluid (e.g., air) to the heat exchangers 1064a, 1064b. In order to minimize thermal bridging or communication between the two cavities 1062a, 1062b, conduction holes 1069 or similar thermal isolation members are provided between the cavities 1062a, 1062b. Other insulating members or methods can be used, either in lieu of or in addition to conduction holes 1069.

With reference now to the embodiment illustrated in FIGS. 48A-48J, a cup holder assembly 1100 comprises a pair of cup holders 1102 provided generally within a single housing 1104. In one embodiment, the housing 1104 can form part of a center console between a pair of seats (e.g., the front or rear seats in an automobile). The housing 1104 of the console defines a pair of cavities 1106 with an upper, open end and a closed (or substantially closed lower end). The cavity 1106 can be formed from side and bottom walls formed, at least in part, by a conductive material (e.g., aluminum, copper, etc.). As will be described in more detail below, the conductive material can be conductively coupled to a "cold" side or "first" side of a thermoelectric device.

The cup holder assembly 1100 can be further provided with a set of control switches 1110. In the illustrated embodiment, the control switches 1110 correspond to a hot button and a cold button for each cup holder 1102. Accordingly, each cup holder 1102 can be set to a hot or a cold mode in which the cup holder 1102 is cooled or heated to a desired temperature or other setting. As described above, in modified embodiments, the assembly 1100 can be provided with additional switches and/or modified input devices (e.g., dials, knobs) and/or sensors for detecting the presence and/or temperature of a container within the cup holder. In yet other embodiments, where the control system for the cup holder 1102 is integrated with the car's control system, a user can select a setting (e.g., "hot," "cold," actual temperature, etc.) using the car's control panel (e.g., dashboard controls).

Figure 48A:
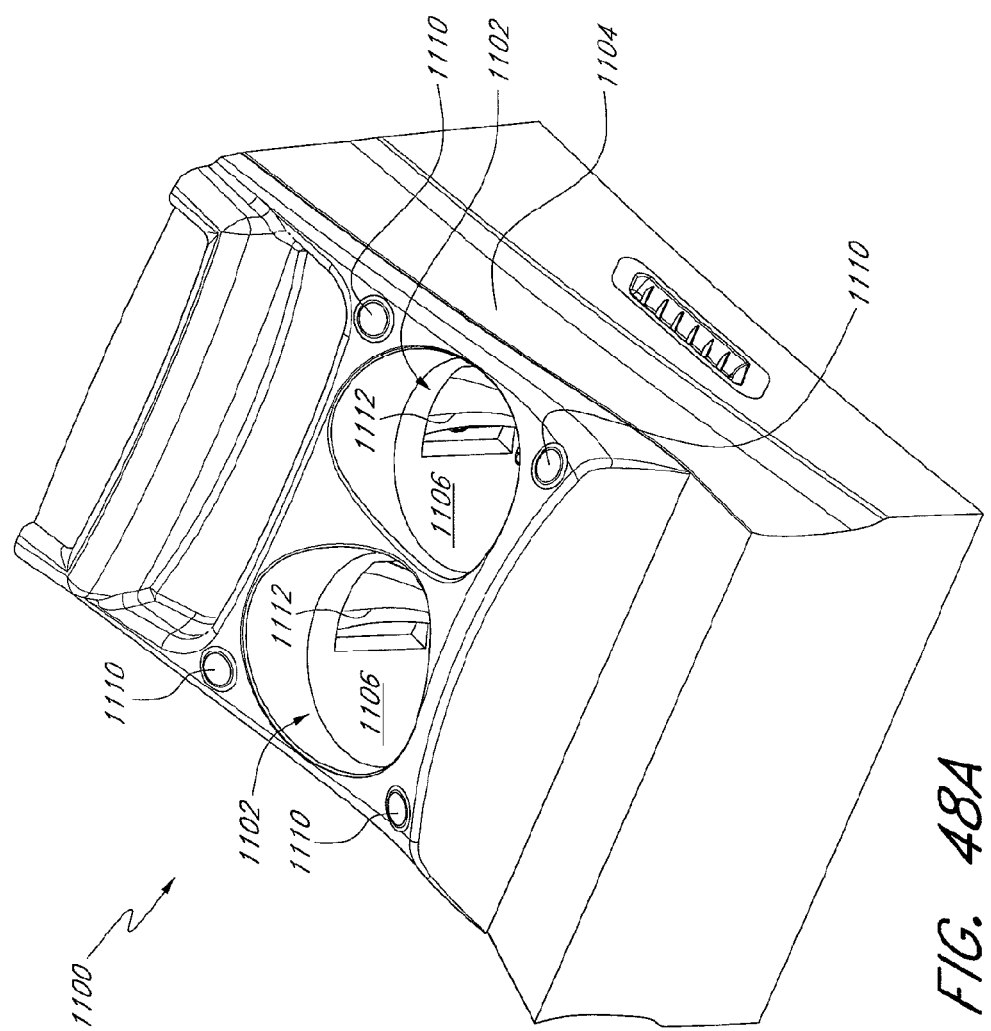
Figure 48B:
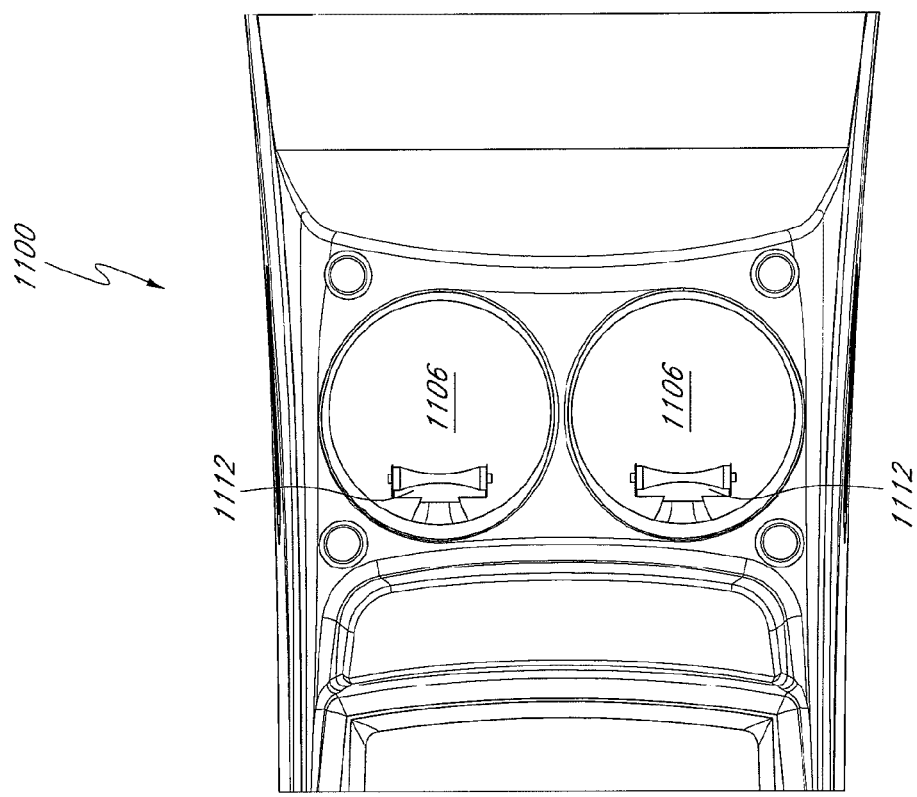
Figure 48D:
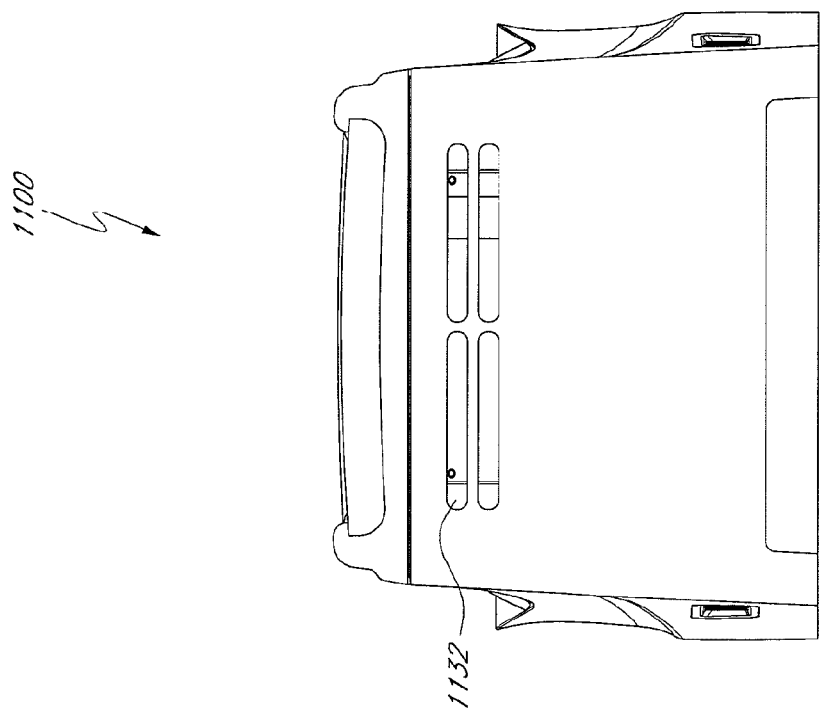
Figure 48C:
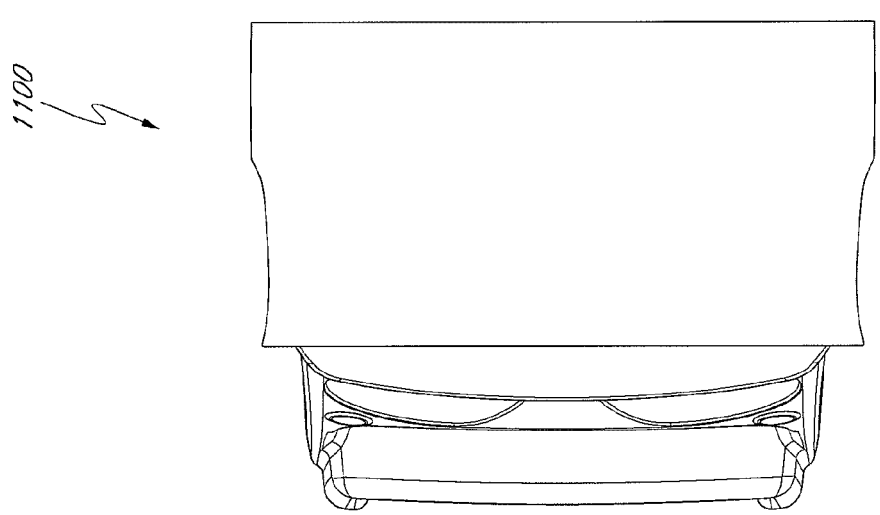
Figure 48E:
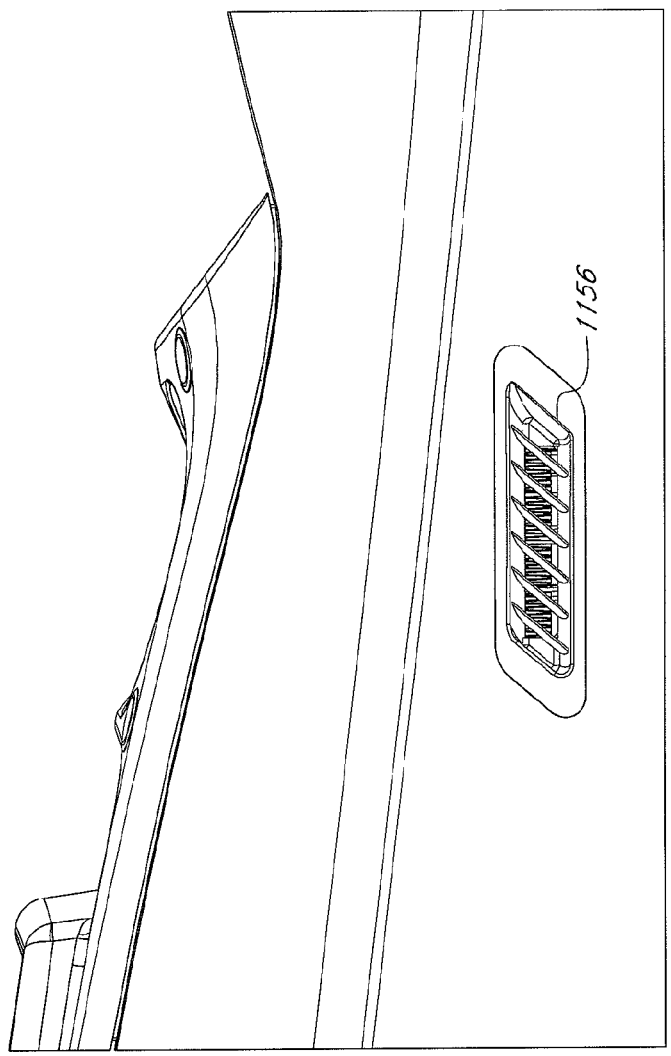

With reference to FIGS. 48A and 48B, the cup holders 1102 can be provided with a bias element 1112 (e.g., roller pusher), which can be configured as described above with reference to FIGS. 43A-43E. In other embodiments, the bias element 1112 can be any of a variety of the bias elements described herein or modifications thereof. In the illustrated embodiment, the biasing element 1112 comprises a curved flange that includes a roller at the distal end of the curved flange. The proximal end of the bias element can be attached to the inside of the console. As explained above, the bias element 1112 advantageously pushes the container or cup with in the cavity against one side of the cup holder 1102. In this manner, conductive heat transfer between the conduction element and the container is enhanced.

With reference to the embodiment illustrated in FIG. 48F, which is a bottom view of the cup holder assembly 1100, a pair of thermoelectric elements 1120 are positioned below the cup holders 1102. Accordingly, each cup holder 1102 is preferably associated with an individual thermoelectric unit or device 1120 that is positioned generally below the bottom end of the cavity. The thermoelectric device 1120 comprises a first side and a second side each of which can be the cold or hot side of the device. The first side of the device can be placed into conductive contact with the conduction element. The second side, in turn, can be placed into conductive contact with a heat sink/exchanger 1122, which is shown in FIGS. 48G and 48H when a lower housing element 1124 is removed from the console. In the illustrated embodiment, the heat sink 1112 comprises a convection element or other heat transfer devices (e.g., fins), which are configured to remove and/or transfer heat through convention.

Figure 48F:
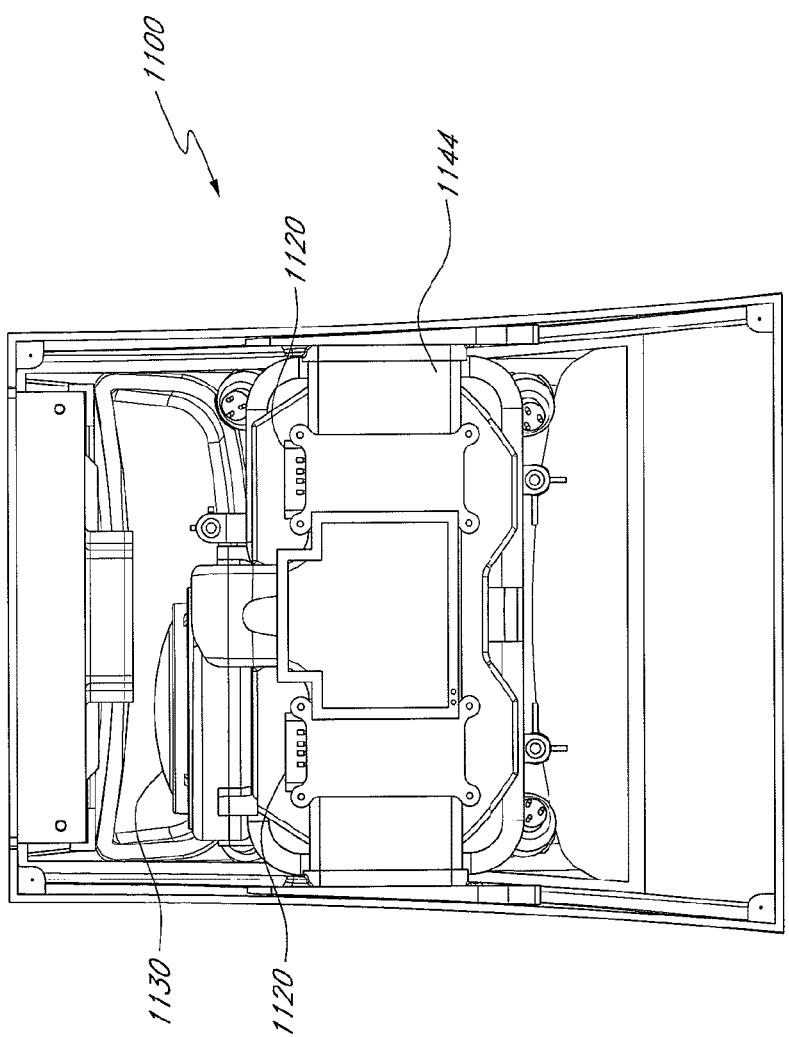
Figure 48G:
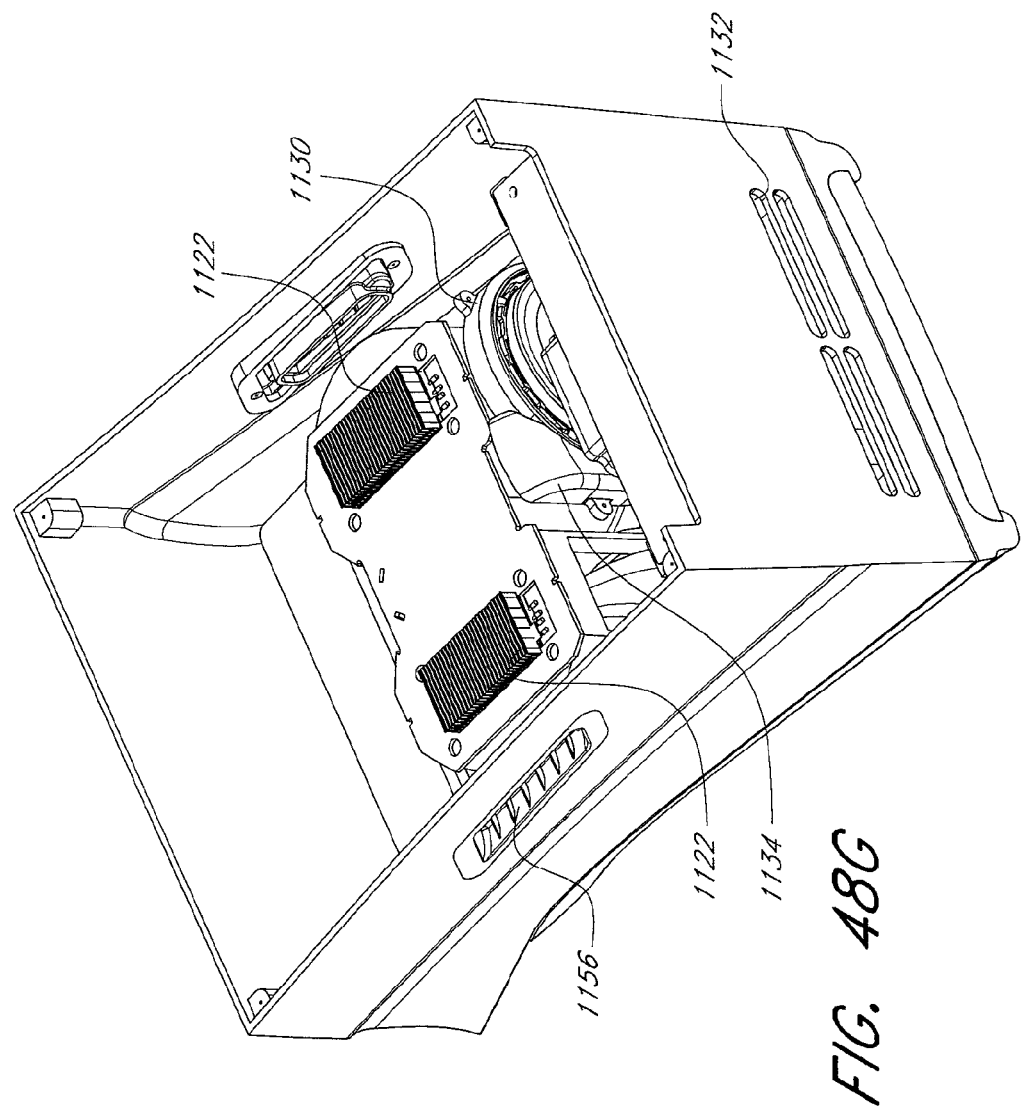
Figure 48H:
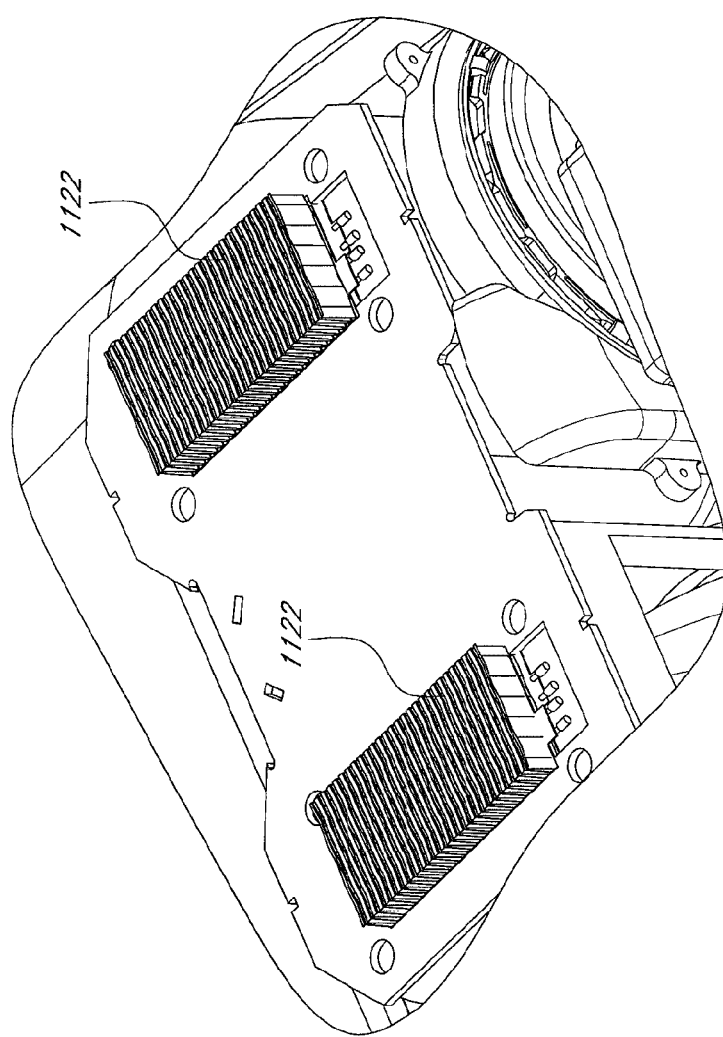

With continued reference to FIG. 48F, the assembly 1100 can include a fluid transfer device 1130 (e.g., a fan), which is configured to force air or another cooling fluid over the heat exchangers 1122 to aid convection through the heat exchangers 1122. Consequently, heat can be removed from the heat exchangers 1122, away from the cup holder assembly 1100.

The thermoelectric device 1120 is preferably a Peltier device as described above. A thermal interface material (e.g., grease, pad or solder) can be used to conductively couple the first side of the device 1120 the conduction element of the cup holder. In a similar, manner a thermal interface (e.g., grease, pad or solder) can be used to conductively couple the second side plate to a heat exchanger 1122. The heat exchanger 1122 is configured transfer heat to or from the ambient air. The fluid device 1130 is preferably configured to direct fluid through the heat exchanger 1122 to facilitate the transfer or removal of heat through convention.

Figure 48I:
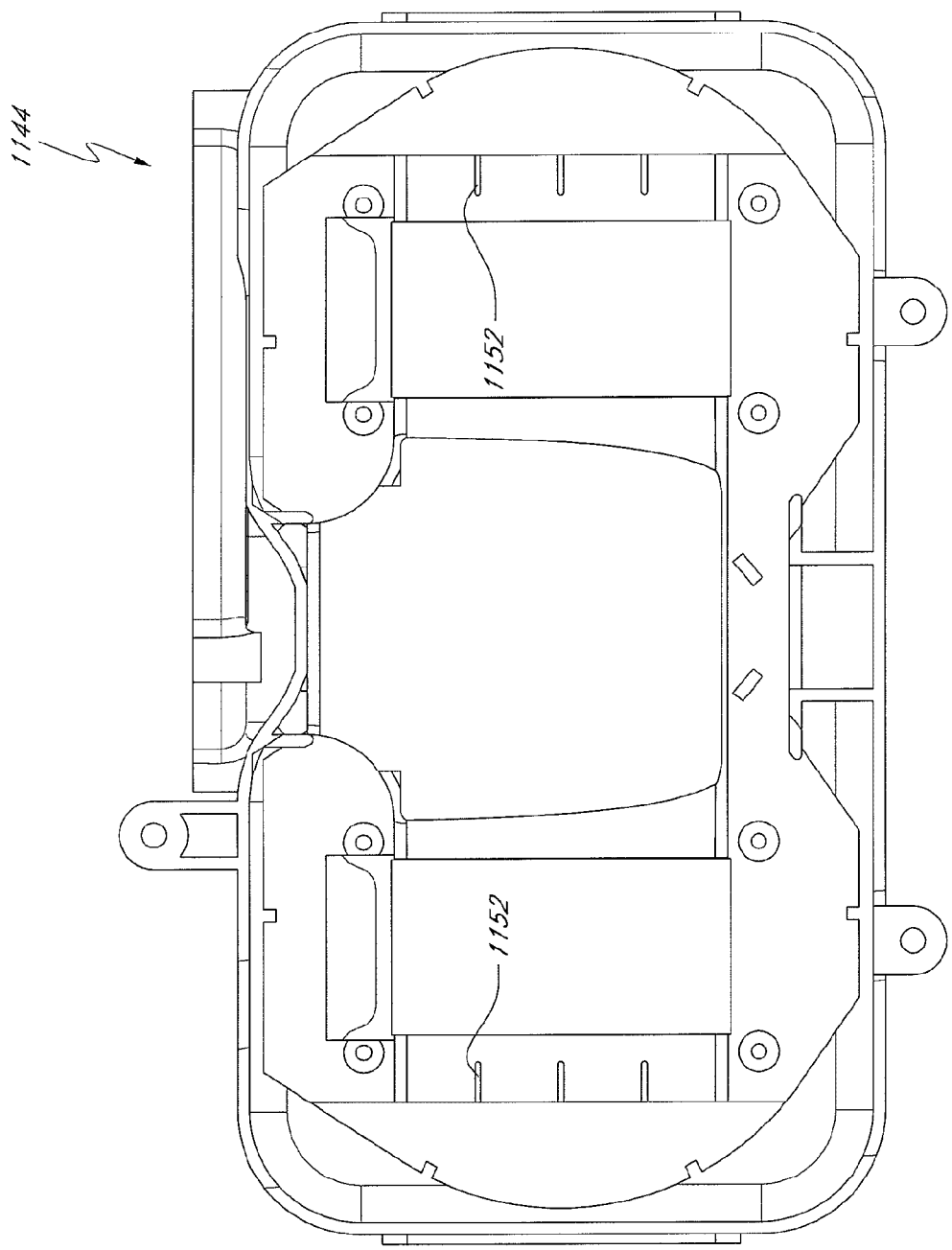

With reference to FIGS. 48F and 48G, the fluid device (e.g., an axial or radial fan) 1130 can be positioned on a side (e.g., the rear side) of the cup holders within the housing of the console. The fluid device 1130 can be configured to draw air in axially from vent openings 1132 (see also FIG. 48D) provided in the housing. In such embodiments, air is then directed down by a housing 1134 of the fluid device 1130 to a space defined by the lower side housing 1144 (see also FIG. 48I) to the heat exchangers 1122. An insert 1150 (not shown in FIG. 48F but shown in FIG. 48J) combines with the lower side housing 1144 to direct flow to the heat exchangers 1122. Specifically, as shown in FIGS. 48I and 48J, the housing 1144 and insert 1150 can include vanes 1152 which are configured to direct the air from the single fluid device 1130 to both of the heat exchangers 1122. In such embodiments, air from the heat exchangers 1122 is then directed by the housing 1144 to side vents 1156 provided on the side of the console. In the illustrated embodiment, the vanes 1152 which are provided on the insert 1150 can be configured to promote a desired flow split (e.g., equal or non-equal) between the two heat exchangers 1122. In addition, such vanes 1152 can preferably distribute the air evenly (e.g., even or uniform velocity) across each of the heat exchangers 1122 to promote efficient heat transfer. In some embodiments, the insert 1150 can be easily removed and/or attached so that different inserts with different vane arrangements can be used to achieve the desired flow characteristics. In some preferred embodiments, vanes 1152 can be molded as part of the housing 1144, thereby eliminating the need for a separate insert.

In use, the fan 1130 draws air through the inlet vent 1132 in a direction that is generally parallel to the rotational axis of the fan (e.g., a generally axial direction). The air is then the drawn into the enclosed space of the fan 1130 and turned approximately 90 degrees to a radial direction. The air flow can be subsequently directed, as shown, towards the space below the cup holder defined by the lower housing 1144 and the insert 1150. The vanes 1152 direct the flow to both heat exchangers 1122 and spread the air equally across both heat exchangers 1122.

In one mode of operation, when the thermoelectric device 1120 is operated, the first side of the thermoelectric device 1120 is cooled as heat is transferred from the side heat exchanger 1122 to the air flowing though the passage. The air flowing over heat exchanger 1122 is discharged through the exit 1156.

As discussed, the first side of the thermoelectric device 1120 can be coupled to the conductive member of the cup holder. In this manner, thermoelectric devices 1120 can be used to cool the interior of the cup holder and a beverage container or other item positioned therein. Heat transfer between the beverage container (not shown) and the thermoelectric device can be enhanced by using one or more biasing elements 1112. As discussed, such biasing elements help urge the container against the inner wall of the cavity.

In another mode of operation, when the thermoelectric device 1120 is operated, the first side of the thermoelectric device 1120 is heated as heat is transferred from the air in the passage to the side heat exchanger 1122. The switches 1110 described above can be used to switch the assembly 1110 from a heating to a cooling mode. In addition, because each cup holder 1102 is associated with a thermoelectric device 1120, one cup holder 1102 can be heated while the other cup holder 1102 is cooled. In other embodiments, both cup holders 1102 can be heated or cooled. In yet other embodiments, a cup holder assembly can comprise more or fewer cavities than discussed and/or illustrated herein.

To assist in the description of the disclosed embodiments, words such as upward, upper, downward, lower, vertical, horizontal, upstream, and downstream have and used above to describe the accompanying figures. It will be appreciated, however, that the illustrated embodiments can be located and oriented in a variety of desired positions. In addition, words such as hot, cold, large, small and the like have been used. It should be appreciated that such terms are relative terms and are not to be limited to any particular level disclosed as part of one or more embodiments.

In addition, it should be understood that the terms cooling side, heating side, cold side, hot side, cooler side and hotter side and the like do not indicate any particular temperature, but are relative terms. For examples, the "hot," "heating" or "hotter" side of a thermoelectric element or array may be at ambient temperature, with the "cold," "cooling" or "cooler" side at a cooler temperature than ambient. Conversely, the "cold," "cooling" or "cooler" side may be at ambient with the "hot," "heating" or "hotter" side at a higher temperature than ambient. Thus, the terms are relative to each other to indicate that one side of the thermoelectric device is at a higher or lower temperature than the counter-designed side. In addition, fluid flow is referenced in the discussion below as having directions.

Although the foregoing description of the preferred embodiments has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present invention should not be limited by the foregoing discussion, which is intended to illustrate rather than limit the scope of the invention.

What is claimed is:

1. A beverage container holder assembly comprising:
   at least one holder member comprising a generally unitary structure defining an interior cavity configured to receive a beverage container;
   wherein the at least one holder member is formed, at least in part, by a generally continuous side wall, said side wall comprising a wall thickness extending from an exterior of the at least one holder member to the interior cavity;
   wherein the side wall of the at least one holder member comprises a heat conduction element extending across an entire wall thickness of the side wall of the at least one holder member;
   a climate control system for selectively cooling or heating a beverage container positioned within the interior cavity of the at least one holder member, said climate control system comprising:
      a cooling or heating device having a first side thermally coupled the at least one cup holder member; and
      a fluid transfer device configured to transfer air through or near at least a portion of the cooling or heating device;
   wherein the heat conduction element is configured to thermally transfer heat between the cooling or heating device and the interior cavity of the at least one cup holder member;
   wherein the first side of the cooling or heating device is directly coupled to the generally unitary structure of the side wall of the at least one cup holder member; and
   wherein heat transfer between the cooling or heating device and the interior cavity is generally configured to occur through substantially an entire circumference of the generally continuous side wall of the at least one cup holder member.

2. The assembly of claim 1, wherein the fluid transfer device comprises a radial fan.

3. The assembly of claim 1, wherein the fluid transfer device comprises an axial fan.

4. The assembly of claim 1, wherein the at least one holder member includes means for biasing a beverage container against a portion of the side wall of the at least one cup holder member.

5. The assembly of claim 1, wherein the cooling or heating device comprises a thermoelectric device.

6. The assembly of claim 1, wherein the cooling or heating device is positioned directly below or along side the at least one cup holder member.

7. The assembly of claim 1, wherein the fluid transfer device is positioned along the side of the at least one cup holder member.

8. The assembly of claim 1, wherein the heat conduction element comprises at least one of a metal and an alloy.

9. The assembly of claim 1, wherein the heat conduction element comprises at least one of aluminum and copper.

10. The assembly of claim 1, wherein the at least one cup holder member comprises a biasing member to help urge a beverage container positioned therein in the direction of the side wall of the at least one cup holder member.

11. A beverage container holder assembly comprising:
    a container holder member defining an interior cavity configured to receive a beverage container, said container holder member comprising an exterior surface and an interior surface, said interior surface extending to said interior cavity;
    wherein the container holder member comprises a generally unitary structure that is formed, at least in part, by a generally continuous side wall;
    wherein the side wall comprises a wall thickness extending from the exterior surface to the interior surface of the container holder member;
    wherein the side wall comprises at least one heat conduction element extending across an entire wall thickness in at least a portion of said side wall;
    a temperature conditioning system configured to cool or heat a beverage container positioned within the interior cavity of the container holder member, said temperature conditioning system comprising:
       a temperature regulating device having a first side thermally coupled the container holder member; and
       a fluid transfer device configured to transfer air through, past or near at least a portion of the temperature regulating device;
    wherein the at least one heat conduction element is configured to thermally transfer heat between the temperature regulating device and the interior cavity of the container holder member; and
    wherein the first side of the temperature regulating device is directly coupled to the side wall of the container holder member.

12. The assembly of claim 11, wherein the temperature regulating device comprises a thermoelectric device.

13. The assembly of claim 11, wherein the fluid transfer device comprises a radial fan or an axial fan.

14. The assembly of claim 11, wherein the container holder member comprises at least one biasing member for biasing a beverage container against a portion of the side wall.

15. The assembly of claim 11, wherein the temperature regulating device is positioned directly below or along side the container holder member.

16. The assembly of claim 11, wherein the at least one heat conduction element comprises at least one of a metal and an alloy.

17. The assembly of claim 11, wherein the at least one heat conduction element comprises at least one of aluminum and copper.

* * * * *